United States Patent
Kotov

(10) Patent No.: US 12,461,021 B2
(45) Date of Patent: Nov. 4, 2025

(54) POLARIZED BLACK-BODY EMISSION FOR MACHINE VISION AND OBJECT RECOGNITION

(71) Applicant: The Regents of The University of Michigan, Ann Arbor, MI (US)

(72) Inventor: Nicholas A. Kotov, Ypsilanti, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 18/863,742

(22) PCT Filed: May 8, 2023

(86) PCT No.: PCT/US2023/021319
§ 371 (c)(1),
(2) Date: Nov. 7, 2024

(87) PCT Pub. No.: WO2023/219931
PCT Pub. Date: Nov. 16, 2023

(65) Prior Publication Data
US 2025/0116599 A1    Apr. 10, 2025

Related U.S. Application Data

(60) Provisional application No. 63/339,604, filed on May 9, 2022.

(51) Int. Cl.
*G01N 21/00* (2006.01)
*G01J 4/04* (2006.01)
(Continued)

(52) U.S. Cl.
CPC ............... *G01N 21/21* (2013.01); *G01J 4/04* (2013.01); *G01J 5/59* (2022.01); *G06V 10/764* (2022.01); *G06V 20/58* (2022.01); *H04N 23/11* (2023.01)

(58) Field of Classification Search
CPC ........ H04N 23/00; G01N 21/00; G01N 25/00; G01J 3/00; G06V 10/00; G06V 20/00
See application file for complete search history.

(56) References Cited

U.S. PATENT DOCUMENTS

| 9,322,768 B1 | 4/2016 | Carrieri et al. |
| 2006/0050391 A1* | 3/2006 | Backlund ............. G02B 5/1847 359/569 |

(Continued)

OTHER PUBLICATIONS

International Preliminary Report on Patentability regarding International Patent Application No. PCT/US2023/021319, dated Nov. 7, 2024.

(Continued)

*Primary Examiner* — Maryam A Nasri
(74) *Attorney, Agent, or Firm* — Harness, Dickey & Pierce, P.L.C.

(57) ABSTRACT

Systems and methods for object and material recognition are provided and include a hyperspectral infrared camera that captures a three-dimensional image of an object and black-body emissions data indicating a polarization of black-body radiation emitted from the object. An image processing device accesses a database of expected polarization signatures of black-body emissions from materials at different temperatures and determines a material of the object based on (i) the black-body emissions data indicating the polarization of the black-body radiation emitted from the object, (ii) an ambient temperature of the environment of the system, and (iii) the database of expected polarization signatures of black-body emissions from a plurality of materials for different temperatures.

50 Claims, 60 Drawing Sheets

(51) Int. Cl.
*G01J 5/59* (2022.01)
*G01N 21/21* (2006.01)
*G06V 10/764* (2022.01)
*G06V 20/58* (2022.01)
*H04N 23/11* (2023.01)

(56) References Cited

U.S. PATENT DOCUMENTS

| | | |
|---|---|---|
| 2014/0324266 A1 | 10/2014 | Zhu et al. |
| 2016/0003677 A1 | 1/2016 | Pezzaniti et al. |
| 2021/0231852 A1 | 7/2021 | Kotov et al. |

OTHER PUBLICATIONS

International Search Report and Written Opinion of the ISA issued in PCT/US2023/021319, mailed Sep. 6, 2023; ISA/US.

Holtsberry. Material Identification Using Mid- and Long-Wave Infrared Imaging Polarimetry. New Mexico State UniversityProQuest Dissertations Publishing. Oct. 2020. Retrieved from the internet ;<https://www.proquest.com/openview/29b92936c456ca8e5210097e5f97b1d3/1.pdf?pq-origsite=gscholar&cbl=18750&diss=y> entire document.

Gomes et al., "Classification of hematite types in iron ores through circularly polarized light microscopy and image analysis", *Minerals Engineering* 52 (2013), 191-197.

Hu et al., "Polarimetric image recovery in turbid media employing circularly polarized light", Research Article, *Optics Express*, vol. 26, No. 19, Sep. 17, 2018.

* cited by examiner

A

POLARIZED BLACK-BODY EMISSION FOR MACHINE VISION AND OBJECT RECOGNITION

CROSS-REFERENCE TO RELATED APPLICATIONS

This application is a U.S. National Phase Application under 35 U.S.C. 371 of International Application No. PCT/US2023/021319, filed on May 8, 2023, which claims the benefit of U.S. Provisional Application No. 63/339,604, filed on May 9, 2022. The entire disclosures of the above application is applications are incorporated herein by reference.

FIELD

The present disclosure relates to machine vision systems and methods and, more particularly, to machine vision systems and methods that detect polarization of black-body emission from objects to determine one or more materials of the object for object recognition, to determine a distance to the object, and/or to determine a relative velocity of the object.

BACKGROUND

This section provides background information related to the present disclosure which is not necessarily prior art.

Machine vision and object recognition systems are used in a variety of applications, including autonomous vehicles, vehicle safety and driver assistance systems, object sorting systems, industrial applications, robotics, medical systems, etc. Some machine vision and object recognition systems use LIDAR systems that emit laser light towards an object and measure characteristics about the reflected light returned the object. When multiple LIDAR systems are used in close proximity, however, the environment can become noisy with laser light emitted by the different LIDAR systems that is reflected off of different objects in the environment.

SUMMARY

This section provides a general summary of the disclosure, and is not a comprehensive disclosure of its full scope or all of its features.

A system is provided and includes a hyperspectral infrared camera configured to capture a three-dimensional image of an object and black-body emissions data indicating a polarization of black-body radiation emitted from the object. The system can also include at least one environmental sensor that includes a temperature sensor configured to detect an ambient temperature of an environment of the system. The system can also include an image processing device in communication with the hyperspectral infrared camera and with the at least one environmental sensor and having a processor and memory configured to: receive the black-body emissions data indicating the polarization of the black-body radiation emitted from the object; access a database of expected polarization signatures of black-body emissions from a plurality of materials for different temperatures; and determine at least one material of the object based on (i) the black-body emissions data indicating the polarization of the black-body radiation emitted from the object, (ii) the ambient temperature of the environment of the system, and (iii) the database of expected polarization signatures of black-body emissions from a plurality of materials for different temperatures.

In other features, the system can include at least one polarization filter configured to filter the three-dimensional image of the object to generate the black-body emissions data indicating the polarization of the black-body radiation emitted from the object.

In other features, the at least one polarization filter can include at least one kirigami filter.

In other features, the at least one polarization filter can include a plurality of polarization filters configured to filter the three-dimensional image of the object in four quadrants, each quadrant representing a different polarization filter or combination of polarization filters.

In other features, the processor and memory can be further configured to perform at least one of identifying the object or classifying the object based on the determined at least one material of the object and the three-dimensional image of the object.

In other features, the processor and memory can be further configured to: determine whether at least one of rain, snow, dust, and fog are present in the environment of the system; and determine the at least one material of the object additionally based on the determination of whether at least one of rain, snow, dust, and fog are present in the environment of the system.

A method is also provided and includes capturing, with a hyperspectral infrared camera, a three-dimensional image of an object and black-body emissions data indicating a polarization of black-body radiation emitted from the object and detecting, with a temperature sensor, an ambient temperature of an environment of the system. The method can also include receiving, with an image processing device in communication with the hyperspectral infrared camera and the temperature sensor and having a processor and memory, the black-body emissions data indicating the polarization of the black-body radiation emitted from the object and accessing, with the image processing device, a database of expected polarization signatures of black-body emissions from a plurality of materials for different temperatures. The method can also include determining, with the image processing device, at least one material of the object based on (i) the black-body emissions data indicating the polarization of the black-body radiation emitted from the object, (ii) the ambient temperature of the environment of the system, and (iii) the database of expected polarization signatures of black-body emissions from a plurality of materials for different temperatures.

In other features, the method can also include filtering, with at least one polarization filter, the three-dimensional image of the object to generate the black-body emissions data indicating the polarization of the black-body radiation emitted from the object.

In other features, the at least one polarization filter can include at least one kirigami filter.

In other features, the at least one polarization filter can include a plurality of polarization filters configured to filter the three-dimensional image of the object in four quadrants, each quadrant representing a different polarization filter or combination of polarization filters.

In other features, the method can also include performing, with the image processing device, at least one of identifying the object or classifying the object based on the determined at least one material of the object and the three-dimensional image of the object.

The method can also include determining, with the image processing device, whether at least one of rain, snow, dust, and fog are present in the environment of the system, and determining, with the image processing device, the at least one material of the object additionally based on the determination of whether at least one of rain, snow, dust, and fog are present in the environment of the system.

Another system is provided an includes a hyperspectral infrared camera configured to capture a three-dimensional image of an object made of at least one known material and black-body emissions data indicating a polarization of black-body radiation emitted from the object. The system also includes at least one environmental sensor that senses at least one environmental condition of an environment of the system, including a temperature sensor configured to detect an ambient temperature of the environment of the system. The system also includes an image processing device in communication with the hyperspectral infrared camera and with the at least one environmental sensor and having a processor and memory configured to: receive the black-body emissions data indicating the polarization of the black-body radiation emitted from the object; access a database of expected polarization signatures of black-body emissions from a plurality of materials for different temperatures; retrieve a polarization signature of black-body emissions for the at least one known material of the object at the ambient temperature of the environment from the database; compare the retrieved polarization signature with the received black-body emissions data to determine a degree of attenuation of the polarization indicated by the received black-body emissions data based on the comparison; determine an expected rate of polarization attenuation based on the at least one environmental condition of the environment of the system; and determine a distance to the object based on the expected rate of polarization attenuation and the determined degree of attenuation of the polarization indicated by the received black-body emission data.

In other features, the system can also include at least one polarization filter configured to filter the three-dimensional image of the object to generate the black-body emissions data indicating the polarization of the black-body radiation emitted from the object.

In other features, the at least one polarization filter can include at least one kirigami filter.

In other features, the at least one polarization filter can include a plurality of polarization filters configured to filter the three-dimensional image of the object in four quadrants, each quadrant representing a different polarization filter or combination of polarization filters.

In other features, the processor and memory can be further configured to: determine whether at least one of rain, snow, dust, and fog are present in the environment of the system based on data received from the at least one environmental sensor, and determine the expected rate of polarization attenuation based on the determination of whether at least one of rain, snow, dust, and fog are present in the environment of the system.

Another method is provided an includes capturing, with a hyperspectral infrared camera, a three-dimensional image of an object made of at least one known material and black-body emissions data indicating a polarization of black-body radiation emitted from the object and sensing, with at least one environmental sensor, at least one environmental condition of an environment of the system, including sensing, with a temperature sensor, an ambient temperature of the environment of the system. The method can also include receiving, with an image processing device in communication with the hyperspectral infrared camera and with the at least one environmental sensor and having a processor and memory, the black-body emissions data indicating the polarization of the black-body radiation emitted from the object and accessing, with the image processing device, a database of expected polarization signatures of black-body emissions from a plurality of materials for different temperatures. The method can also include retrieving, with the image processing device, a polarization signature of black-body emissions for the at least one known material of the object at the ambient temperature of the environment from the database and comparing, with the image processing device, the retrieved polarization signature with the received black-body emissions data to determine a degree of attenuation of the polarization indicated by the received black-body emissions data based on the comparison. The method can also include determining, with the image processing device, an expected rate of polarization attenuation based on the at least one environmental condition of the environment of the system and determining, with the image processing device, a distance to the object based on the expected rate of polarization attenuation and the determined degree of attenuation of the polarization indicated by the received black-body emission data.

In other features, the method can also include filtering, with at least one polarization filter, the three-dimensional image of the object to generate the black-body emissions data indicating the polarization of the black-body radiation emitted from the object.

In other features, the at least one polarization filter can include at least one kirigami filter.

In other features, the at least one polarization filter can include a plurality of polarization filters configured to filter the three-dimensional image of the object in four quadrants, each quadrant representing a different polarization filter or combination of polarization filters.

In other features, the method can also include determining, with the image processing device, whether at least one of rain, snow, dust, and fog are present in the environment of the system based on data received from the at least one environmental sensor and determining, with the image processing device, the expected rate of polarization attenuation based on the determination of whether at least one of rain, snow, dust, and fog are present in the environment of the system.

Another system is provided and includes a hyperspectral infrared camera configured to capture a three-dimensional image of an object made of at least one known material and black-body emissions data indicating a polarization of black-body radiation emitted from the object. The system can also include an image processing device in communication with the hyperspectral infrared camera and having a processor and memory configured to: receive the black-body emissions data indicating the polarization of the black-body radiation emitted from the object; access a database of expected polarization signatures of black-body emissions from a plurality of materials; retrieve a polarization signature of black-body emissions for the at least one known material of the object from the database; compare the retrieved polarization signature with the received black-body emissions data to determine a shift of a peak wavelength of the black-body emissions due to a Doppler effect on the black-body emissions based on the comparison; and determine a relative velocity of the object based on the shift of the peak wavelength.

In other features, the system can also include at least one polarization filter configured to filter the three-dimensional image of the object to generate the black-body emissions data indicating the polarization of the black-body radiation emitted from the object.

In other features, the at least one polarization filter can include at least one kirigami filter.

In other features, the at least one polarization filter can include a plurality of polarization filters configured to filter the three-dimensional image of the object in four quadrants, each quadrant representing a different polarization filter or combination of polarization filters.

A method is also provided an includes capturing, with a hyperspectral infrared camera, a three-dimensional image of an object made of at least one known material and black-body emissions data indicating a polarization of black-body radiation emitted from the object and receiving, with an image processing device in communication with the hyperspectral infrared camera and having a processor and memory, the black-body emissions data indicating the polarization of the black-body radiation emitted from the object. The method can also include accessing, with the image processing device, a database of expected polarization signatures of black-body emissions from a plurality of materials and retrieving, with the image processing device, a polarization signature of black-body emissions for the at least one known material of the object from the database. The method can also include comparing, with the image processing device, the retrieved polarization signature with the received black-body emissions data to determine a shift of a peak wavelength of the black-body emissions due to a Doppler effect on the black-body emissions based on the comparison and determining, with the image processing device, a relative velocity of the object based on the shift of the peak wavelength.

In other features, the method can also include filtering, with at least one polarization filter, the three-dimensional image of the object to generate the black-body emissions data indicating the polarization of the black-body radiation emitted from the object.

In other features, the at least one polarization filter can include at least one kirigami filter.

In other features, the at least one polarization filter can include a plurality of polarization filters configured to filter the three-dimensional image of the object in four quadrants, each quadrant representing a different polarization filter or combination of polarization filters.

Another system is provided and includes a hyperspectral infrared camera configured to receive light emitted from an emitter having at least two circularly polarized light emitters that include a helical left emitter and a helical right emitter, the emitter being configured to control an intensity of light emitted from each of the at least two circularly polarized light emitters such that a combined intensity of light emitted from the emitter remains constant while a polarization of the light emitted from the emitter is varied over time, the polarization of the light emitted from the emitter over time being controlled to represent information bits according to a predetermined protocol that maps the information bits to corresponding polarizations of light. The system also includes an image processing device in communication with the hyperspectral infrared camera and having a processor and memory configured to: determine the polarization of the light received by the hyperspectral infrared camera from the light emitter at each of a plurality of predetermined time periods; determine a particular information bit corresponding to the polarization of the light received by the light emitter at each of the plurality of predetermined time periods to generate a plurality of received information bits; and generate output based on the plurality of received information bits.

In other features, the predetermined protocol is based on a binary numeral system wherein a first range of polarizations of light corresponds to a zero and a second range of polarizations of light corresponds to a one.

In other features, the predetermined protocol is based on a non-binary numeral system having at least three ranges of polarizations of light, wherein a first range of polarizations of light of the at least three ranges corresponds to a first numeral, a second range of polarizations of light of the at least three ranges corresponds to a second numeral, and a third range of polarizations of light of the at least three ranges corresponds to a third numeral.

In other features, the hyperspectral infrared camera and the image processing device are installed in a vehicle and the emitter is located at an intersection and configured to communicate information about the intersection to the vehicle.

In other features, the information about the intersection communicated from the emitter to the vehicle includes at least one of: information about traffic signals at the intersection; information about other vehicles in or approaching the intersection; information about objects in or approaching the intersection; information about a pedestrian in or approaching the intersection; information about a bicyclist in or approaching the intersection; and information about a micromobility vehicle in or approaching the intersection.

Another method is provided and includes receiving, with a hyperspectral infrared camera, light emitted from an emitter having at least two circularly polarized light emitters that include a helical left emitter and a helical right emitter, the emitter being configured to control an intensity of light emitted from each of the at least two circularly polarized light emitters such that a combined intensity of light emitted from the emitter remains constant while a polarization of the light emitted from the emitter is varied over time, the polarization of the light emitted from the emitter over time being controlled to represent information bits according to a predetermined protocol that maps the information bits to corresponding polarizations of light. The method also includes determining, with an image processing device in communication with the hyperspectral infrared camera and having a processor and memory, the polarization of the light received by the hyperspectral infrared camera from the light emitter at each of a plurality of predetermined time periods. The method also includes determining, with the image processing device, a particular information bit corresponding to the polarization of the light received by the light emitter at each of the plurality of predetermined time periods to generate a plurality of received information bits. The method also includes generating, with the image processing device, output based on the plurality of received information bits.

In other features, the predetermined protocol is based on a binary numeral system wherein a first range of polarizations of light corresponds to a zero and a second range of polarizations of light corresponds to a one.

In other features, the predetermined protocol is based on a non-binary numeral system having at least three ranges of polarizations of light, wherein a first range of polarizations of light of the at least three ranges corresponds to a first numeral, a second range of polarizations of light of the at least three ranges corresponds to a second numeral, and a third range of polarizations of light of the at least three ranges corresponds to a third numeral.

In other features, the hyperspectral infrared camera and the image processing device are installed in a vehicle and the emitter is located at an intersection and configured to communicate information about the intersection to the vehicle.

In other features, the information about the intersection communicated from the emitter to the vehicle includes at least one of: information about traffic signals at the intersection; information about other vehicles in or approaching the intersection; information about objects in or approaching the intersection; information about a pedestrian in or approaching the intersection; information about a bicyclist in or approaching the intersection; and information about a micromobility vehicle in or approaching the intersection.

Another system is provided and includes a hyperspectral infrared camera configured to capture a three-dimensional image of an object and black-body emissions data indicating a polarization of black-body radiation emitted from the object. At least one environmental sensor that includes a temperature sensor configured to detect an ambient temperature of an environment of the system. An image processing device in communication with the hyperspectral infrared camera and with the at least one environmental sensor and having a processor and memory configured to: receive the black-body emissions data indicating the polarization of the black-body radiation emitted from the object; access a database of expected polarization signatures of black-body emissions from a plurality of materials for different temperatures, the plurality of materials including a plurality of minerals; and determine at least one material of the object, including at least one mineral of the object, based on (i) the black-body emissions data indicating the polarization of the black-body radiation emitted from the object, (ii) the ambient temperature of the environment of the system, and (iii) the database of expected polarization signatures of black-body emissions from the plurality of materials, including the plurality of minerals, for different temperatures.

In other features, the system includes at least one polarization filter configured to filter the three-dimensional image of the object to generate the black-body emissions data indicating the polarization of the black-body radiation emitted from the object.

In other features, the at least one polarization filter includes at least one kirigami filter.

In other features, the at least one polarization filter includes a plurality of polarization filters configured to filter the three-dimensional image of the object in four quadrants, each quadrant representing a different polarization filter or combination of polarization filters.

In other features, the processor and memory are further configured to: determine whether at least one of rain, snow, dust, and fog are present in the environment of the system; and determine the at least one material of the object, including at least one mineral of the object, additionally based on the determination of whether at least one of rain, snow, dust, and fog are present in the environment of the system.

Another method is provided and includes capturing, with a hyperspectral infrared camera, a three-dimensional image of an object and black-body emissions data indicating a polarization of black-body radiation emitted from the object. The method also includes detecting, with a temperature sensor, an ambient temperature of an environment of the system. The method also includes receiving, with an image processing device in communication with the hyperspectral infrared camera and the temperature sensor and having a processor and memory, the black-body emissions data indicating the polarization of the black-body radiation emitted from the object. The method also includes accessing, with the image processing device, a database of expected polarization signatures of black-body emissions from a plurality of materials for different temperatures, the plurality of materials including a plurality of minerals. The method also includes determining, with the image processing device, at least one material of the object, including at least one mineral of the object, based on (i) the black-body emissions data indicating the polarization of the black-body radiation emitted from the object, (ii) the ambient temperature of the environment of the system, and (iii) the database of expected polarization signatures of black-body emissions from the plurality of materials, including the plurality of minerals, for different temperatures.

In other features, the method also includes filtering, with at least one polarization filter, the three-dimensional image of the object to generate the black-body emissions data indicating the polarization of the black-body radiation emitted from the object.

In other features, the at least one polarization filter includes at least one kirigami filter.

In other features, the at least one polarization filter includes a plurality of polarization filters configured to filter the three-dimensional image of the object in four quadrants, each quadrant representing a different polarization filter or combination of polarization filters.

In other features, the method further includes determining, with the image processing device, whether at least one of rain, snow, dust, and fog are present in the environment of the system. The method further includes determining, with the image processing device, the at least one material of the object, including at least one mineral of the object, additionally based on the determination of whether at least one at least one of rain, snow, dust, and fog are present in the environment of the system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
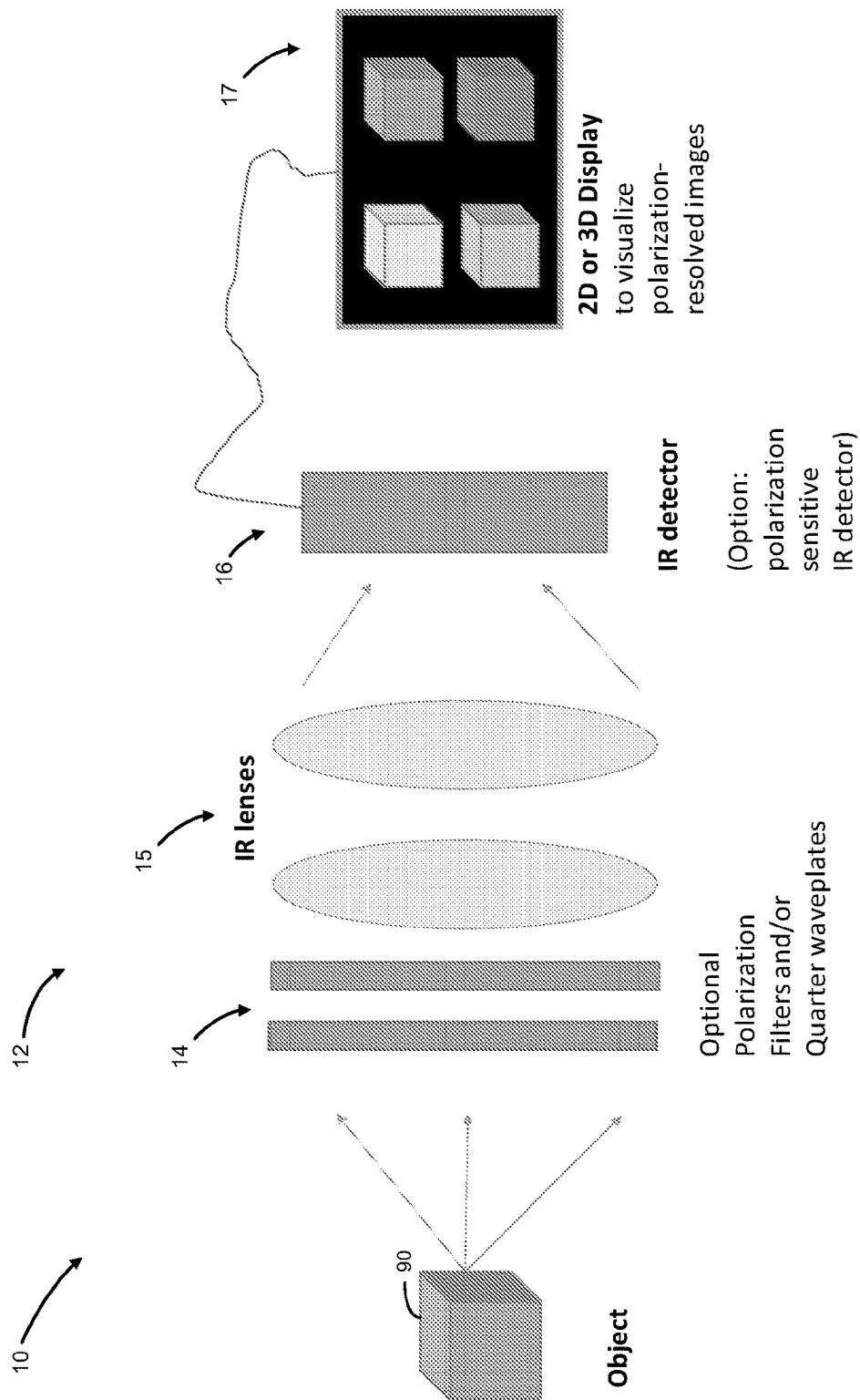
FIG. 1A is a schematic of a hyperspectral infrared camera for polarization-sensitive image recognition by thermal emission according to the present disclosure.

Example embodiments will now be described more fully with reference to the accompanying drawings.

An object in thermodynamic equilibrium with its environment emits thermal electromagnetic radiation known as black-body radiation or black-body emission(s). The present disclosure is directed to systems and methods that utilize a hyperspectral infrared camera to sense and measure the polarization of black-body emissions from an object and then determine characteristics of the object based on the polarization of the black-body emissions from the object. For example, as discussed in further detail below, the present disclosure includes systems and methods that can determine a material of the object, a distance to the object, and/or a relative velocity of the object based on the polarization of the black-body emissions from the object.

Objects that have the same shape at the same temperature in the same environment made from one type of material, such as wood, will emit black-body radiation having a different polarization signature than materials at the same temperature in the same environment made from a different material, such as plastic. In addition, objects made of different types of plastic will have different black-body emission polarization signatures due to having different chemical structures, the use of different fillers, different processing conditions etc. The systems and methods of the present disclosure detect the polarization signatures black-body radiation emitted from different objects and use the detected polarization signatures to determine one or more materials of the object, a distance to the object, and/or a relative velocity of the object, as discussed in further detail below. At normal ambient conditions, such as room temperature, black-body emissions are generally emitted with wavelengths centered in the range of 7 to 11 μm.

The systems and methods of the present disclosure include thermal cameras modified for wavelength-specific acquisition of three-dimensional (3D) images with circular and linear polarization contrast across the infrared (IR) part of the electromagnetic spectrum, including black-body emissions. The systems and methods of the present disclosure can be used, for example, for machine vision, robotics, autonomous vehicle systems, vehicle navigation, vehicle safety and driver assistance systems, object sorting systems, industrial applications, robotics, medical systems, and any other systems or applications that require machine vision, and object/material detection, including systems that require object recognition, objection location detection, and/or relative velocity detection, etc. The systems and methods of the present disclosure can also be used to locate and identify minerals. Molecular, mesoscale, and microscale chirality of many materials of biological and abiological origin, as well as other electromagnetic processes affecting the polarization state of IR photons, engender black-body emission with specific polarization signatures. Quantifying the polarization sign and amplitude at multiple wavelengths of the black-body emission, as well as the temporal progression of the black-body emission during relative movement of the object, facilitates object recognition and detection in an environment with a high thermal noise characteristic. For example, systems and methods of the present disclosure can be used by autonomous vehicles to identify, classify, and locate objects within the environment, such as other vehicles, pedestrians, roadside objects, etc., for use by the autonomous vehicle to navigate the environment.

Machine vision systems that solely utilize LIDAR can flood the environment with laser light that can make it difficult for multiple machine vision systems operating in the same environment to filter out laser light emissions from other systems. For example, multiple autonomous vehicles operating in the same environment can all flood the environment with laser light creating a noisy light environment for detecting reflected laser light and performing object detection and recognition.

The machine vision systems of the present disclosure, however, include passive systems that do not require laser light to be generated, emitted, and reflected off of an object. Instead, the machine vision systems in accordance with the present disclosure passively detect black-body radiation emitted from an object without having to introduce additional light into the environment. In this way, machine vision systems in accordance with the present disclosure can detect polarized black-body emissions and perform stealthy object detection and vehicle navigation, for example, in an environment without using LIDARs that could disclose the location of the subject vehicle, interfere with other vehicle navigation systems, and/or create an unsafe and/or noisy light environment. In addition, because the systems and methods of the present disclosure passively detect black-body emissions without the need to generate and emit a laser light toward an object, such as with LIDARs, the present systems and methods require and utilize less power and energy than other systems. In the case of autonomous vehicles, for example, that utilize electrical power from a battery, the systems and methods of the present disclosure can save battery life and utilize less electrical power than other systems, such as LIDAR systems, that require laser light to be generated and emitted.

Additionally or alternatively, machine vision systems based on polarized black-body emission in accordance with the present disclosure can also be used in conjunction with and in addition to other environmental sensors, such as cameras, LIDARs, radars, etc. In other words, the machine vision systems of the present disclosure utilizing black-body emission detection can be used in addition to and in conjunction with other machine vision systems, such as cameras, LIDARs, radars, etc., to cross-check and confirm object detection determinations, such as object recognition, object location, and object velocity determinations.

Figure 1B:
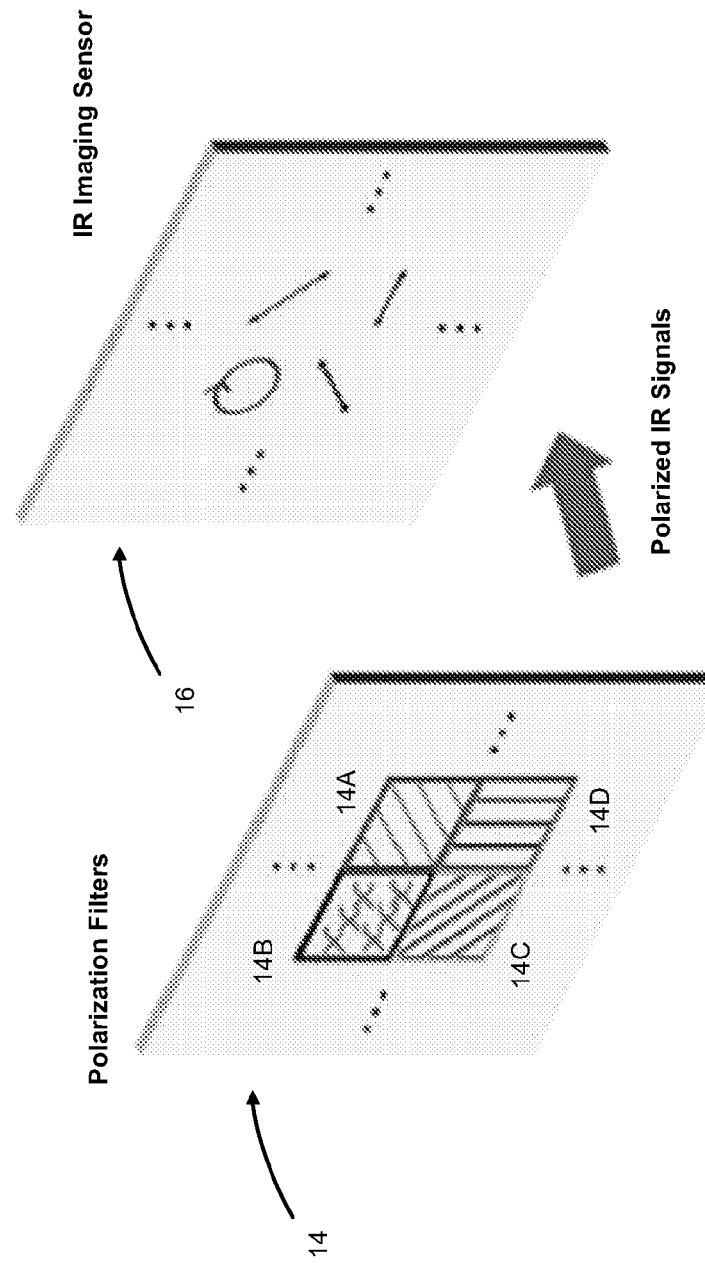
FIG. 1B illustrates polarization filters and an IR imaging sensor according to the present disclosure.

With reference to FIGS. 1A and 1B, the 3D vision system 10 of the present disclosure includes a hyperspectral infrared camera 12 for polarization-sensitive image recognition based on thermal emission from an object 90. The hyperspectral infrared camera 12 can include, for example, a Hyper-Cam, a Hyper-Cam Mini, or a Hyper-Cam Mini xLW available from Telops Inc. While these hyperspectral infrared cameras are identified as examples, any hyperspectral camera with specifications sufficient to sense and detect black-body radiation can be used. For example, a hyperspectral camera configured to detect black-body radiation in environmental conditions encountered during driving of autonomous vehicles can be used. For example, the hyperspectral infrared camera 12 can include the following specifications:

TABLE 1

Specifications of Hyperspectral Infrared Camera 12

| Parameters | Values |
| --- | --- |
| Spectral Resolution | Up to 0.25 cm$^{-1}$ |
| Spectral Range | 7.35-13.5 μm |
| Spatial Resolution | 320 × 256 pixels |
| Field of View | 6.4 × 5.1 degrees |
| Field of View with Telescopes | 25.2 × 20.3 degrees |
| Working Range | >1.6 m (4.8 ft) |
| Radiometric Accuracy | <2.0 K |
| Movement Resolution | 10 μm (linear incremental) |

As shown in FIG. 1A, the hyperspectral infrared camera 12 can include specifically engineered polarization filters and/or quarter waveplates 14, IR lenses, and an IR imaging detector or sensor 16. The IR detector or IR imaging sensor 16 can optionally be a polarization sensitive IR detector or sensor. The polarization filters and/or quarter waveplates 14 are configured to acquire polarization-resolved 3D images of the object 90 in the 5-15 μm wavelength range. The IR lenses 15 can receive the filtered/polarized IR received from the thermal emissions of the object 90 and focus the IR onto the IR detector/IR imaging sensor 16. The 3D vision system 10 can also include or be connected to a display 17 for displaying polarization-resolved images based on the thermal emission from the object 90. The display 17 may be a 2D or 3D display for displaying images related to the object 90 based on the thermal emission IR received from the object. As shown in FIG. 1B, the polarization filters can be configured in four quadrants (14A, 14B, 14C, 14D) that correspond to selected polarization states registered and corresponding to specific pixels of the camera. For example, the four quadrants of the filter can correspond to filtering the received black-body emissions in four different ways, such as using a circular polarization filter, a linear polarization filter, and different combinations of linear and circular polarization filters. The different polarization filters are used to filter the received black-body emissions to obtain different information about the black-body emissions. While the present example utilizes four polarization filters separated into four quadrants, as shown in FIG. 1B, any number of polarization filters and quadrants can be used. The geometry of the filters is computationally designed using electromagnetic modeling software. For further example, the polarization filters 14 can be micro-manufactured as kirigami sheets from appropriate composite materials. For further example, additionally or alternatively, quarter waveplates can be used in addition to or in place of the polarization filters. In the context of machine-vision applications, kirigami filters are beneficial as they can minimize power dissipation while maximizing the polarization rotation. Kirigami filters can be lighter weight and, as such, can reduce the weight of the 3D vision system, as compared with other polarization filters. While specific examples of kirigami filters are provided, any polarization filter that provides the described polarization filtering functionality can be used. For example, conventional wire grid polarization filters can be used. Additionally or alternatively, meta surface filters can be used. Polarization filters having micron scale patterns with two-dimensional or three-dimensional structures that enable polarization and filtering can be used. In addition, polarization filters such as 3D printed filters with specific chiral features, such as 3D helical features, and/or other meta filters can be used.

As compared with other machine vision systems, polarization-sensitive vision systems are particularly suited for situations in which the observer or sensing device is moving with respect to the object. For example, compared to state-of-the-art shape-based 3D vision cameras, the systems and methods of the present disclosure, which detect and measure circular and linear polarization of black-body emissions from an object, can beneficially detect and capture moving objects without grazing or blurring. This is due to the clarity of the resulting images being increased by analyzing spatiotemporal variations in electromagnetic field vector angles. In particular, realization of polarization-sensitive image acquisition and processing is of particular importance within the IR range because image distortions, such as image-after and blur, significantly deteriorate the spatial resolution of prior vision systems, leaving many "dead" pixels and causing processing errors by the prior systems.

The low intensity of the thermal emissions from black-body radiation makes the polarization-sensitive vision systems of the present disclosure beneficial for several reasons. For example, when noise level is high, traditional object identification based on shape, color, and difference in emission intensity becomes ambiguous. Since many biological and abiological materials have different polarization rotation of emitted photons, circular polarization signatures can reduce the environmental noise and provide improved image contrast resulting in improved object detection and recognition. In addition, object identification based on a set of polarization angles and constants emitted at different wavelengths over the wide IR spectrum range can be utilized in accurate triangulation protocol even when the traditional shape-based methods cannot be applied or are not providing useful results.

The polarization-sensitive 3D vision systems of the present disclosure are able to determine the polarization characteristics of black-body emissions of different materials and efficiently identify the material or materials of an object, thereby enabling the efficient and accurate recognition or characterization of the object. In addition, when used in an autonomous vehicle or vehicle safety application, the polarization-sensitive 3D vision systems of the present disclosure can improve the perception of the environment surrounding the vehicle, removing or reducing the need to use LIDAR devices that flood the environment with laser light. The polarization-sensitive 3D vision systems of the present disclosure can be used to generate, store, and share a library of known polarization signatures for different materials and objects.

Black-body radiation of most materials of biological origin, and of some abiological objects, have circular or linear polarization. Characteristics of the polarization of black-body radiation emitted from an object provide information about the object emitting the black-body radiation. For example, for materials and objects with molecular, sub-micron, and micron scale chirality, the composition and surface texture of the materials and objects results in a degree of circular polarization of emitted thermal photons. In addition, thermal emission can be polarized by an external magnetic field. In addition, black-body emissions from rod-like metallic objects are linearly polarized. These known characteristics can enable the 3D vision system 10 of the present disclosure to determine and identify characteristics and materials of an object based on the polarization of the black-body radiation emitted from the object.

Figure 2:
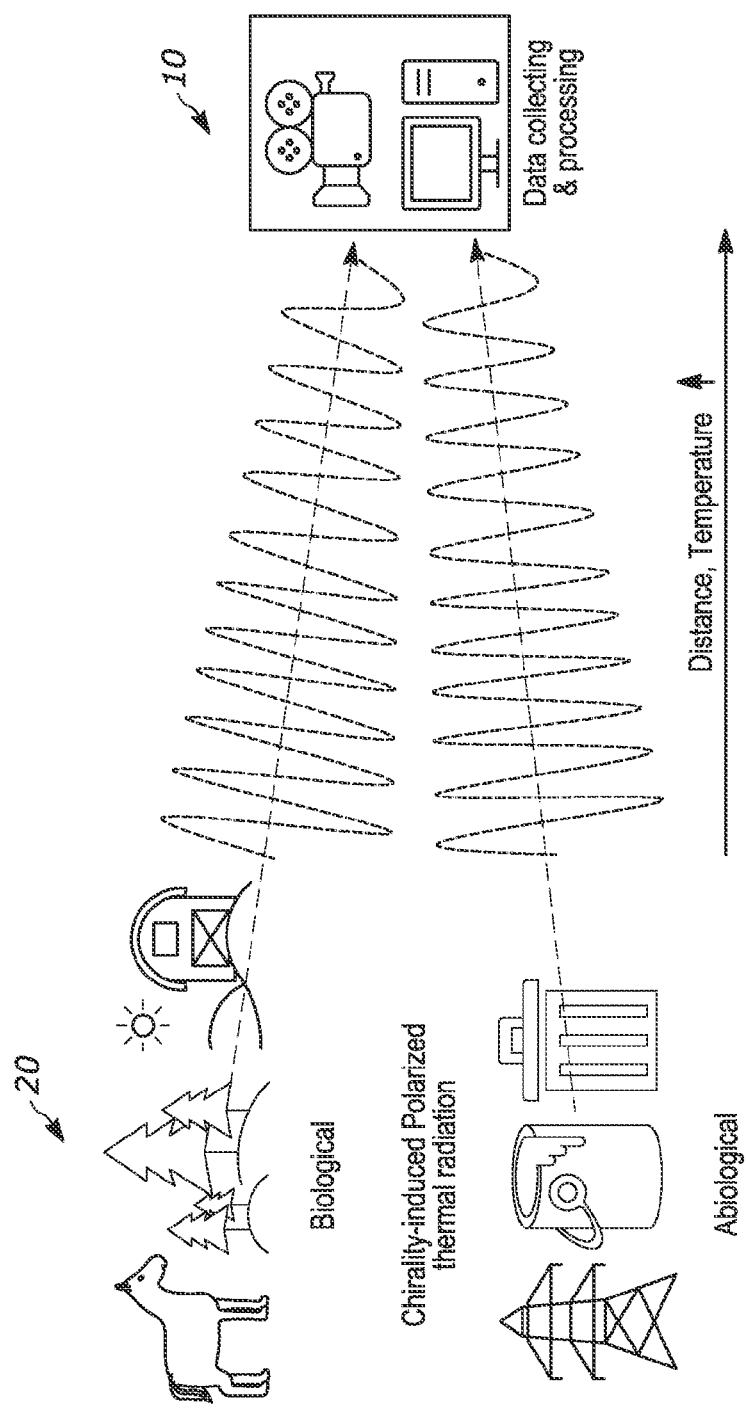
FIG. 2 is a diagram illustrating a three-dimensional (3D) vision system of the present disclosure detecting biological and abiological materials according to the present disclosure.
Figure 3:
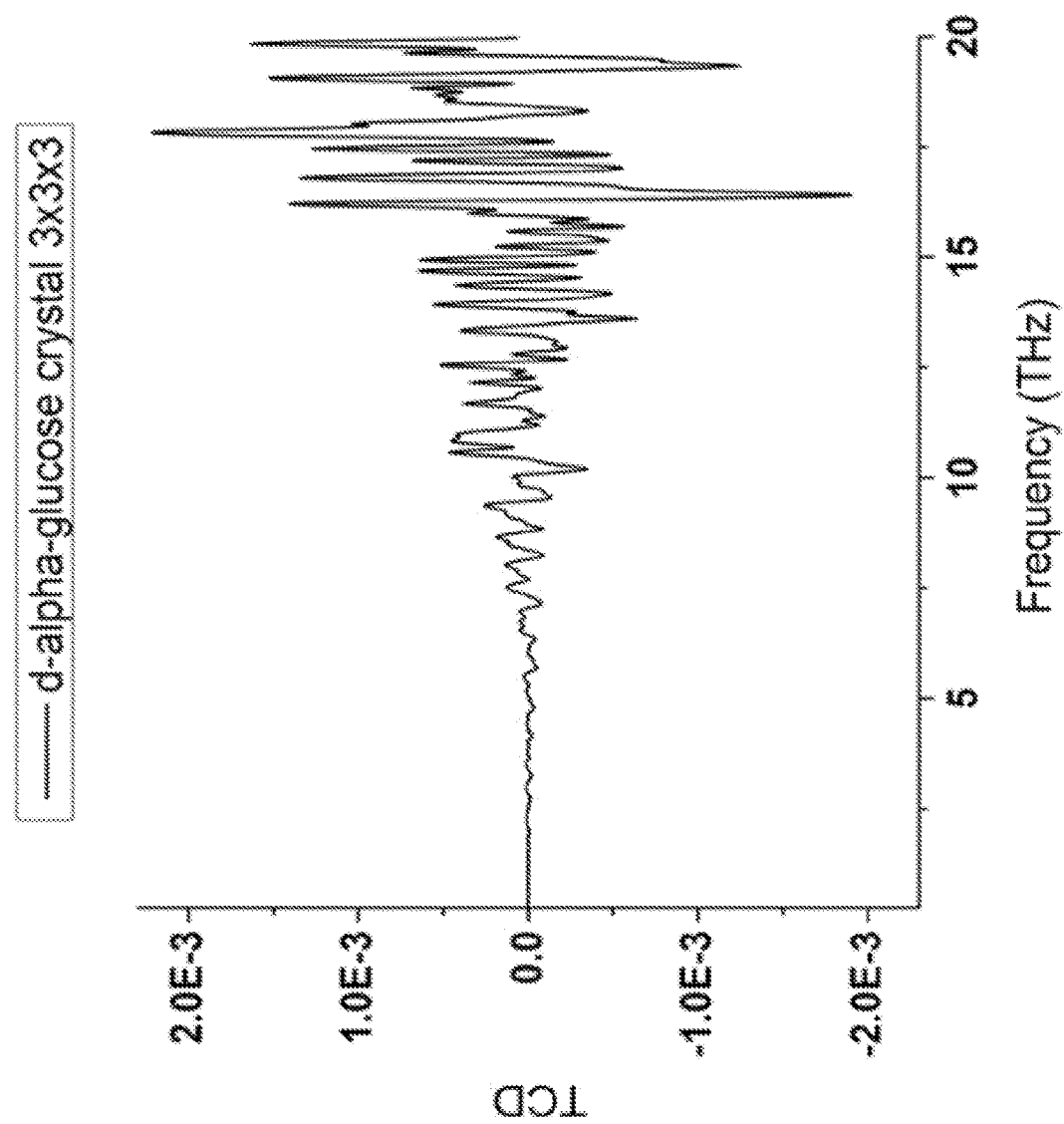
FIG. 3 is a graph illustrating the circular dichroism spectrum for glucose.

With reference to FIG. 2, the 3D vision system 10 of the present disclosure can detect thermal emissions from both biological materials 20 and abiological materials 22. With respect to thermal emissions from biological materials, if a molecule or a particle is chiral, it absorbs and emits photons of left- and right-circular polarization with different probabilities. This is true for ultraviolet (UV), visible, optical, near IR, and mid-IR emissions. Although not explicitly considered by Kirchhoff's theory or Plank's law, the same is also true for black-body radiation from biological materials. In particular, black-body thermal emissions from biological materials at ambient conditions originates from chiral vibrational/rotational states and the homochirality of biomolecules. For example, cellulose, the primary component of wood, is known to have chiral vibrational states identified with characteristic energies in the mid-IR range. In particular, with additional reference to FIG. 3, the circular dichroism (CD) spectrum for glucose is shown. Modification of the spectrum is to be expected for different types of wood and wooden objects. The spectra of simple sugar, such as glucose, is broadly present in the environment. Using a code validated on several biomolecules, the absorption and, thus emission, of glucose molecules is strongly polarized in the black-body range of frequencies. Glucose is an elementary sugar of cellulose and glucose moieties are present in all wooden materials.

With respect to thermal emission from abiological materials 22, the black-body emission from objects made of abiological materials 22 can also be polarized either linearly or circularly. For example, black-body radiation from rod-like metallic objects is linearly polarized. As such, any metallic post, fence, or transmission line can be recognized and triangulated by the polarization signature of its black-body emissions.

Figure 4:
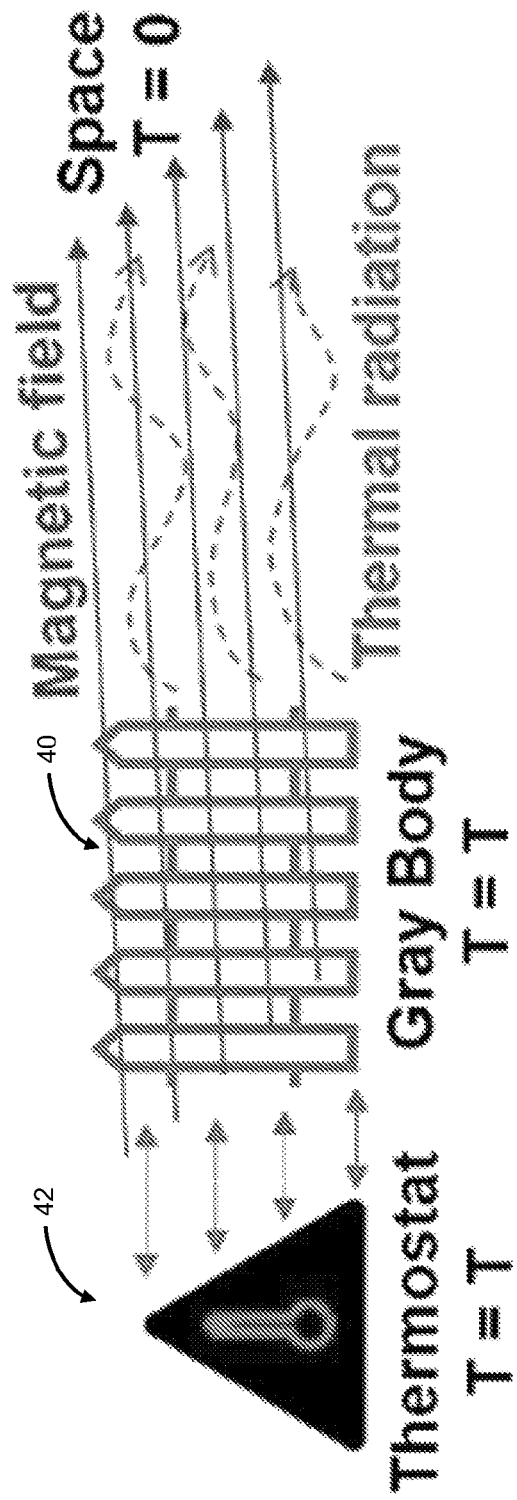
FIG. 4 is a diagram illustrating a model for thermal radiation modulation of a gray body according to the present disclosure.

Moreover, due to the abundance of iron and its alloys used in construction, such materials can emit circularly polarized black-body emissions due to the Earth's magnetic field. FIG. 4 shows a model for thermal radiation modulation of a "gray body" 40, such as a metallic fence, by a magnetic field. With reference to FIG. 4, calculations carried out using a gray-body model for the gray body 40 shown in FIG. 4 with a constant frequency of emission that is in thermal equilibrium via non-radiative interactions with a thermostat 42 have indicated that this body radiates with the net fractional polarization, q, based on the following formula:

$$q(\omega) = -\frac{eB}{2m\omega}, \quad \text{Formula 1}$$

where e, B, m, and ω are elementary charge, magnetic field, electron mass, and optical frequency, respectively. Given the Earth's magnetic field of 0.65 gauss, thermal radiation having q=3.03×10$^{-8}$ for ~10 μm photons is difficult to detect with prior polarization cameras. The polarization optics, including the 3D vision system 10 and hyperspectral infrared camera 12, however, with accompanying processing module(s), can detect the thermal black-body emissions of ferromagnetic materials such as iron fences, having higher q values.

The 3D vision system 10 of the present disclosure can be implemented with a hyperspectral infrared camera 12 having spectral resolution of 0.25 cm$^{-1}$. Other suitable IR cameras sufficiently sensitive to black-body radiation, however, can also be utilized. With reference again to FIG. 1B, the 3D vision system 10 can be equipped with high-efficiency polarization filters 14 serving as focal plane division filters. With this configuration, all four Stokes polarization coefficients can be obtained in a single measurement. As discussed above, commercial polarization filters can also be used.

Figure 5:
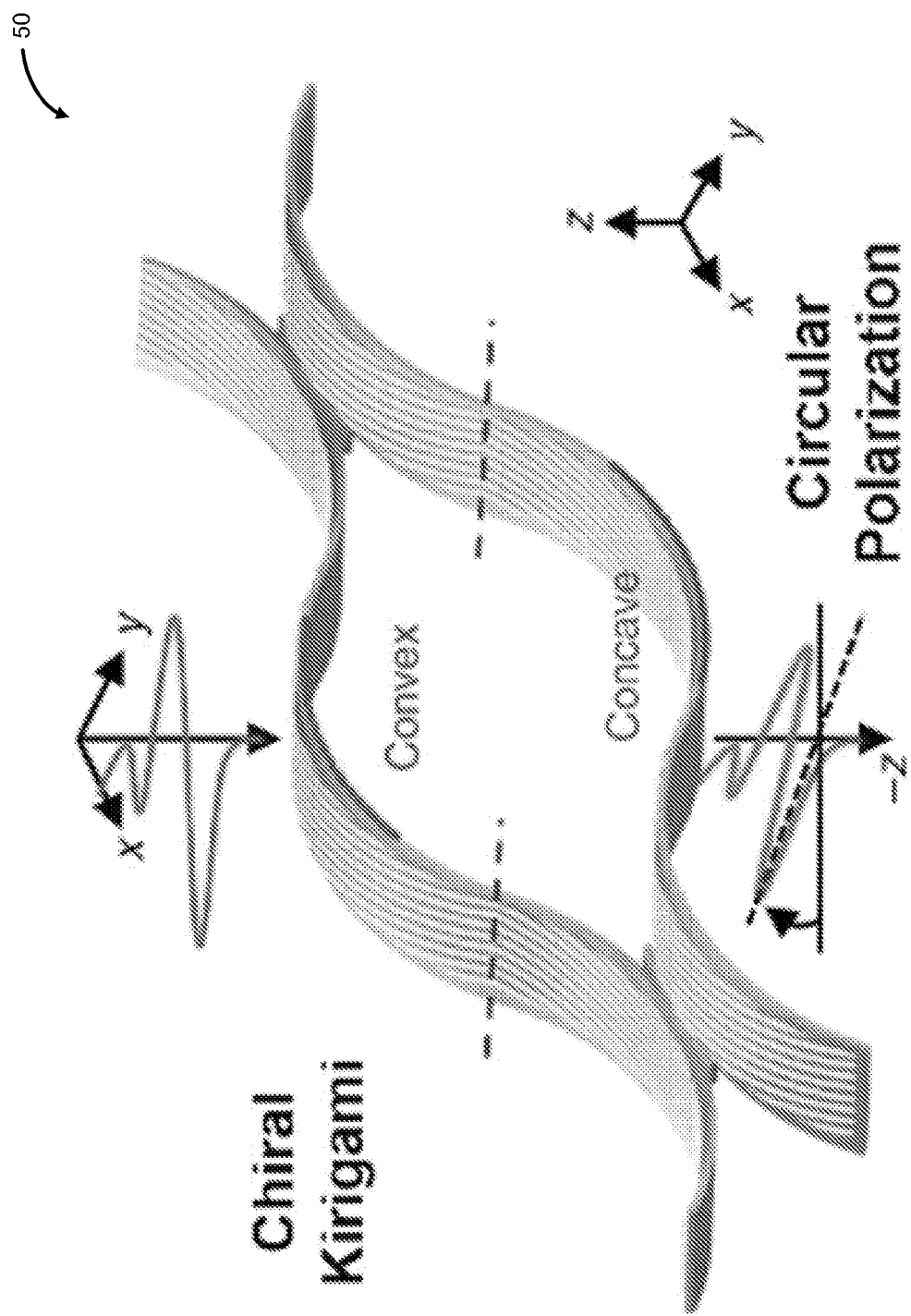
FIG. 5 is a diagram illustrating microfabricated kirigami polarizers according to the present disclosure.

With reference to FIG. 5, the polarization filters 14 can include microfabricated kirigami polarizers 50, as well as other metamaterial filters. The problems associated with prior filters used for thermal imaging are mitigated by the use of kirigami filters, which increase the data acquisition rate and the signal-to-noise ratio (SNR). For example, conventional wire grid polarization filters need additional optical elements, such as pixelated retarders, to achieve circular polarization. These additional elements deteriorate the performance of hyperspectral IR cameras by narrowing the range of wavelengths, reducing signal power, and slowing down the acquisition rate. Kirigami filters overcome these drawbacks by enabling polarization measurements without the need for additional optical elements. Kirigami filters made from high-strength nanocomposites minimize power dissipation, further improving the SNR.

The 3D vision and navigation systems of the present disclosure based on polarization-based black-body imaging can utilize the coarse depth map with surface normal from polarized IR light of the objects. In this way, as discussed in further detail below, distance calculations to the object can be performed based on passive capture measurements. Polarization data about the objects also makes it possible to acquire spatiotemporal variations in electro-magnetic field vectors and accurately determine the distance to an object.

The 3D vision system 10 of the present disclosure can perform polarization imaging of a thermal scene in the black-body part of the spectrum using a hyperspectral infrared camera 12, modified with the polarization filters 14, as described above. As such, polarization images of biological materials 20, such as trees, and abiological materials 22 or objects, such as a metal fence, can be efficiently obtained. The pixelated scene obtained can be quantified by calculating the full Stokes matrix of the polarization parameters. The 3D vision system 10 of the present disclosure includes both an effective polarization filter design for full-Stokes parameter analysis and optimized image processing algorithms.

Figure 6B:
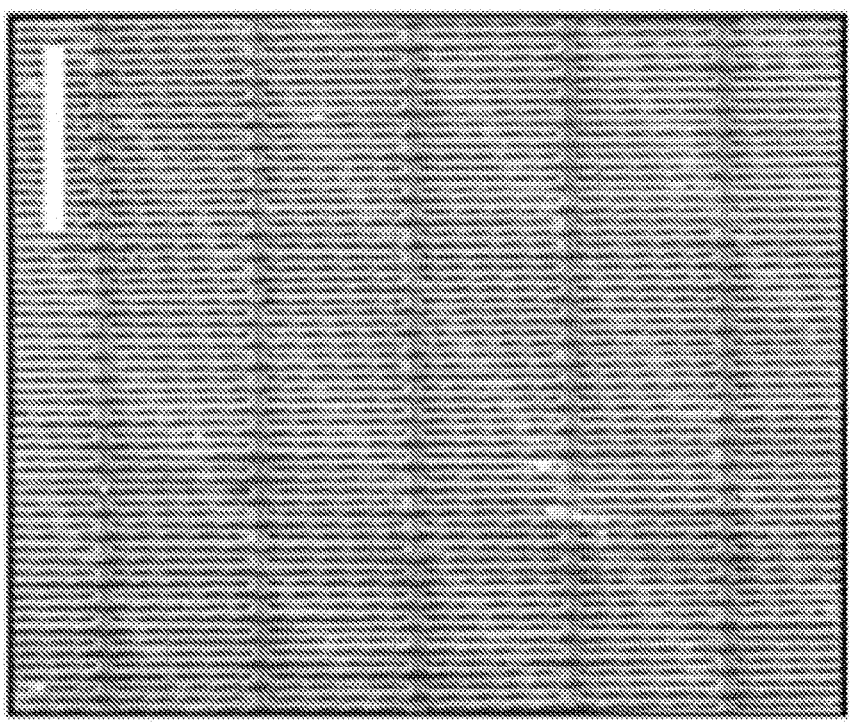
FIG. 6B illustrates a scanning electron microscope (SEM) image of the wafer of FIG. 6A according to the present disclosure.
Figure 6A:
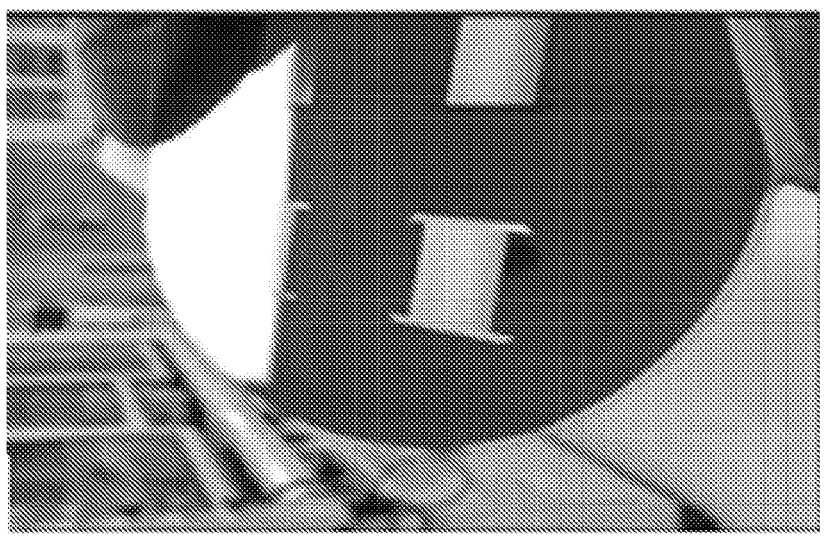
FIG. 6A is a photograph of kirigami optical elements fabricated on a wafer according to the present disclosure.
Figure 7:
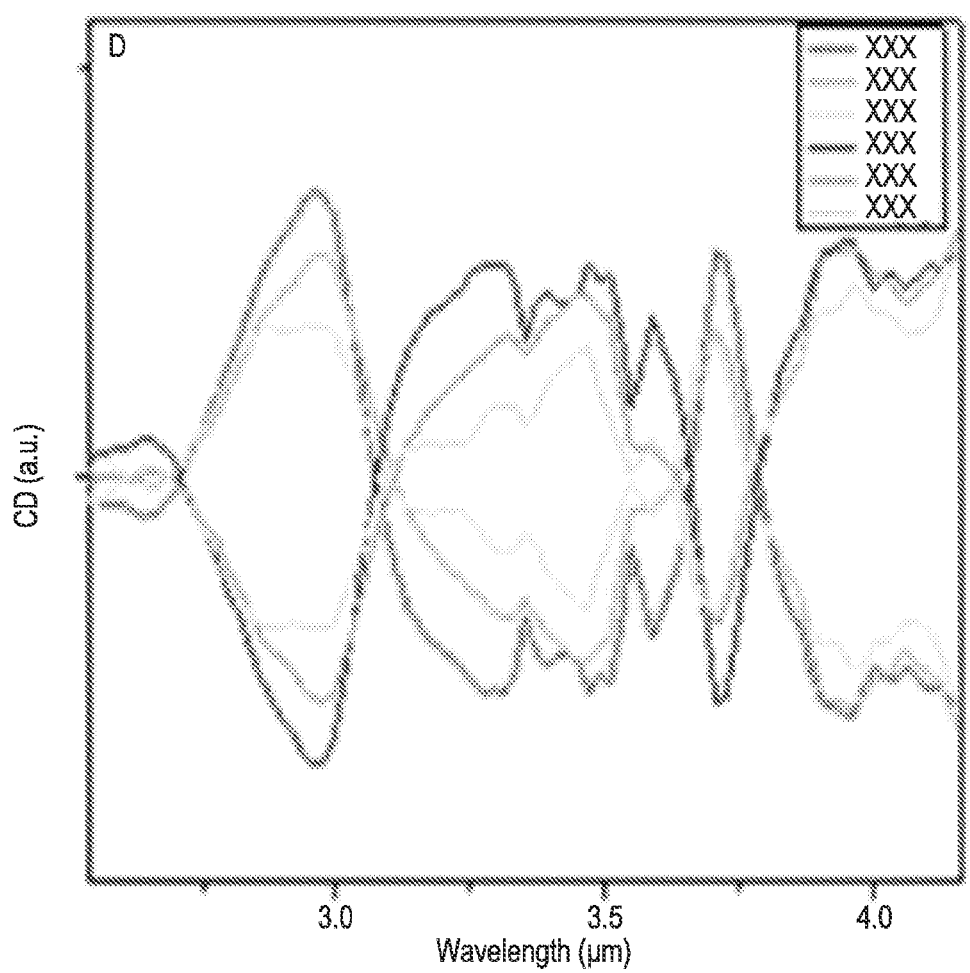
FIG. 7 illustrates LUMERICAL computations of circular dichroism for different kirigami filters according to the present disclosure.

With reference to FIG. 6A, a photograph of kirigami optical elements fabricated on a wafer is shown. With reference to FIG. 6B, a scanning electron microscope (SEM) image of the wafer is shown with a scale bar of 50 µm. Kirigami polarization filters in the THz range are extended to the 7.3-13.5 µm range. By controlling the pattern and the size of the kirigami unit cell, circular polarization filter in the target wavelength range can be realized. The geometry and the material of the kirigami filters can be computed using Lumerical software, as illustrated by the graph of FIG. 7. In particular, FIG. 7 shows LUMERICAL computations of circular dichroism (CD) for different kirigami filters. In this way, reconstruction of the stationary 3D scene from the spectral image at 20 meters can be performed.

A polarization filter can be installed in two IR hyperspectral cameras for 3D vision. An optimal filter alignment and configuration to acquire 3D images with reproducibility of 85% can be utilized for 3D reconstruction at the different speeds of robots, vehicles, drones, etc. of 25 mph. The polarization settings and image reconstruction algorithms can also be adapted for weather conditions, dust levels, and levels of obstruction. For example, the polarization of the black-body emissions can be attenuated by the dust, rain, snow, etc. existing in the environment between the object and the 3D vision system 10. As discussed in further detail below, the system can sense the environmental conditions, such as dust, rain, snow, etc., of the environment and adjust for the expected attenuation caused by those materials present in the environment.

Machine-learning algorithms used by the 3D vision system 10 of the present disclosure for black-body polarization machine vision can be trained using LIDAR and camera data in other parts of the spectrum, such as the visible and infrared portions of the spectrum. Effective ground-truth data to evaluate the full-stack, i.e., modified hardware and processing software, of the polarization IR 3D vision systems can utilize 3D point cloud data of LIDARs at the field of view of 25.2×20.3° with the number of points ≥100 k. In this way, the black-body polarization machine vision system can be trained using data obtained by traditional LIDAR and camera data systems.

The loss of polarization of emitted light due to scattering, for instance, in foggy or snowy weather, can be mitigated by the 3D vision system 10 by selecting different wavelength diapasons for clear and inclement weather conditions while retaining the same polarization detection and object recognition protocol. In other words, the environmental conditions can be sensed and a different set of parameters can be selected corresponding to the particular environmental conditions. Additionally, the 3D vision system 10 can perform post processing of images acquired for different polarization states to remove haze, as has been performed in biomimetic polarization vision systems. In addition, the systems and methods of the present disclosure can be used in air and in water and haze mitigation can be used to filter out the effect of any materials present in the air or water.

Since the material-dependent polarization signatures and the filter designs are transferable to other cameras, the sensitivity of the hyperspectral cameras can be increased by implementation of the systems and methods of the present disclosure the cameras utilizing with cooled IR detectors.

In addition, high noise level of the environmental thermal emissive measurements can be mitigated by changing the frequency range to obtain stable, reproducible spectra. Noise can also be significantly reduced by the acquisition and processing of images with different polarization.

Figure 8:
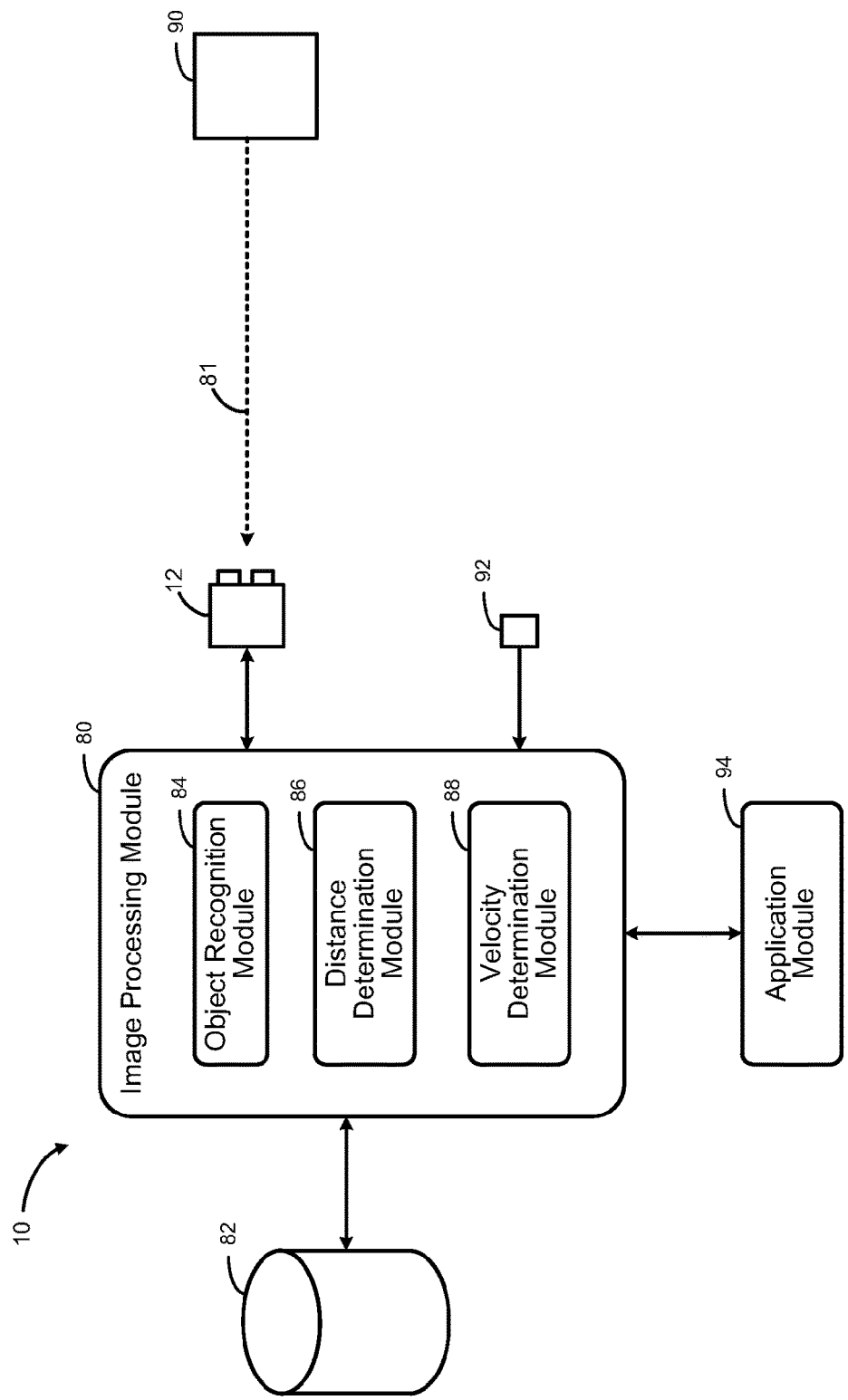
FIG. 8 is a functional block diagram of an image processing module according to the present disclosure.

With reference to FIG. 8, a 3D vision system 10 of the present disclosure is shown and includes the hyperspectral infrared camera 12 that detects black-body emissions 81 emitted from an object 90. The 3D vision system 10 also includes an image processing module 80 that is in communication with the hyperspectral infrared camera 12 and receives image data, including a 3D image of the object 90 with black-body emission polarization data of the object 90, from the hyperspectral infrared camera 12. The image processing module 80 is also in communication with one or more environmental sensors 92. The one or more environmental sensors 92 sense environmental data about the ambient environment of the 3D vision system 10. For example, the one or more environmental sensors 92 can include an ambient temperature sensor to sense an ambient temperature of the environment. Additionally, the one or more environmental sensors 92 can include a humidity sensor to sense an ambient humidity of the environment. Additionally, the one or more environmental sensors 92 can include a camera to sense light characteristics of the ambient environment, such as whether it is day or night and whether it is sunny, overcast, or hazy. Additionally, the one or more environmental sensors 92 can sense and determine whether it is raining, snowing, or foggy in the environment. The one or more environmental sensors 92 generate and communicate such environmental data about the ambient environmental conditions to the image processing module 80.

The image processing module 80 includes an object recognition module that determines one or more materials of the object 90 and/or identifies/classifies the object 90, as discussed in further detail below. The image processing module 80 also includes a distance determination module 86 that determines a distance from the 3D vision system 10 to the object 90, as discussed in further detail below. The image processing module 80 also includes a velocity determination module 88 that determines a velocity of the object 90 relative to the 3D vision system 10. While the example embodiment of FIG. 8 includes three modules 84, 86, and 88, in other embodiments one or more of the modules 84, 86, and 88 can be omitted from the 3D vision system 10. For example, in some embodiments the image processing module 80 may only include the object recognition module 84 and the distance determination module 86. In other embodiments, the image processing module 80 may only include the distance determination module 86 and the velocity determination module 88. In other embodiments, the image processing module 80 may only include one of the modules 84, 86, 88, such as only the object recognition module 84.

The image processing module 80 is also in communication with a database 82 that includes a library of expected polarization signatures of black-body emissions from different materials and objects at different ambient temperatures. For example, the database 82 can store expected polarization signatures of black-body emissions from wood, iron, aluminum, and different types of plastics at different ambient temperatures. The object recognition module 84 of the image processing module 80 can then access the library and compare the black-body emission polarization data received by the hyperspectral infrared camera 12 for the object 90 at the current ambient temperature with the expected polarization signatures of black-body emissions stored in the library for different materials and objects at the current ambient temperature to determine one or more materials of the object 90.

In addition, the degree of polarization of the black-body emissions received from an object can be attenuated based on other matter, such as dust, rain, snow, etc., present in the environment between the object 90 and the hyperspectral infrared camera 12. As such, the image processing module 80 can detect environmental conditions using the one or more environmental sensors 92 and the object recognition module 84 can adjust the received polarization data and/or the expected polarization signatures from the library accordingly based on an expected or estimated amount attenuation due to the presence of other matter, such as dust, rain, snow, etc., in the environment to determine one or more materials of the object 90 based on the black-body emissions from the object, based on environmental data from the one or more environmental sensors 92, and based on the library stored in the database 82. In addition, the systems and methods of the present disclosure can be used in air and in water and haze mitigation can be used to filter out the effect of any matter present in the air or water.

The image processing module 80 is also in communication with an application module 94 that receives the information about the object 90 determined by the image processing module 80 and utilizes the information in a particular application. For example, the 3D vision system 10 may be installed in an autonomous vehicle and the application module 94 may include an autonomous vehicle navigation and control module that utilizes the information about the object 90 to navigate and control the autonomous vehicle. Additionally or alternatively, the application module 94 may be part of a vehicle safety and driver assistance systems, an object sorting system, an industrial application system, a robotics application system, a medical application system, a mineral detection system, or any other suitable application, system, or device configured to utilize information about an object 90, such as the materials of the object, identity/classification of the object, distance to the object, and/or relative velocity of the object, determined by the image processing module 80 based on the black-body emissions 81 from the object 90. For example, the application module 94 can generate output to a user to indicate an object or material detected or recognized by the image processing module 80. The application module 94 can also generate output to a user to indicate a distance to an object or material detected or recognized by the image processing module 80. The application module 94 can also generate output to a user to indicate a relative velocity of an object or material detected or recognized by the image processing module 80.

Figure 9:
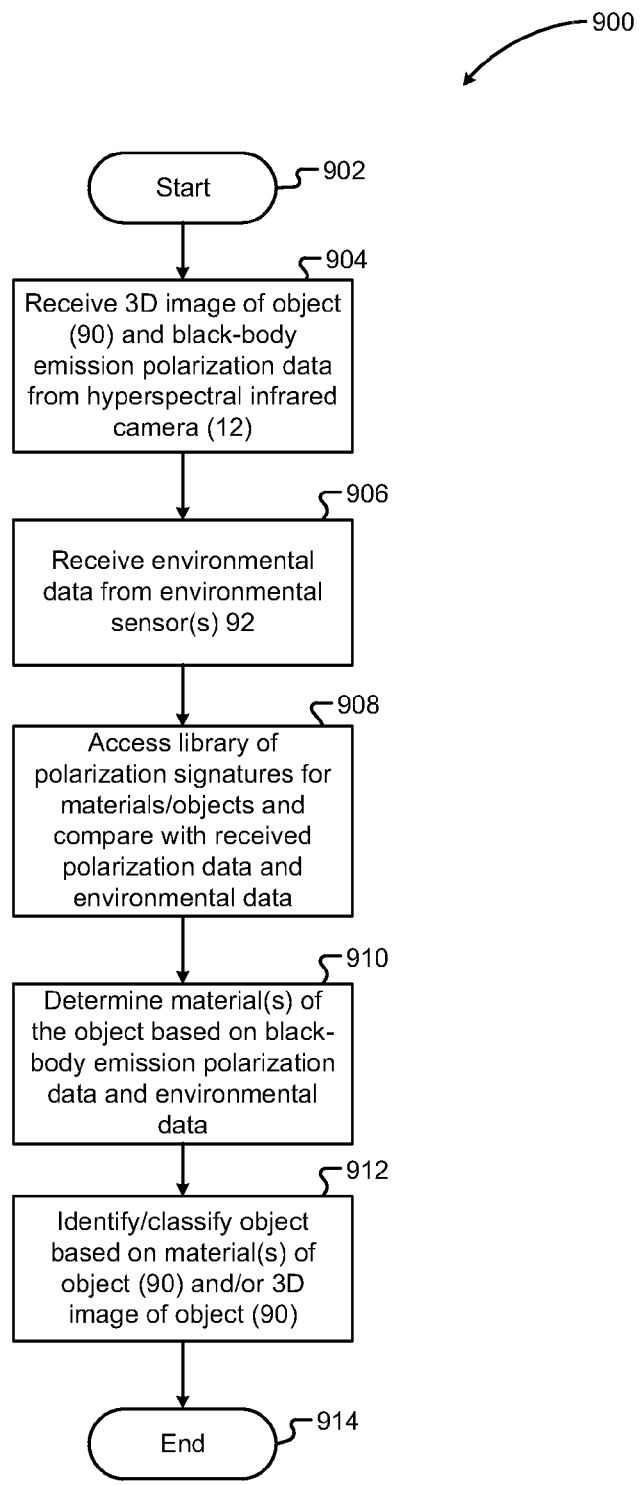
FIG. 9 is a flow diagram for material/object recognition according to the present disclosure.

With reference to FIG. 9, a process 900 for recognizing an object 90 or materials of an object 90 based on black-body emissions from the object 90 is shown. The process 900 is executed by the image processing module 80 and, in particular, the object recognition module 84 of the image processing module 80. The process starts at 902. At 904, the object recognition module 84 receives a 3D image of the object 90 and black-body emission polarization data from the hyperspectral infrared camera 12. The black-body emission polarization data indicates a type of polarization of the black-body emission from the object 90, such as circular or linear, and/or a degree of the polarization, i.e., the degree of circular polarization of the black-body emission from the object 90.

At 906, the object recognition module 84 receives environmental data from the one or more environmental sensors 92. As noted above, the one or more environmental sensors 92 detect information about the ambient conditions of the environment of the object 90 and the 3D image processing system 10, such as ambient temperature, ambient humidity, light characteristics of the ambient environment, such as whether it is day or night and whether it is sunny, overcast, or hazy, whether there is precipitation, such rain or snow in the environment, and whether it is dusty or foggy in the environment. In addition, the systems and methods of the present disclosure can be used in air and in water and haze mitigation can be used to filter out the effect of any matter present in the air or water.

At 908, the object recognition module 84 accesses the library of polarization signatures for materials/object stored in the database 82. The object recognition module 84 searches the library of polarization signatures for materials/objects having a similar polarization signature to the black-body emission polarization data for the object 90 received from the hyperspectral infrared camera 12.

At 910, the object recognition module 84 determines one or more materials of the object 90 based on finding a polarization signature from the library of polarization signatures that matches the black-body emission polarization data of the object 90 received from the hyperspectral infrared camera 12 based on the current ambient temperature of the environment. Further, as noted above, the object recognition module 84 can also adjust either the black-body emission polarization data or the polarization signature data from the library to account for other environmental conditions. For example, the black-body emission 81 from the object 90 may be attenuated in certain circumstances, such as when it is raining, snowy, foggy, humid, dusty, etc. As such, the object recognition module 84 can make adjustments to the data and/or the comparison to account for such attenuation of the black-body emission 81 from the object 90. In addition, the systems and methods of the present disclosure can be used in air and in water and haze mitigation can be used to filter out the effect of any matter present in the air or water. In this way, the object recognition module 84 determines one or more materials of the object 90 based on: the black-body polarization data received from the hyperspectral infrared camera; the environmental data from the one or more environmental sensors 92; and the polarization signatures of the polarization signature library stored in the database 82.

At 912, the object recognition module 84 identifies and/or classifies the object 90 based on the materials of the object and/or the 3/D image of the object 90. For example, at 912 the object recognition module 84 can classify the object as either a biological object or an abiological object. Additionally, the object recognition module 84 can compare the 3D image of the object, along with the determined materials of the object, to identify that the object is, for example, a human person, an animal, a vehicle, a roadside device, a fence, a telephone pole, a sign, a building, etc. As noted above, the image processing module 80 can output the information about the materials of the object and/or the classification or identification of the object to an application module 94 that can use the information to, for example, control an autonomous vehicle, a vehicle safety and driver assistance system, an object sorting system, an industrial application, a robotics application, a medical system application, or any other suitable application configured to utilize such information about the object 90. For example, in an autonomous vehicle application, the application module 94 can appropriately navigate and control an autonomous vehicle based on the identification of the object 90. For example, in the event the object is determined to be another vehicle in the path of the autonomous vehicle, the application module 94 can appropriately control and navigate the autonomous vehicle to avoid a collision with the other vehicle.

At 914, the process 900 ends. In some embodiments, step 912 may be omitted and the process 900 may end after determining the materials of the object at 910. Additionally or alternatively, the process 900 can loop back to 904 to start again. As noted above, the object recognition module 84 can communicate information regarding the recognized object 90 and/or the detected materials of an object 90 to an application module 94 that can utilize the object information for a number of different applications, systems, devices, and/or outputs.

Figure 10:
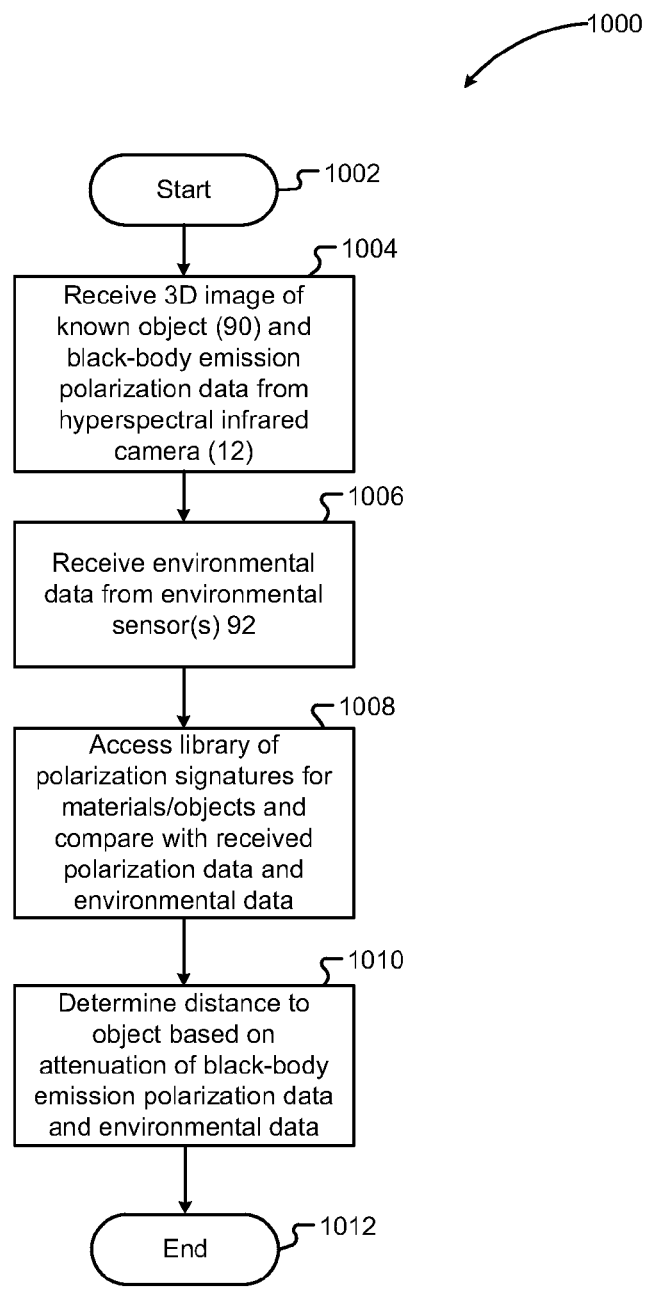
FIG. 10 is a flow diagram for distance detection to an object according to the present disclosure.

With reference to FIG. 10, a process 1000 for determining a distance to the object 90 based on black-body emissions from the object 90 is shown. The process 1000 is executed by the image processing module 80 and, in particular, the distance determination module 86 of the image processing module 80. The process starts at 1002. At 1004, the distance determination module 86 receives 3D image data of a known object 90 and black-body emission polarization data from the hyperspectral infrared camera 12. To perform the distance determination functionality, the materials of the object 90 are already known. For example, in an autonomous vehicle application, an application module 94 can determine that an object ahead of the autonomous vehicle is another vehicle based on communication with the vehicle and/or other image processing. In such case, the application module 94 can determine that the vehicle ahead of the autonomous vehicle is made, for example, of metal and glass materials.

At 1006, the distance determination module 86 receives environmental data from the one or more environmental sensors 92. As noted above, the one or more environmental sensors 92 detect information about the ambient conditions of the environment of the object 90 and the 3D image processing system 10, such as ambient temperature, ambient humidity, light characteristics of the ambient environment, such as whether it is day or night and whether it is sunny, overcast, or hazy, whether there is precipitation, such rain or snow in the environment, and whether it is dusty or foggy in the environment. In addition, the systems and methods of the present disclosure can be used in air and in water and haze mitigation can be used to filter out the effect of any matter present in the air or water.

At 1008, the distance determination module 86 accesses the library of polarization signatures for materials/object stored in the database 82. The distance determination module 86 searches the library of polarization signatures to retrieve the polarization signatures that are associated with the known materials of the object 90. For example, in the autonomous vehicle application, if the object 90 is determined to be another vehicle ahead of the autonomous vehicle that is made of metal and glass, the distance determination module 86 retrieves the polarization signatures from the library that are associated with metal and glass at the current ambient temperature indicated by the one or more environmental signatures 92.

At 1010, the distance determination module 86 compares the polarization data received from the known object 90 by the hyperspectral infrared camera 12 with the polarization signatures for the materials of the known object 90 retrieved from the library stored in the database 82. Black-body emissions traveling through materials in the atmosphere will be attenuated by the material in the atmosphere. For example, at a given temperature metal may emit black-body emissions having a polarization of x degrees. As the black-body emissions travel though the atmosphere having a given set of atmospheric conditions, the polarization may attenuate by y degrees per pile or per kilometer. The distance determination module 86 can compare the polarization data received from the known object 90 by the hyperspectral infrared camera with the polarization signature for the material of the known object to determine the amount of polarization attenuation that is present in the received polarization data. Once the amount of polarization attenuation is determined, e.g., z degrees of attenuation, the distance from the hyperspectral infrared camera 12 to the object 90 can be determined based on the starting polarization of x degrees, the rate of y degrees per mile or y degrees per kilometer, and the ending polarization of x-z degree, based on the z degrees of attenuation. In this way, the distance determination module 86 determines the distance to the object.

In addition, the distance determination module 86 can also adjust either the black-body emission polarization data or the polarization signature data from the library to account for other environmental conditions. For example, the black-body emission 81 from the object 90 may be further attenuated in certain circumstances based on additional materials present in the atmosphere, such as when it is raining, snowy, foggy, humid, dusty, etc. For example, the rate of attenuation can increase with the presence of additional material in the atmosphere, such as rain, snow, fog, humidity, dust, etc., As such, the distance determination module 86 can make adjustments to the data and/or the comparison to account for such attenuation of the black-body emission 81 from the object 90. In addition, the systems and methods of the present disclosure can be used in air and in water and haze mitigation can be used to filter out the effect of any matter present in the air or water. In this way, the distance determination module determines a distance to the known object 90 based on: the black-body polarization data received from the hyperspectral infrared camera; the environmental data from the one or more environmental sensors 92; and the polarization signatures of the polarization signature library stored in the database 82. The process 1000 ends at 1012. Additionally or alternatively, the process 1000 can loop back to 1004 to start again. As noted above, the distance determination module 86 can communicate information regarding the distance to the object 90 to an application module 94 that can utilize the distance information for a number of different applications, systems, devices, and/or outputs.

Figure 11:
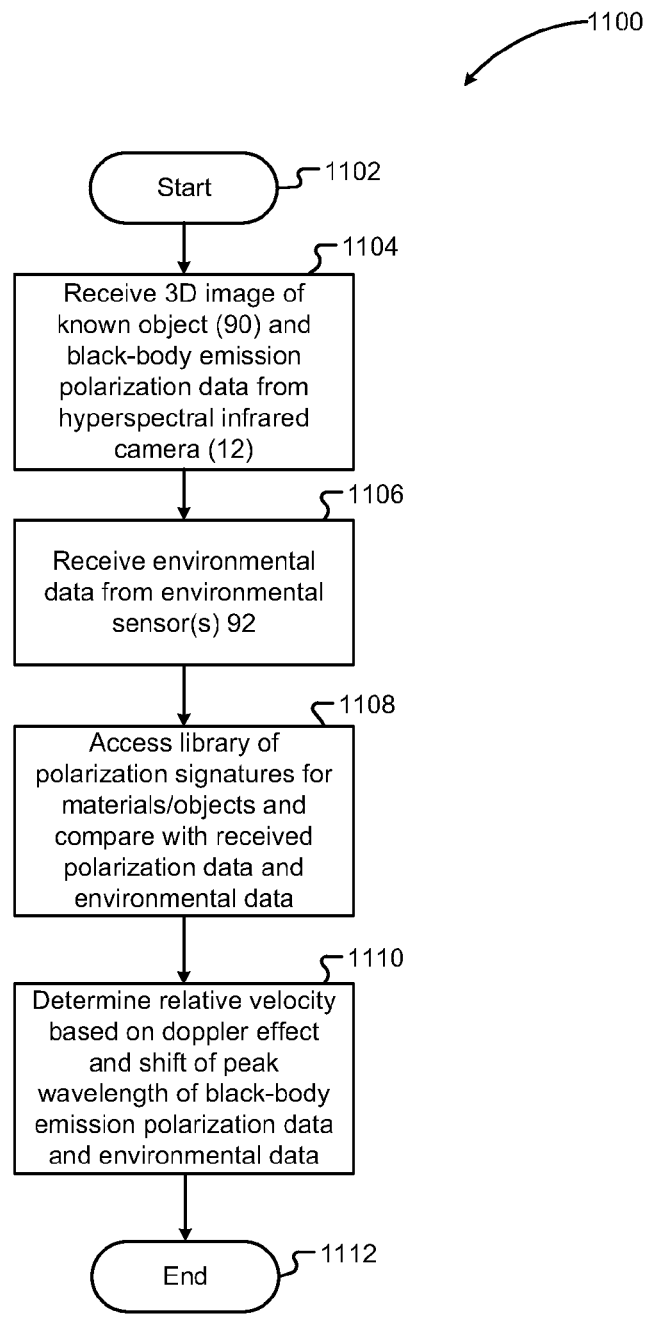
FIG. 11 is a flow diagram for determining a relative velocity of an object according to the present disclosure.

With reference to FIG. 11, a process 1100 for determining a relative velocity of the object 90 based on black-body emissions from the object 90 is shown. The process 1100 is executed by the image processing module 80 and, in particular, the velocity determination module 88 of the image processing module 80. The process starts at 1102. At 1104, the velocity determination module 88 receives 3D image data of a known object 90 and black-body emission polarization data from the hyperspectral infrared camera 12. To perform the velocity determination functionality, the materials of the object 90 are already known. For example, in an autonomous vehicle application, an application module 94 can determine that an object ahead of the autonomous vehicle is another vehicle based on communication with the vehicle and/or other image processing. In such case, the application module 94 can determine that the vehicle ahead of the autonomous vehicle is made, for example, of metal and glass materials.

At 1106, the velocity determination module 88 receives environmental data from the one or more environmental sensors 92. As noted above, the one or more environmental sensors 92 detect information about the ambient conditions of the environment of the object 90 and the 3D image processing system 10, such as ambient temperature, ambient humidity, light characteristics of the ambient environment, such as whether it is day or night and whether it is sunny, overcast, or hazy, whether there is precipitation, such rain or snow in the environment, and whether it is dusty or foggy in the environment. In addition, the systems and methods of the present disclosure can be used in air and in water and haze mitigation can be used to filter out the effect of any matter present in the air or water.

At 1108, the velocity determination module 88 accesses the library of polarization signatures for materials/object stored in the database 82. The velocity determination module 88 searches the library of polarization signatures to retrieve the polarization signatures that are associated with the known materials of the object 90. For example, in the autonomous vehicle application, if the object 90 is determined to be another vehicle ahead of the autonomous vehicle that is made of metal and glass, the distance determination module retrieves the polarization signatures from the library that are associated with metal and glass at the current ambient temperature indicated by the one or more environmental signatures 92.

At 1110, the velocity determination module 88 compares the polarization data received from the known object 90 by the hyperspectral infrared camera 12 with the polarization signatures for the materials of the known object 90 retrieved from the library stored in the database 82. Black-body emissions traveling from an object 90 that moving relative to the hyperspectral infrared camera 12 will have a shift in the peak wavelength of the black-body emissions due to a Doppler effect on the black-body emissions. For example, if the object 90 is moving relative to the hyperspectral infrared camera 12 in a direction towards the hyperspectral infrared camera 12, the peak wavelength of the black-body emissions will be shorter than if the object 90 was not moving relative to the hyperspectral infrared camera 12. Additionally, if the object 90 is moving relative to the hyperspectral infrared camera 12 in a direction away from the hyperspectral infrared camera 12, the peak wavelength of the black-body emissions will be shorter than if the object 90 was not moving relative to the hyperspectral infrared camera 12.

In this way, at 1110, the velocity determination module 88 compares the peak wavelength of the black-body emission data received from the object 90 with the hyperspectral infrared camera 12 with the peak wavelength indicated by the polarization signature information for the known materials of the known object 90 and determines whether there has been a shift in the peak wavelength of the black-body emission data received from the object 90, the velocity determination module 88 determines that the object is moving relative to the hyperspectral infrared camera 12. Based on the amount of the shift, the velocity determination module 88 can determine the amount of the relative velocity and whether the object 90 is moving towards or away from the hyperspectral infrared camera 12. For example, in the autonomous vehicle application discussed above, the velocity determination module 88 may determine that another vehicle ahead of the autonomous vehicle is moving away from the autonomous vehicle at a rate of, for example, 5 miles-per-hour or 5 kilometers-per-hour. As such, the velocity determination module 88 determines a relative velocity of the known object 90 based on: the black-body polarization data received from the hyperspectral infrared camera; the environmental data from the one or more environmental sensors 92; and the polarization signatures, including peak wavelength data, from the polarization signature library stored in the database 82. The process 1100 ends at 1112. Additionally or alternatively, the process 1100 can loop back to 1104 to start again. As noted above, the velocity determination module 88 can communicate information regarding the velocity of the object 90 to an application module 94 that can utilize the velocity information for a number of different applications, systems, devices, and/or outputs.

The systems and methods of the present disclosure can also be combined with other methods of material recognition. For example, certain objects, such as construction barrels on a roadway, for example, can be painted with a paint or material having a specific polarization that emits black-body emissions having a particular signature. In such case, the 3D vision system 10 of the present disclosure, including the object recognition module 84 of the image processing module 80, can quickly determine that certain objects are, for example, construction barrels on the roadway based on the black-body emissions from the painted construction barrels. In addition, the distance determination module 86 can determine the distance to the painted construction barrels. The image processing module 80 can communicate information about the distances/locations of the construction barrels to the application module 94, which can, for example, control and navigate an autonomous vehicle appropriately to avoid the construction barrels.

Figure 12:
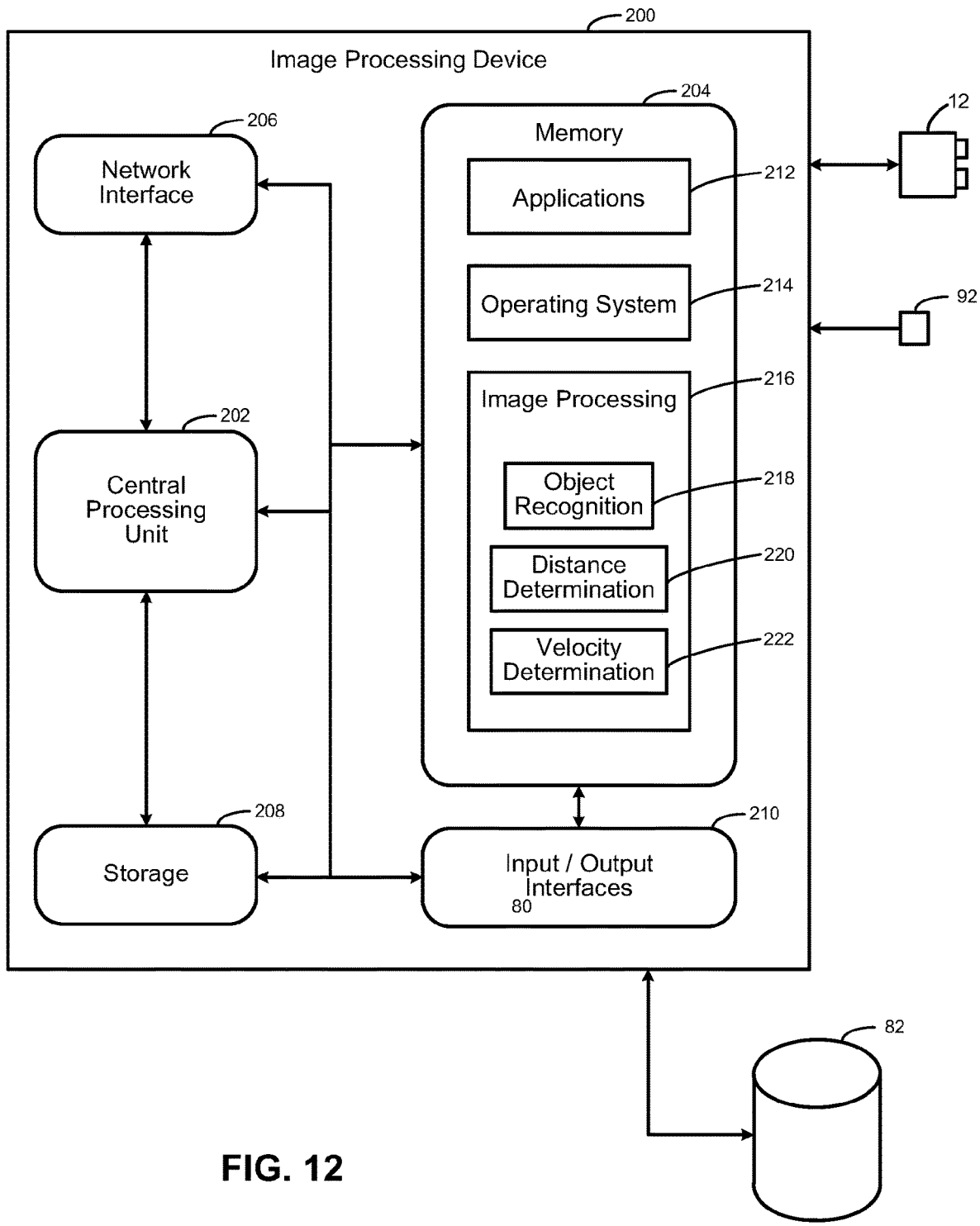
FIG. 12 is a block diagram of an image processing device according to the present disclosure.

With reference to FIG. 12, an image processing device 200 is shown and includes a central processing unit (CPU) 202, memory 204, a network interface 206, volatile storage 208, and input/output interfaces 210. The memory 204 stores executable code for applications 212 and for an operating system (OS) 214. The memory 204 also stores executable image processing code 216 for the image processing module 80, executable object recognition code for the object recognition module 84, executable distance determination code 220 for the distance determination module 86, and executable velocity determination code 222 for the velocity determination module 94. In this way, the software components utilized by the 3D vision systems and methods of the present disclosure are compiled into binary distribution files that are executed by the CPU 202 of an image processing device 200. The OS 214 handles coordinating the input/output of the hardware resources and executing the system's binary executable files, including the image processing code 216, the object recognition code 218, the distance determination code 220, and the velocity determination code 222. The image processing device 200 can be a physical device with dedicated hardware or can be a virtual machine that shares a part of dedicated hardware resources. As shown in FIG. 12, the image processing device 200 is in communication with the hyperspectral infrared camera 12, the one or more environmental sensors 92, and the database 82, as discussed in detail above.

The systems and methods of the present disclosure can be used for imaging and identification of minerals using reflected and scattered light from the minerals. In particular, the chirality of the facets and the grain shape of minerals changes the polarization of scattered and reflected light in UV, visible, near-infrared, short-wavelength infrared, mid-infrared, infrared, far-infrared, and terahertz parts of the spectrum. Because of the variation in reflectivity from different types of minerals allows the image processing module 80 and image processing device 200 to receive scattered and reflected light from minerals from the hyperspectral infrared camera 12 and to identify the minerals based on the polarization of the received emissions from the minerals.

In other embodiments, the systems and methods of the present disclosure can be used with one or more circularly polarized emitters that emit circularly polarized light detected by the hyperspectral infrared camera 12. For example, the one or more circularly polarized emitters can emit light that is circularly polarized to transmit and communicate information from the one or more circularly polarized emitters to the image processing module 80 and/or image processing device 200 through the hyperspectral infrared camera 12. More specifically, a light emitter can include two circularly polarized light emitters configured such that one of the emitters is a helical left emitter and the other is a helical right emitter. In this way the two circularly polarized emitters emit light having opposing circular polarizations. The two circularly polarized light emitters are then configured to synchronously change the intensity of light emitted by each emitter such the total intensity of the light emitted from the two emitters remains constant. In other words, if the intensity of light emitted from one of the emitters is increased, then the intensity of light emitted from the other emitter is decreased by a commensurate amount so that the total intensity of combined light emitted from the two emitters remains constant. At the same time, although the intensity of the combined light emitted remains constant, the resulting circular polarization of the combined light emitted changes based on the increase or decrease of the intensity from the two emitters having different circular polarizations. In other words, the combined light emitted from the emitters will have a circular polarization that is more left or more right, depending on the combination of intensities of the light emitted from the two circularly polarized emitters. Different polarizations of the combined light emitted from the two emitters can then be used to encode messages that are communicated from the at least two emitters to the image processing module 80 and/or image processing device 200 through the hyperspectral infrared camera 12. For further example, the degree of circular polarization can be used to code and communication binary information, i.e., bits of "0" or "1," and/or non-binary information, such as 0-1-2 or 0-1-2-3, etc., with the coding being based on the polarization rotation according to a predetermined protocol. The predetermined protocol, for example, can include a specification that maps bits of information, e.g., zeros and ones in a binary information system, to particular corresponding polarizations. Because the circularly polarized light can have a polarization of any number of degrees, any other numeral systems can be used for encoding information. In other words, binary, octal, or hexadecimal numeral systems can be used, or a numeral system using any other base, such as base-10, etc., can be used.

In an autonomous vehicle setting and application, the at least two emitters could be installed at a location, such as an intersection, and communicate information about the intersection to an image processing module 80 and/or image processing device 200 having a hyperspectral infrared camera 12 installed in a vehicle. The information about the intersection could include, for example, information about traffic signals in the intersection, information about vehicles in or approaching the intersection, information about objects in or approaching the intersection, such as pedestrians, bicyclists, micromobility vehicles, etc., and/or any other information relevant to the location.

Figure 13:
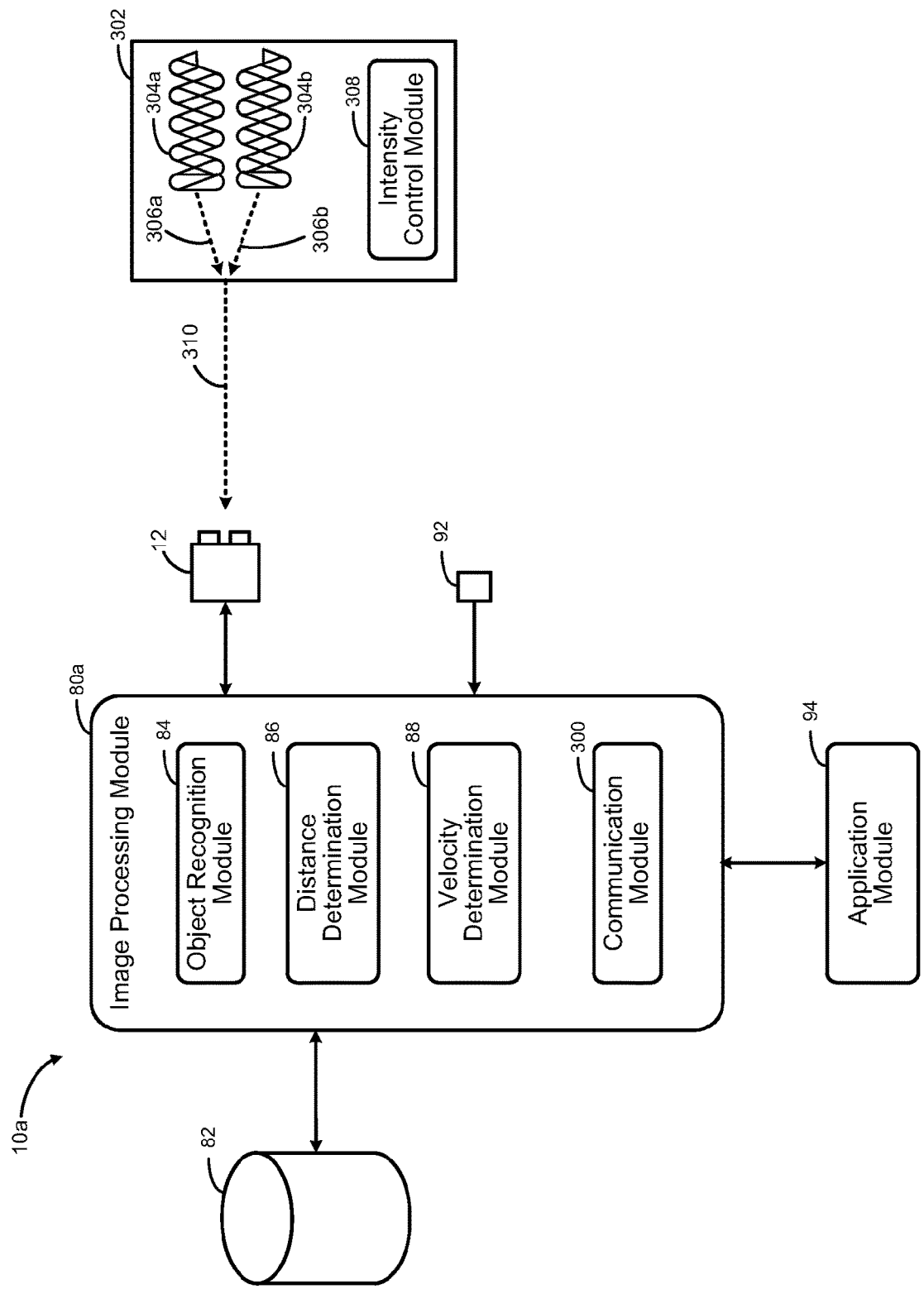
FIG. 13 is a functional block diagram of another image processing module and a light emitter having circularly polarized emitters according to the present disclosure.

With reference to FIG. 13, a functional block diagram of another embodiment of 3D vision system 10a according to the present disclosure is shown. The 3D vision system 10a shown in FIG. 13 is similar to the 3D vision system 10 shown in FIG. 8 and discussed above, except that the 3D vision system 10a shown in FIG. 13 includes an image processing module 80a that additionally includes a communication module 300. The communication module 300 is configured to process image information and determine information communicated to the image processing module 80a from a light emitter 302.

The light emitter 302 includes at least two circularly polarized emitters 304a, 304b that emit circularly polarized light 306a, 306b. The circularly polarized emitters 304a, 304b can be configured to emit circularly polarized light having opposite polarization. For example, a first circularly polarized emitter 304a can be a helical left emitter that emits light 306a that is circularly polarized left and a second circularly polarized emitter 304b can be a helical right emitter that emits light 306b that is circularly polarized right. In this way the two circularly polarized emitters 304a, 304b emit light 306a, 306b having opposing circular polarizations. The light emitter 302 also include a light intensity control module 308 that controls the intensity of the light 306a, 306b emitted from each of the circularly polarized light emitters 304a, 304b. The light intensity control module 308 is configured to synchronously change the intensity of the light 306a, 306b emitted by each of the circularly polarized light emitters 304a, 304b such that the total intensity of the combined light 310 emitted from the light emitter 302 remains constant. In other words, when the light intensity control module 308 increases the intensity of light 306a emitted from circularly polarized light emitter 304a, then the intensity control module 308 also decreases the intensity of the light 306*b* emitted from circularly polarized light emitter 304*b* by a commensurate amount, and vice versa, so that the total intensity of the combined light 310 emitted from the light emitter 302 remains constant. At the same time, although the intensity of the combined light 310 emitted from the light emitter 302 remains constant, the resulting circular polarization of the combined light 310 emitted changes based on the increase or decrease of the intensity from each of the two circularly polarized light emitters 304*a*, 304*b*. In other words, the combined light 310 emitted from the circularly polarized light emitters 304*a*, 304*b* will have a circular polarization that is more left or more right, depending on the combination of intensities of the light 306*a*, 306*b* emitted from each the two circularly polarized light emitters 304*a*, 304*b*.

The intensity control module 308 can control the intensities of the light 306*a*, 306*b* emitted from the circularly polarized light emitters 304*a*, 304*b* to emit the combined light 310 for a predetermined time interval with a polarization corresponding to a particular bit of information. For example, using a binary numeral system, transmitting combined light 310 having a polarization within a first range can represent a "0" while transmitting combined light 310 having a polarization within a second range can represent a "1." While a binary numeral system is used as an example having two polarization ranges, any other numeral system can be used. For example, in a base-10 numeral system, ten different polarization ranges can be used to represent the ten numerals in the base-10 numeral system. Alternatively, in a hexadecimal or base-16 numeral system, sixteen different polarization ranges can be used to represent the sixteen numerals in the base-16 numeral system. Each bit of information can be emitted with the combined light 310 having a controlled polarization within the appropriate polarization range corresponding to the bit being communicated for a predetermined time period. The intensity control module 308 then moves to the next bit and controls the intensities of the circularly polarized light emitters 304*a*, 304*b* to emit combined light 310 having a polarization with the range corresponding to the next bit of information for the next predetermined time period. In this way, a series of information bits is communicated from the light emitter 302.

The combined light 310 is received and detected by the hyperspectral infrared camera 12. The communication module 300 of the image processing module 80*a* detects the polarization of each bit of information in the series of information bits. The communication module 300 compares the polarization of each information bit with the polarization ranges being used for communication to identify the numerical information of the information bit. For example, with a binary numeral system the communication module 300 compares the polarization with the two polarization ranges to determine whether the information bit represented by the combined light 310 is representing a "0" or a "1." As noted above, while a binary numeral system is used as an example, other numeral systems having other bases can be used.

Similar to the embodiment described above with respect to FIG. 8, The image processing module 80*a* is in communication with an application module 94 that receives the information communicated from the light emitter 302 and received by the communication module 300 and utilizes the information in a particular application. For example, the 3D vision system 10*a* may be installed in an autonomous vehicle and the application module 94 may include an autonomous vehicle navigation and control module that utilizes the information communicated from the light emitter 302 to navigate and control the autonomous vehicle. As noted above, the information communicated from the light emitter 302 can include information about an intersection 320, such as information about traffic signals in or near the intersection, information about other vehicles in or approaching the intersection, information about objects in or approaching the intersection, such as pedestrians, bicyclists, micromobility vehicles, etc., and/or any other information relevant to the location. Additionally or alternatively, the application module 94 may be part of a vehicle safety and driver assistance systems, an object sorting system, an industrial application system, a robotics application system, a medical application system, a mineral detection system, or any other suitable application, system, or device configured to utilize the information communicated from the light emitter 302 in the particular application, system, and/or device. Additionally, the application module 94 can generate output to a user to indicate the information communicated from the light emitter 302 to the image processing module 80*a*.

Figure 14:
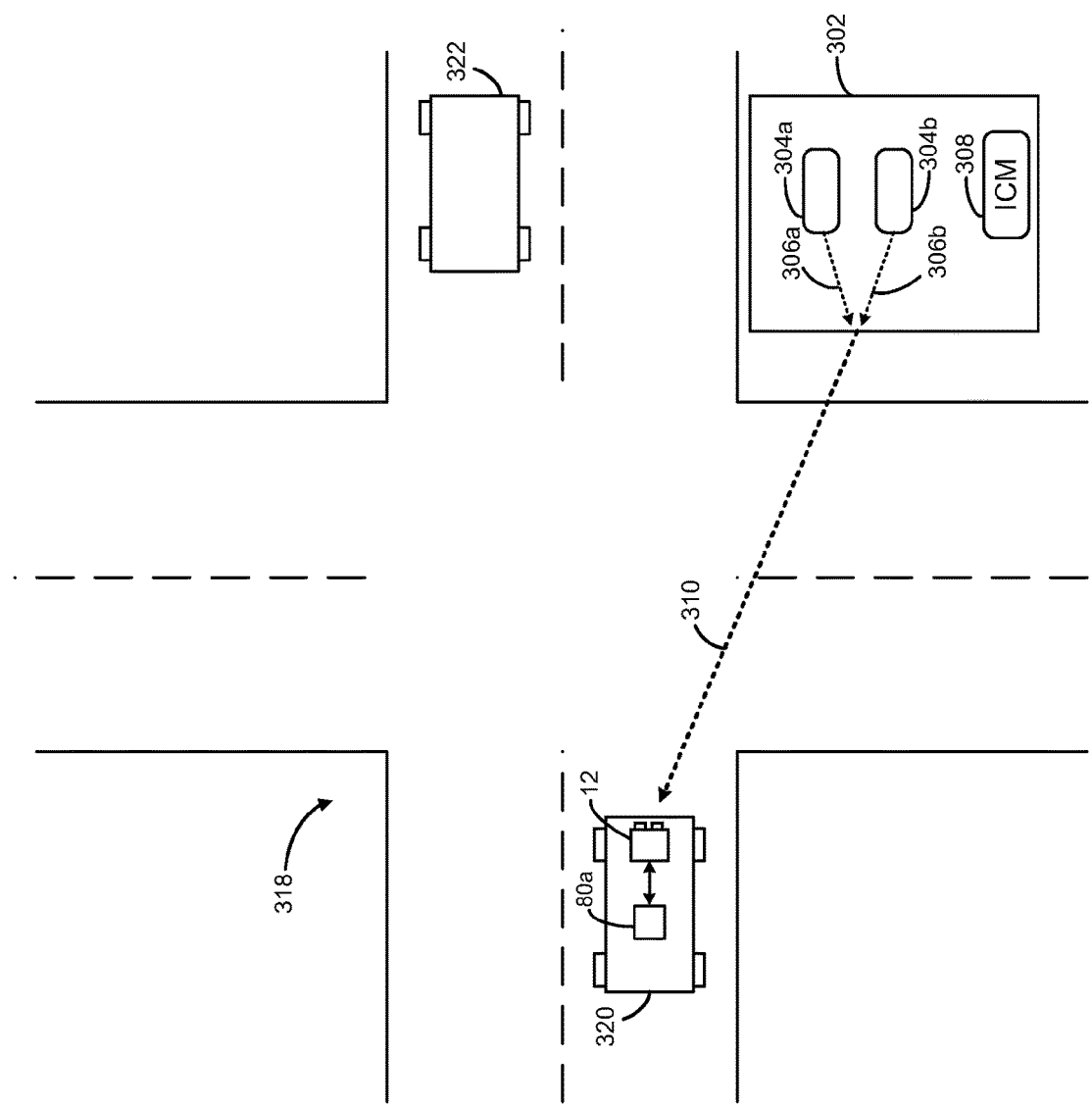
FIG. 14 is a functional block diagram of an image processing module installed in a vehicle and a light emitter having circularly polarized emitters located at an intersection according to the present disclosure.

With reference to FIG. 14, the light emitter 302 with circularly polarized light emitters 304*a*, 304*b* is shown installed and located at a vehicle intersection 318 of a roadway. In addition, a vehicle 320 equipped with a hyperspectral infrared camera 12 and image processing module 80*a* is shown approaching the intersection 318. As discussed above, the light emitter 302 emits the combined light 310, which is sensed and received by the hyperspectral infrared camera 12 of the vehicle 320. As further discussed above, the combined light 310 is polarized to encode bits of information to communicate information about the intersection, for example, to the communication module 300 of the image processing module 80*a* of the vehicle 320. For example, the light emitter 302 can communicate information about the intersection 318 to the 3D vision system 10*a* and image processing module 80*a* installed in the vehicle 320. The information about the intersection 320 can include, for example, information about traffic signals in or near the intersection 320, information about other vehicles 322 in or approaching the intersection 320, information about objects in or approaching the intersection 320, such as pedestrians, bicyclists, micromobility vehicles, etc., and/or any other information relevant to the location.

Bright Circularly Polarized Black-Body Radiation from Twisted Filaments

Circularly polarized black-body radiation from twisted filaments is now discussed in further detail. For example, the circularly polarized light emitters 304*a*, 304*b* of the light emitter 302 described above can include twisted filaments, as described below.

Spontaneous emission of circularly polarized light (CPL) from molecules and nanostructures can reduce noise and power consumption of photonics, information, and biomedical devices. However, the CPL emitters with chiral molecular orbitals have difficulties combining high brightness and strong polarization rotation due to quantum and symmetry restrictions in limited spectral diapasons. Plasmonic and dielectric metamaterials can strongly modify incident or spontaneous radiation from the emitter offering both spectral tunability and strong polarization rotation, but they are also known for high optical losses. Thermal radiation from twisted filaments of carbon nanotubes displays both high brightness and strong circular polarization. The direction of polarization rotation and handedness of emitted photons is directly related to the helicity of filaments. With an external voltage as low as 4 V, the twisted carbon filaments emit omnidirectional CPL tunable across a range of 3700 nm. The radiative brightness exceeds 4.5 W/cm2, which is 100 times stronger than conventional photo- and electroluminescent CPL sources. The polarization anisotropy factors of CPL reach as high as 0.10, exceeding that of typical CPL sources by 10 to 104 times. Electromagnetic simulations and chirality correlations indicate that the circular polarization originates from geometry-determined and temperature-dependent blackbody radiation. Bridging chiral photonics and classical thermodynamics, bright tunable chiral emitters can be fabricated and used for visible and infrared wavelengths.

Elliptical and circular polarization of light can be easily accomplished with linear polarizers and quarter-wave plates in the light path. However, low-power displays, holographic projectors, robotic perception, information encryption, through-space communication, etc. require at-source CPL emitters that have minimal angular dependence and high brightness. These technological needs stimulate the rapid development of nanometer-scale photonics and chiral photo- and electroluminescent materials. Prior studies on plasmonic and dielectric metamaterials have shown that their chirality strongly influences the circular polarization of incident beams and the thermal radiation (TR). Particularly relevant are periodic photonic crystals of different types that exhibited optical activity in the infrared part of the spectrum. The polarization rotation in planar meta-structured optical media can be comparable to quarter waveplates, but the well-known trade-off of such devices is high optical losses and strong angular dependence on the polarized light. Even for the best-case scenarios the brightness of CPL emission was reported to be lower than 0.4 W/cm$^2$, as shown Table 2 below.

Many efforts have been invested in the development of chiral materials maximizing their light emission anisotropy factor, $g_{em}$, characterizing the polarization purity of CPL emission. Also known as glum for luminescent emitters, the typical values of $g_{em}$ are between $10^{-5}$ and $10^{-2}$ for most of these materials. High $g_{em}$ has been reported for liquid crystals, chiral lanthanide complexes, and photonic crystals, but the aerial brightness, B, for these emitters is less than $10^{-2}$ W/cm$^2$, as shown in Table 2 below. The $g_{em}$ for infrared part IR of the spectrum through-space communication and other technologies are rarely reported and do not exceed the values shown in Table 2 below. Reaching desirable $g_{em}$-B combinations for light-emitting diodes operating in IR becomes more difficult than in the visible range due to rapid vibronic recombination of charge carriers across narrow energy gaps that are superimposed onto restrictions related to the symmetry of the emitting states. The necessity of low input voltage and wide real-time spectral modulations further exacerbate the challenge.

Figure 15:
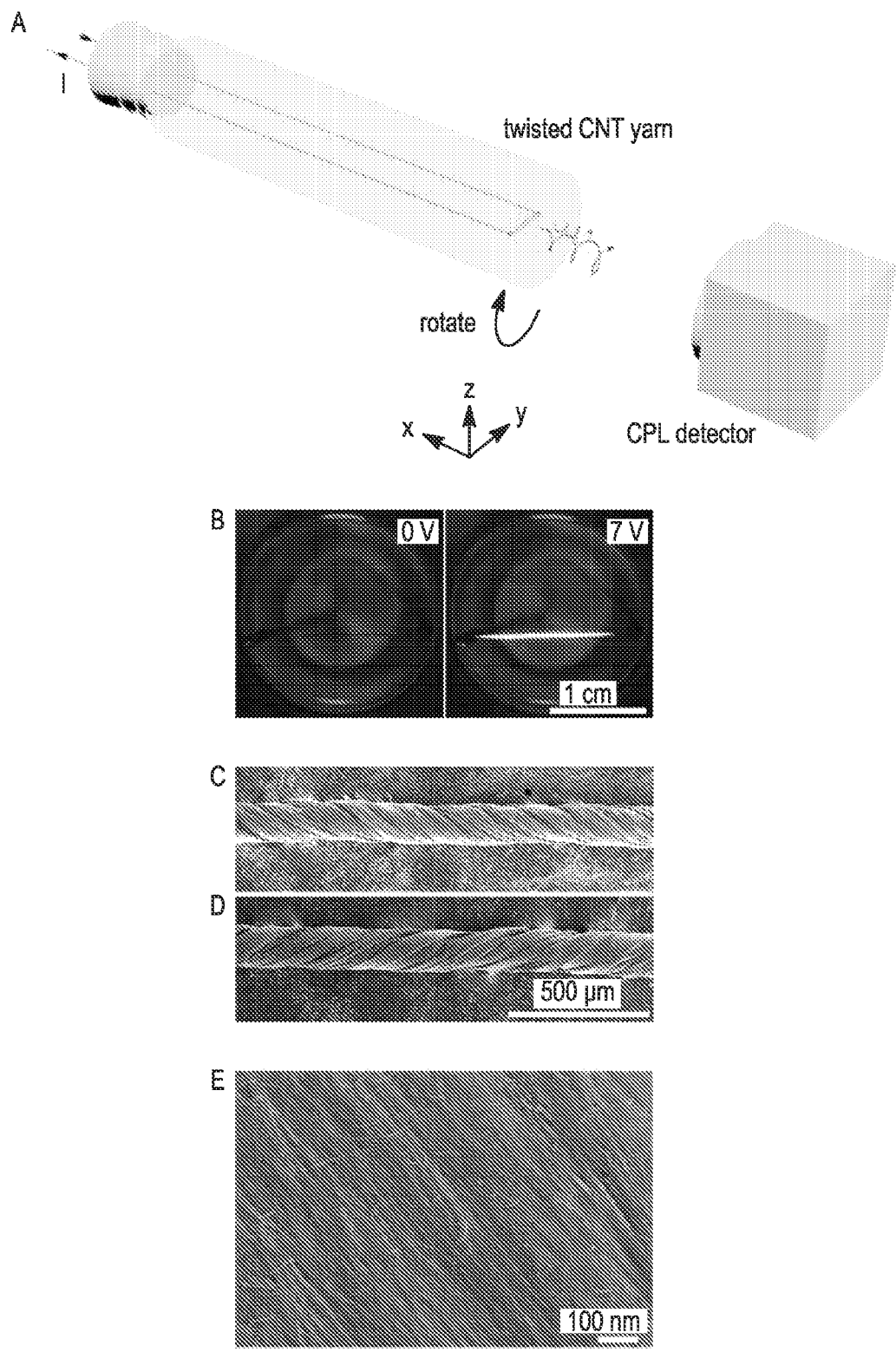
FIG. 15 illustrates circularly polarized twisted filaments and black body emission of the circularly polarized light from twisted filaments according to the present disclosure.
Figure 15:
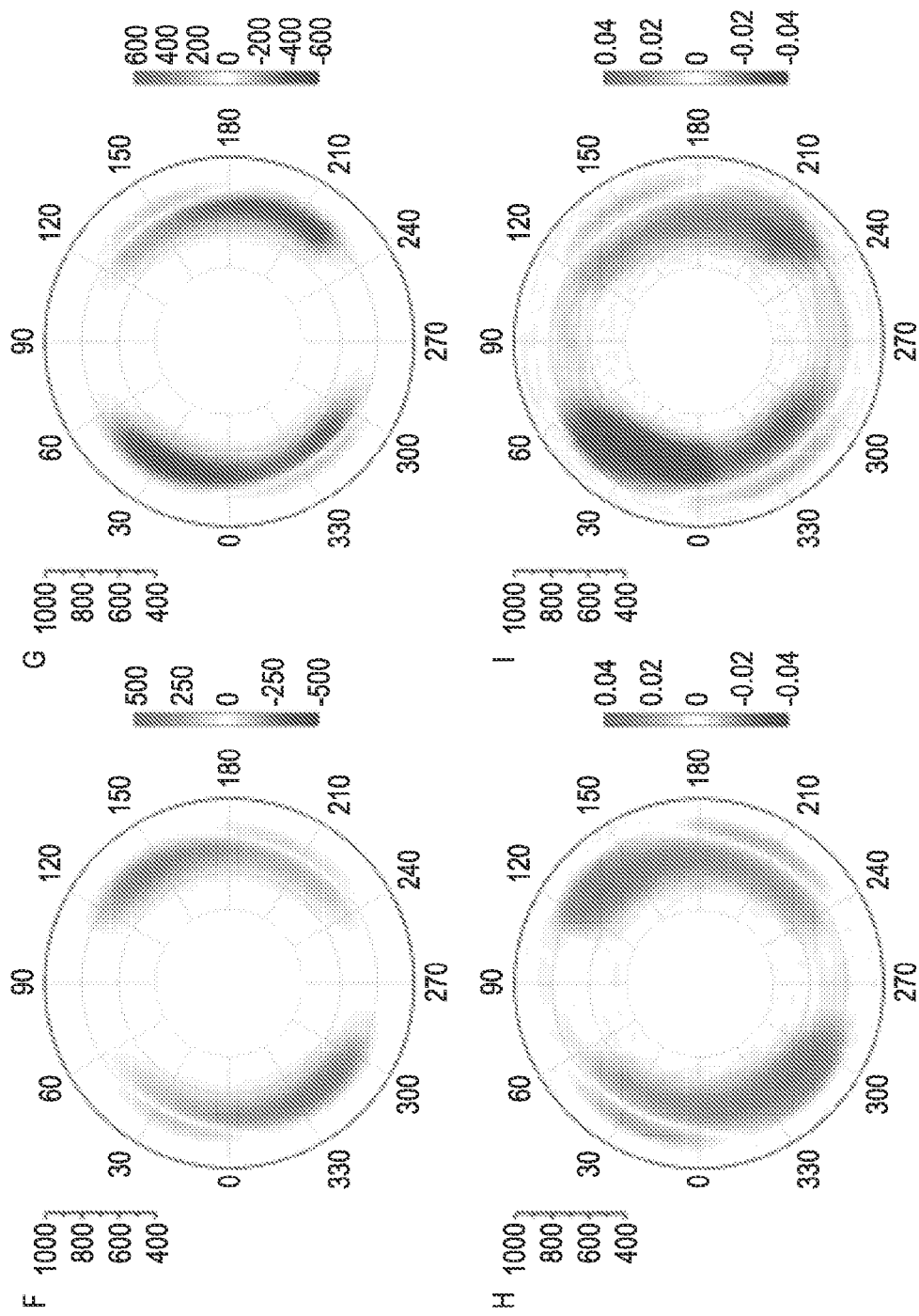
Figure 15:
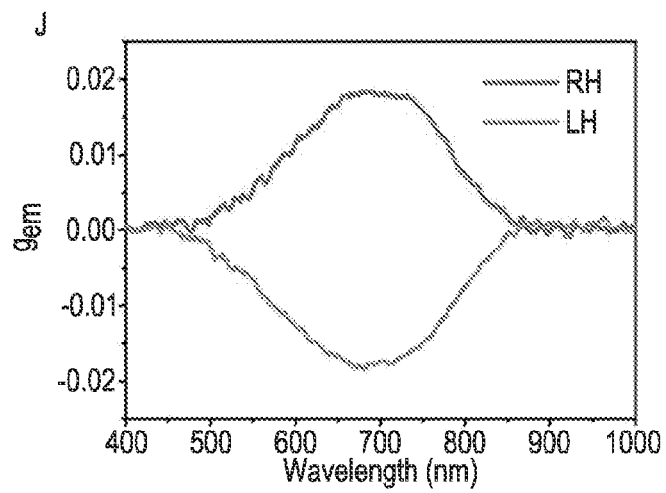
Figure 18:
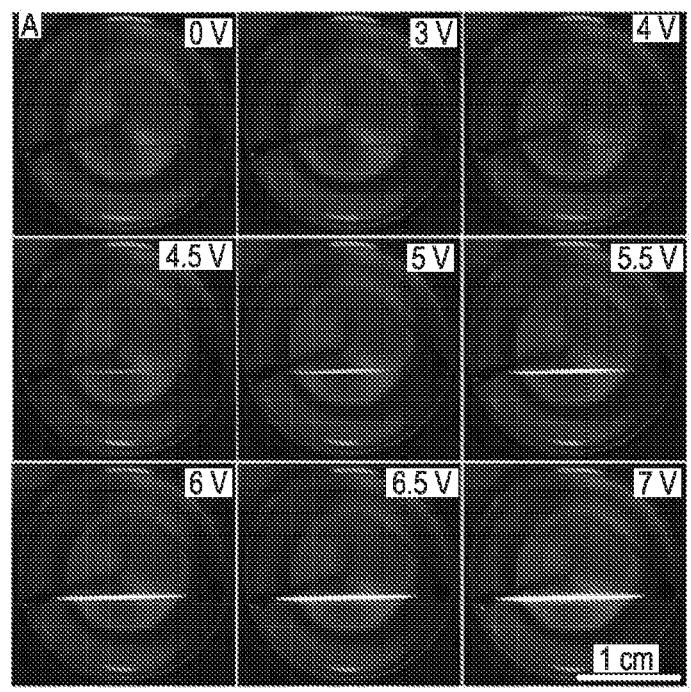
FIG. 18 illustrates thermal emitters of twisted carbon nanotube yarns according to the present disclosure.
Figure 18:
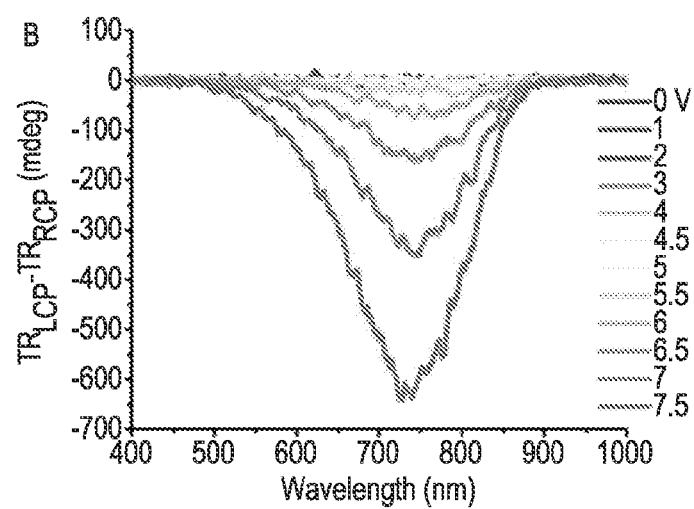
Figure 18:
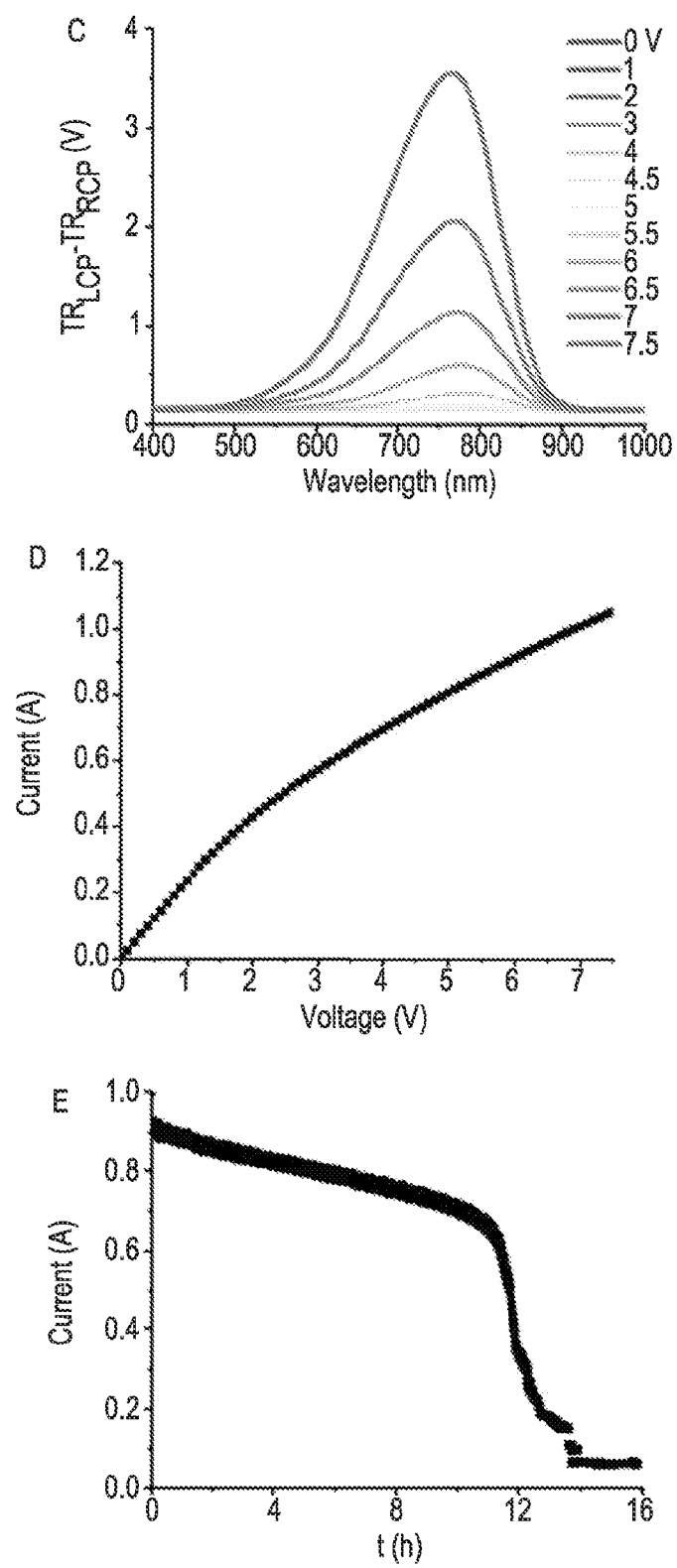
Figure 19:
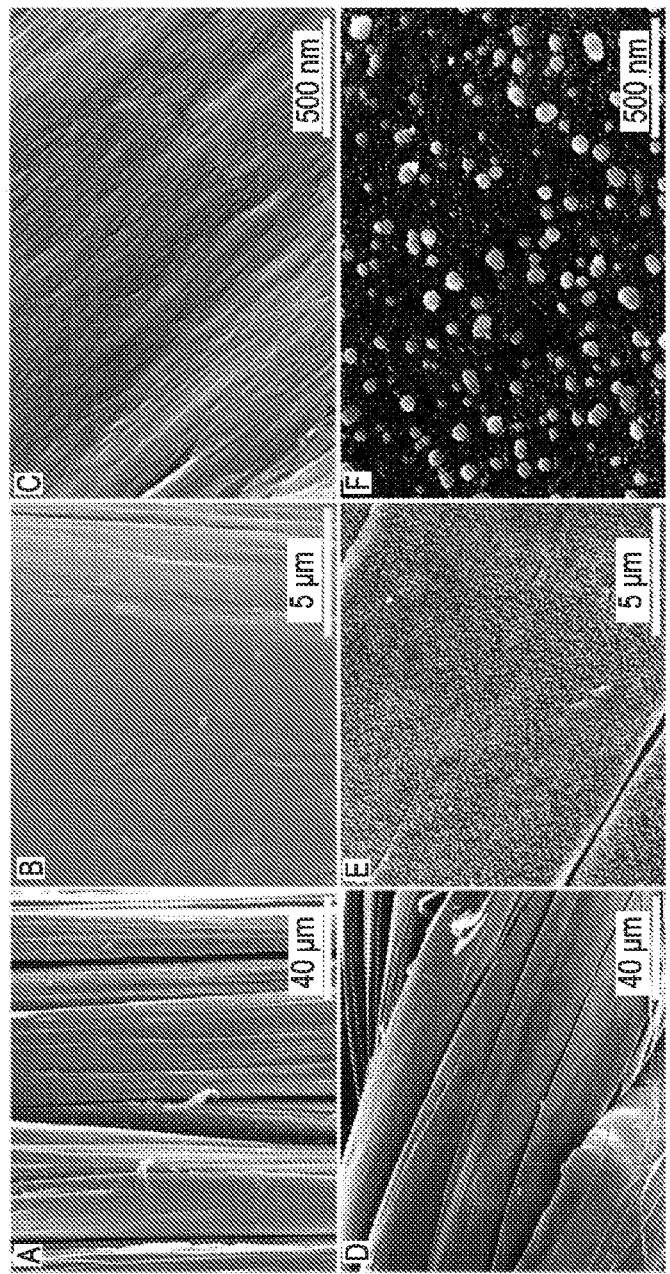
FIG. 19 illustrates structural variation during the working conditions according to the present disclosure.
Figure 19:
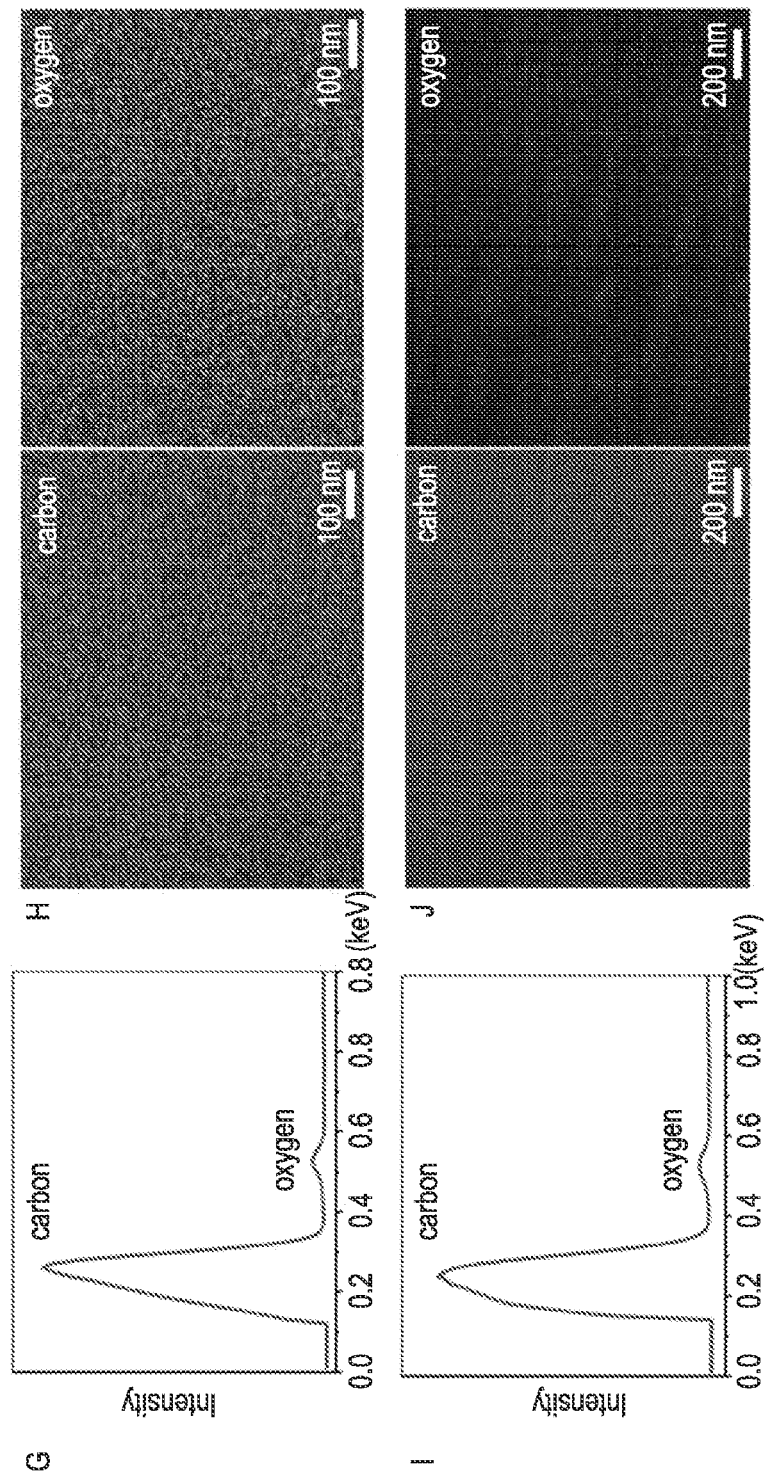

Considering the polarization-brightness conundrum of the CPL emitters, the symmetry and lifetime limitations can be relaxed for the continuum of emitting states present, for example in black body radiation, as shown at section A of FIG. 15. Here, twisted filaments of carbon nanotubes (CNTs) generate CPL with B=4.5 W/cm$^2$ and $g_{em}$=0.10 operating as circularly polarized black body emitters. They produce light beams with monopolar broadband polarization across 3700 nm wavelength window. The circularity of the emitted light is dependent on the left-/right-handed (LH/RH) twist of the CNT filaments with a pitch varying between 150 and 350 μm (sections C and D of FIG. 15), which are then connected to two electrodes of copper wires in transparent vials filled with high-purity nitrogen to avoid CNT oxidation during the charging and heating process. With a threshold voltage ~4 V (FIG. 18, section D, the filament radiates in the visible range becoming brilliant beyond 6 V (section B of FIG. 15 and FIG. 18, sections A and C). They continue to operate with high brilliance in the visible range for at least 10 h (FIG. 18, section E, and FIG. 19). Black body emitters with CPL at 1550 nm, and voltage at smaller than 6V, at 4.5 V have been operated for multiple hours.

Two peaks of the thermal radiation (TR) in the visual region at 720 and 770 nm (FIG. 20) are convenient for detailed experimental characterization of the black body emitters. These peaks display the same radiation intensities (FIG. 21) and polarization degrees (42%, FIG. 22) in all directions around the long axis of CNT yarns, as shown in section E of FIG. 15. TR was recorded at 720-730 nm for left- and right-handed circular polarization (LCP and RCP) and $TR_{LCP}$–$TR_{RCP}$, showed rapidly increased TR intensities under the progressive increase of voltages (FIG. 18, section B). Considering the presence of linear effect from filament orientations (FIG. 22), $TR_{LCP}$–$TR_{RCP}$ spectra were collected under various rotation angles in the plane parallel to the director, i.e., y-z plane shown in section A of FIG. 15. The periodic dependence between the maxima of $TR_{LCP}$–$TR_{RCP}$ with the rotation angles of filaments remains the same sign of circular polarization effects. RH and LH CNT filaments have nearly perfect mirror-image dependence between the $TR_{LCP}$–$TR_{RCP}$ intensities and angle distributions, i.e., positive and negative peaks for RH and LH filaments, respectively, (section F-I of FIG. 15), indicating RH and LH filaments respectively emit more LCP and RCP during the TR process. Averaging all the rotation angles reveals RH and LH filaments have opposite $TR_{LCP}$–$TR_{RCP}$ peaks and anisotropy factors, $g_{em}=2\times(TR_{LCP}-TR_{RCP})/(TR_{LCP}+TR_{RCP})$, with a maximum amplitude of 0.019 at 700 nm (section J of FIG. 15 and FIG. 23).

Figure 24:
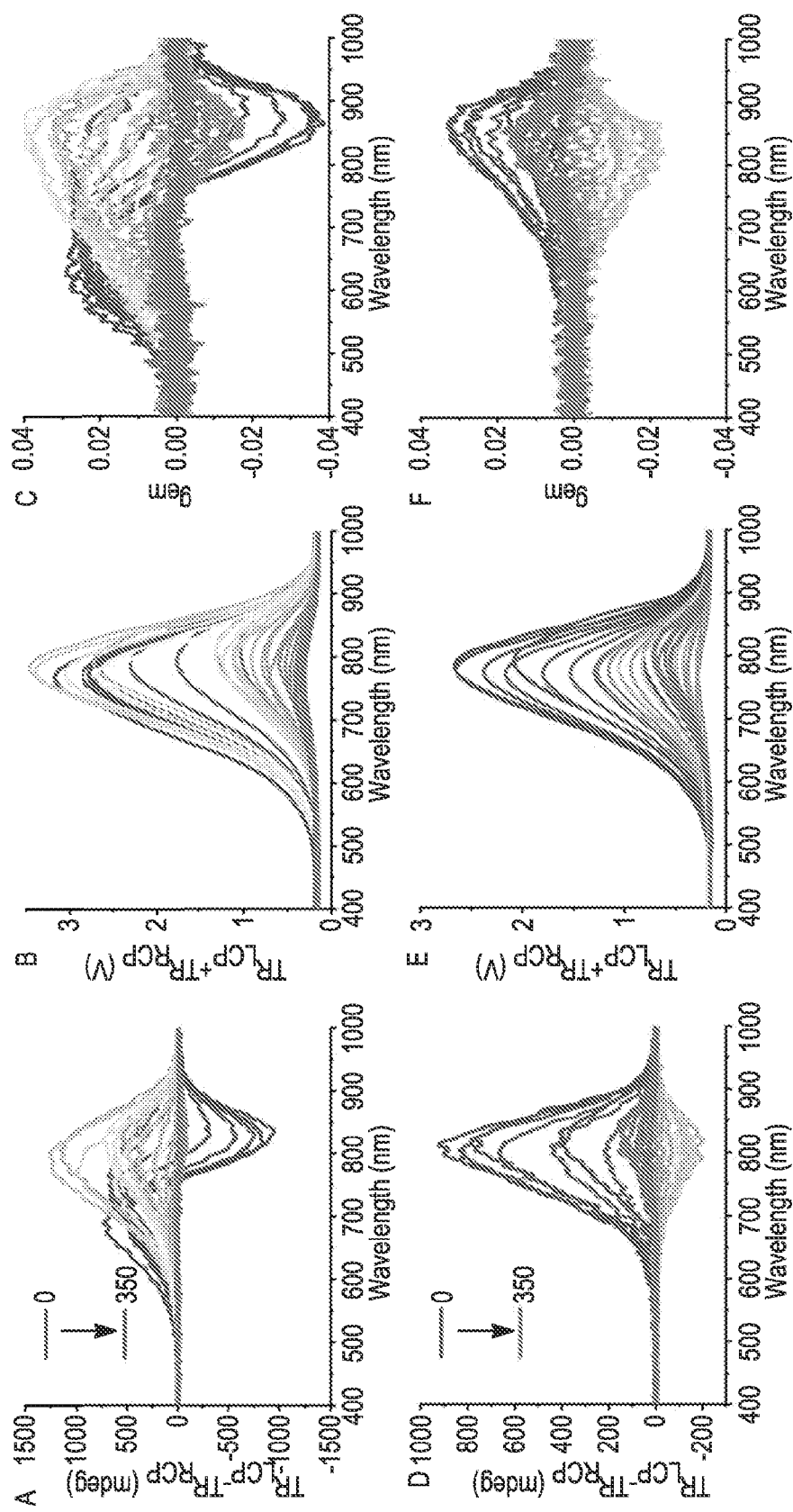
FIG. 24 illustrates circularly polarized thermal radiation for twisted tungsten wires according to the present disclosure.
Figure 24:
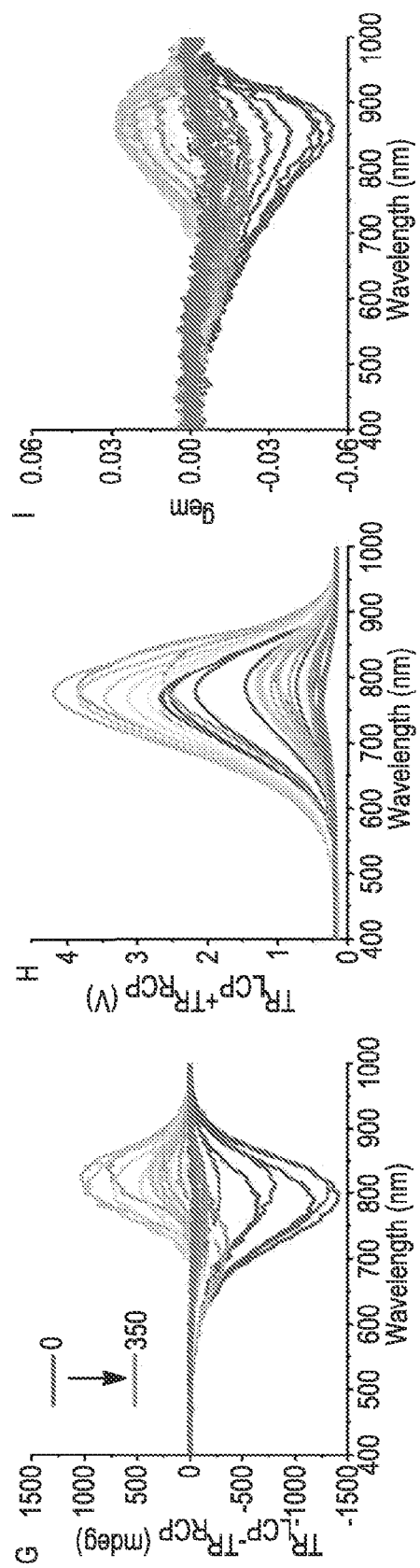
Figure 25:
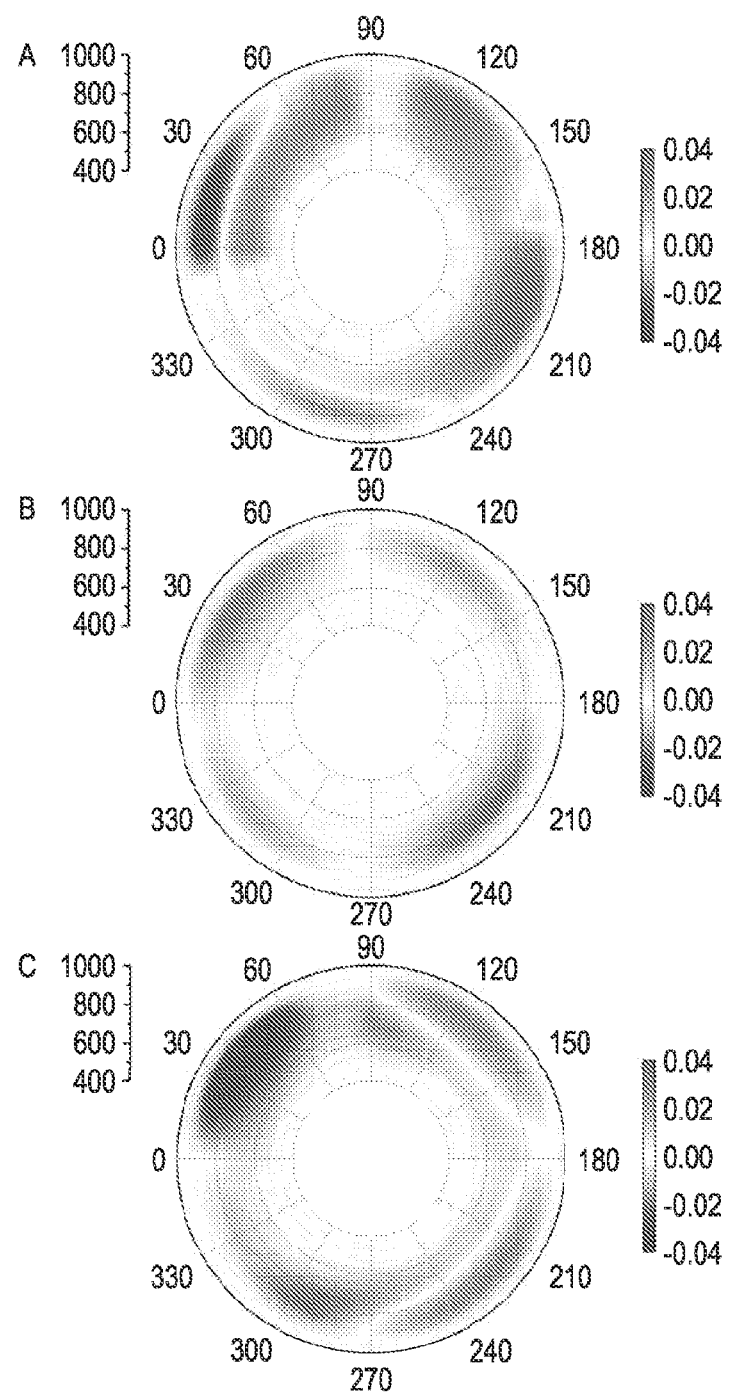
FIG. 25 illustrates circularly polarized thermal radiation for twisted tungsten wires according to the present disclosure.
Figure 25:
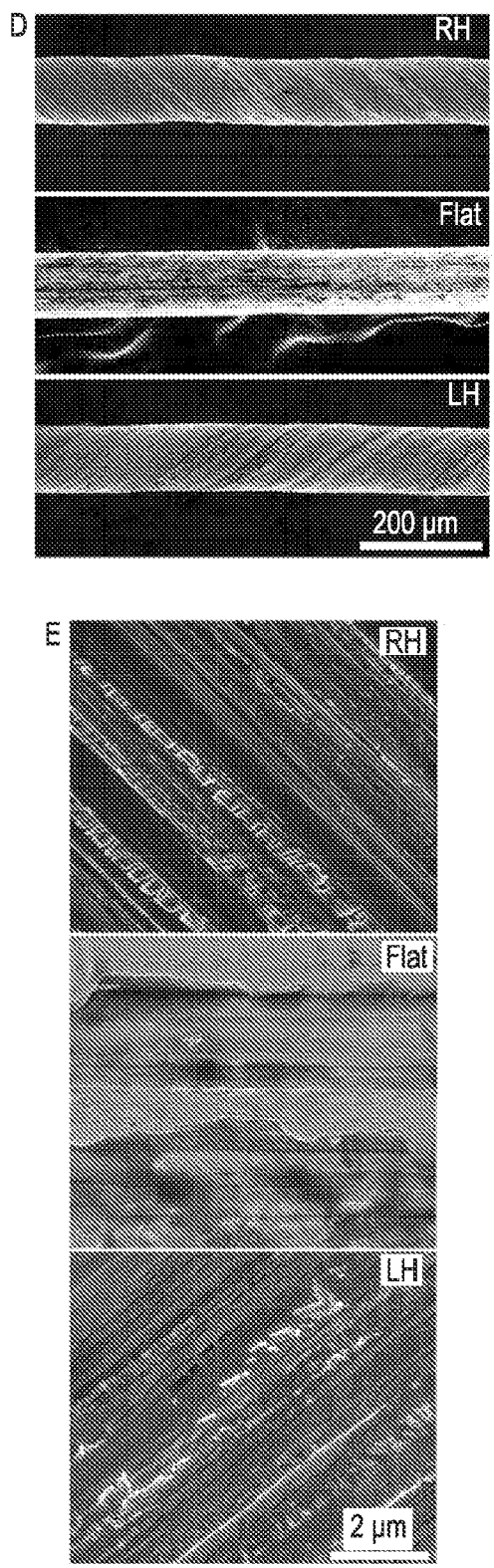
Figure 25:
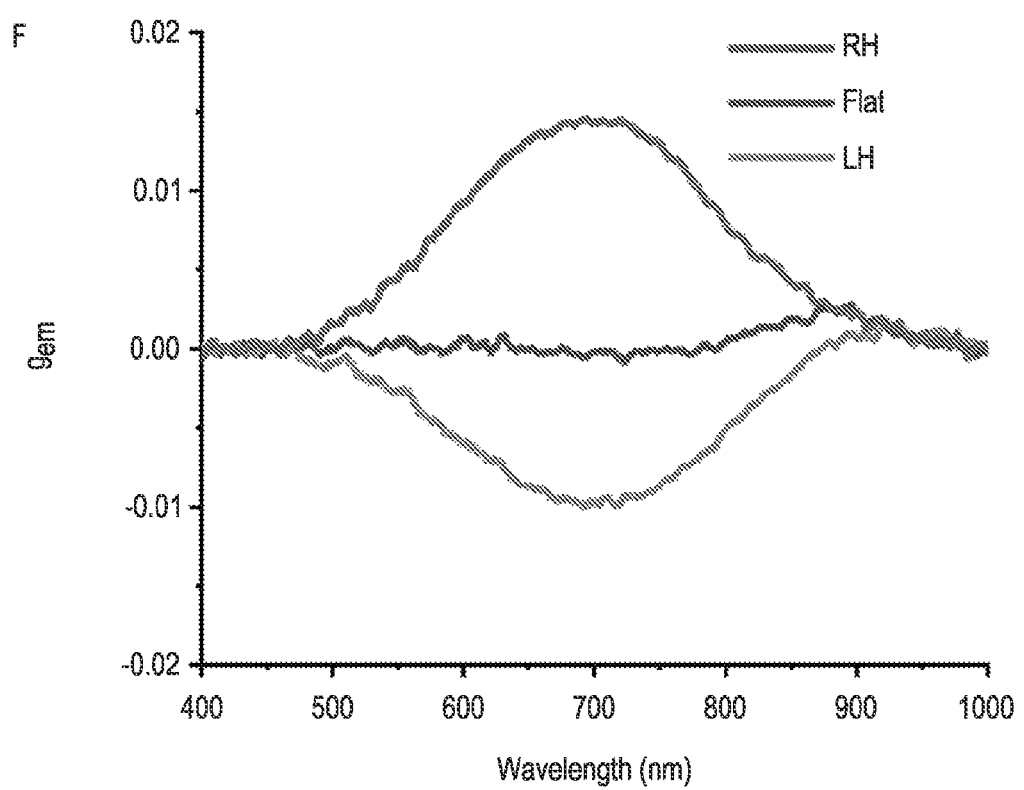

These observations are not only limited to the CNTs but can be generalized to different materials, such as tungsten wires, which present almost the same circularly polarized black body emission and $g_{em}$ responses with the geometrical twist of tungsten wires into helical ropes that had a pitch of 400 μm (FIGS. 24 and 25).

To reveal the mechanism of circularly polarized TR, $TR(\lambda, T)=\varepsilon(\lambda, T)\times I_{BB}(\lambda, T)$, were calculated, where $E(\lambda, T)$ is the emissivity of thermal emitters that is identical to absorptivity for each frequency and polarization dependence according to Kirchhoff's law of thermal radiation, while $I_{BB}(\lambda, T)$ is the intensity of the blackbody radiation dependent on temperature (T) and wavelength ($\lambda$) dependence according to Planck's law. Knowing the emissivity from finite-difference time-domain (FDTD) simulations enabled us to calculate full spectra of TR and validating it by an experimentally measurable region from 400 to 1500 nm. The comparison analysis shown in FIG. 26 reveals the TR on CNTs reached 1200 K with a perfect match between experiments and calculated TR spectra, both of which have two main optical response regions, i.e., the emissivity-determined shoulder peaks in the visual region and the blackbody radiation determined near-infrared region ~2 μm. The full optical response range is 3700 nm, which is wider than CPL response from organic molecules, metal and semiconductor nanoparticles; their typical polarization is 10-400 nm (Table 2). More importantly, the radiant brightness reached 4.5 W/cm$^2$, which is >100 times stronger than bright photo- and electroluminescent CPL emitters and other chiral thermal emitters working at low temperatures (Table 2). Note that high brightness was observed from any side of the filaments, while other devices radiate toward the front plane of used substrates.

Figure 27:
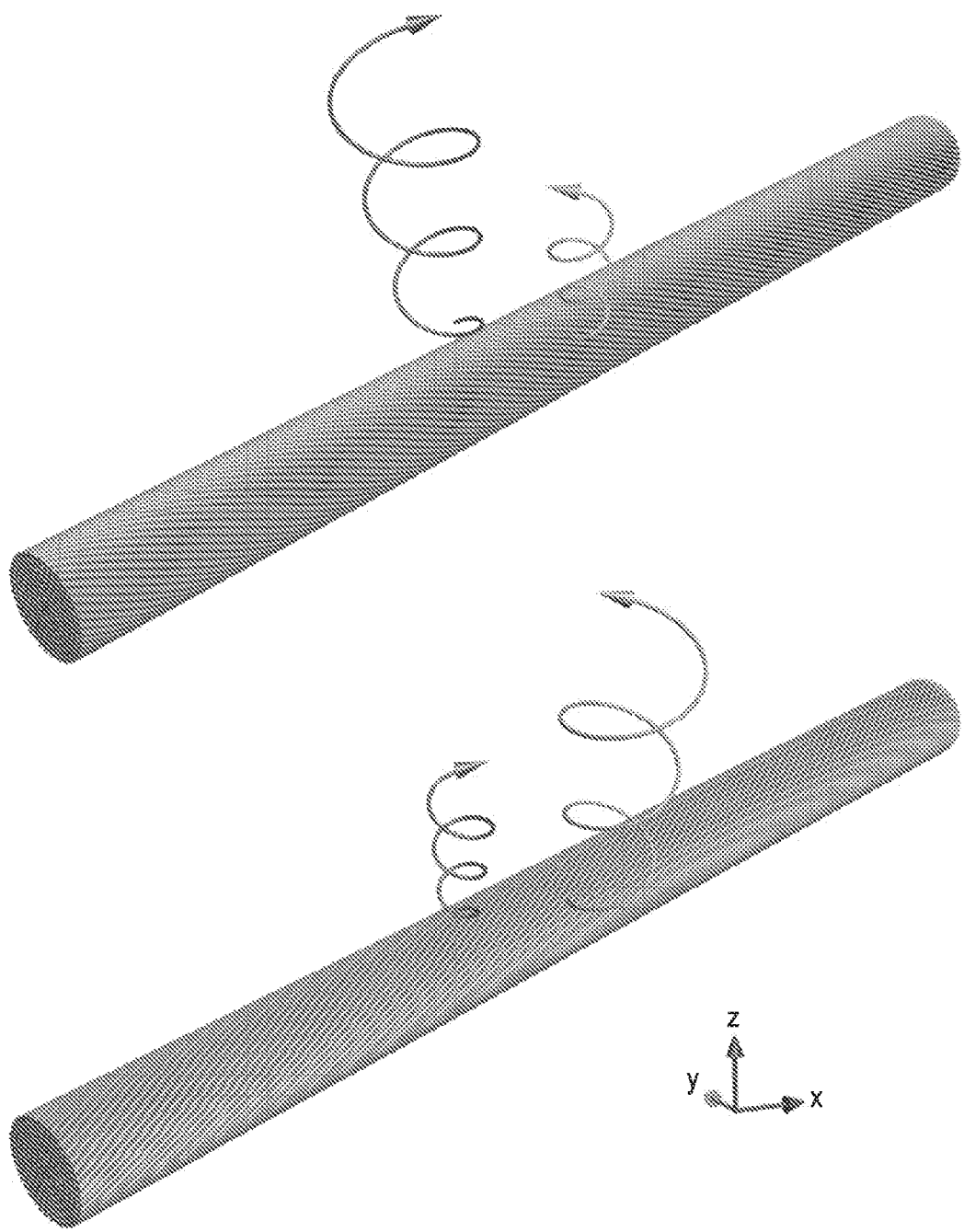
FIG. 27 illustrates calculation of circularly polarized thermal radiation for for left-handed and right-handed carbon nanotube yarns according to the present disclosure.
Figure 27:
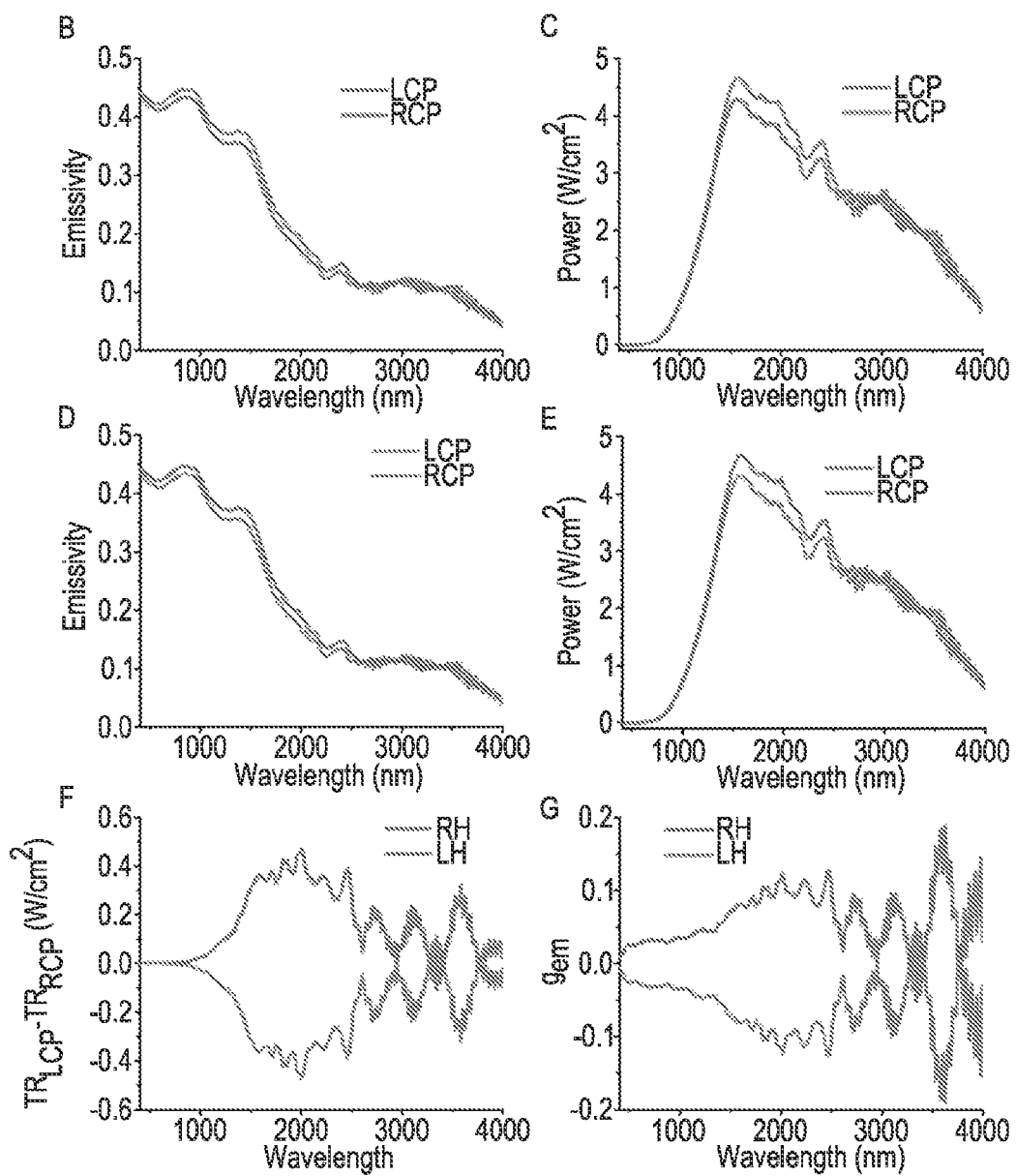

LCP and RCP emissivity can be calculated from absorptivity in accordance with Kirchhoff's law. The result shows that RH CNT filaments have stronger LCP emissivity than RCP, in contrast to LH CNT filaments with an RCP emissivity preference (FIG. 27). $TR_{LCP}$–$TR_{RCP}$ and $g_{em}$ spectra displayed opposite polarization rotation for CNT filaments with reversed handedness. Furthermore, the simulated $g_{em}$ spectra perfectly match with the experiment for $g_{em}$ from two wavelength regions, i.e., 400-800 and 950-1700 nm (section C of FIG. 16). Experimental and simulated results consistently have high $g_{em}$ of 0.020 and 0.10 in the visual and near-infrared regions respectively, where the TR is experimentally measured but with a high circular polarization effect in comparison to the majority of CPL emitters with a typical $g_{em}$ in the range of $10^{-5}$-$10^{-2}$.

Apart from the optical response, electromagnetic analyses reveal deeper insight into the light-matter interaction from the far-field of reflection. Electric (E) and magnetic (B) fields as recorded from FDTD show apparent amplitude differences from LH and RH filaments (FIGS. 28 and 29), indicating a preference for LCP and RCP reflection according to the handedness of filaments. The E and B difference are consistent with the spectral difference (section B of FIGS. 16 and 27) at 700 nm, whereas, at 1700 nm only the B difference rather than the E difference stood out (FIG. 29). This result indicates the magnetic polarizability displays a more significant role than electric polarizability to determine the circular polarization effect for light absorption and TR. In this regard, the magnetic perturbation from electrical current was evaluated, which is found to be too weak to bring additional magnetic moments on the controlment of spin-momentum locking and circular polarization on TR (FIG. 30 and discussion below regarding the effect of electrical current induced magnetic field on the circular polarization of light emission).

Figure 33:
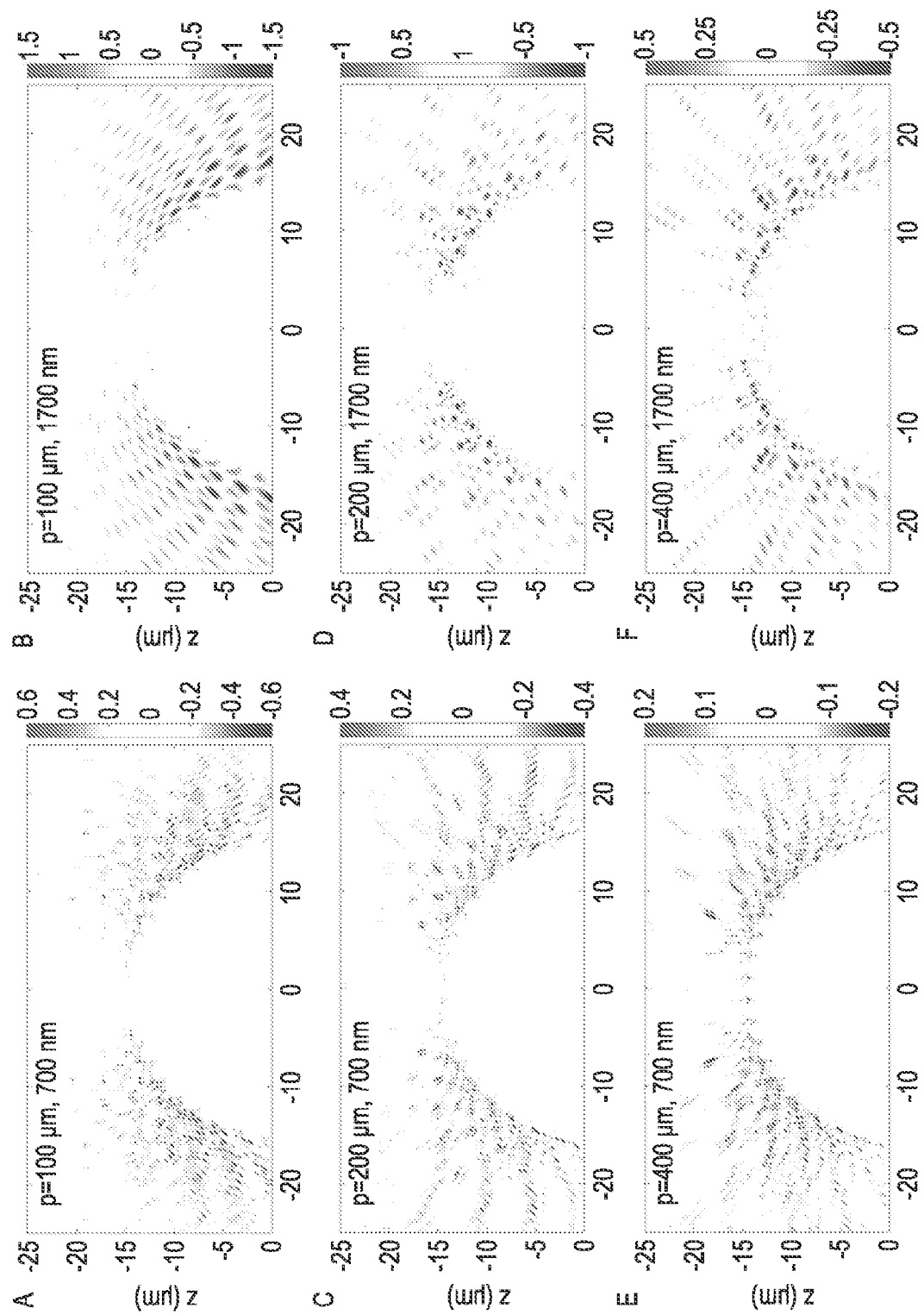
FIG. 33 illustrates comparisons of optical chirality for carbon nanotube yarns with various pitches according to the present disclosure.
Figure 33:
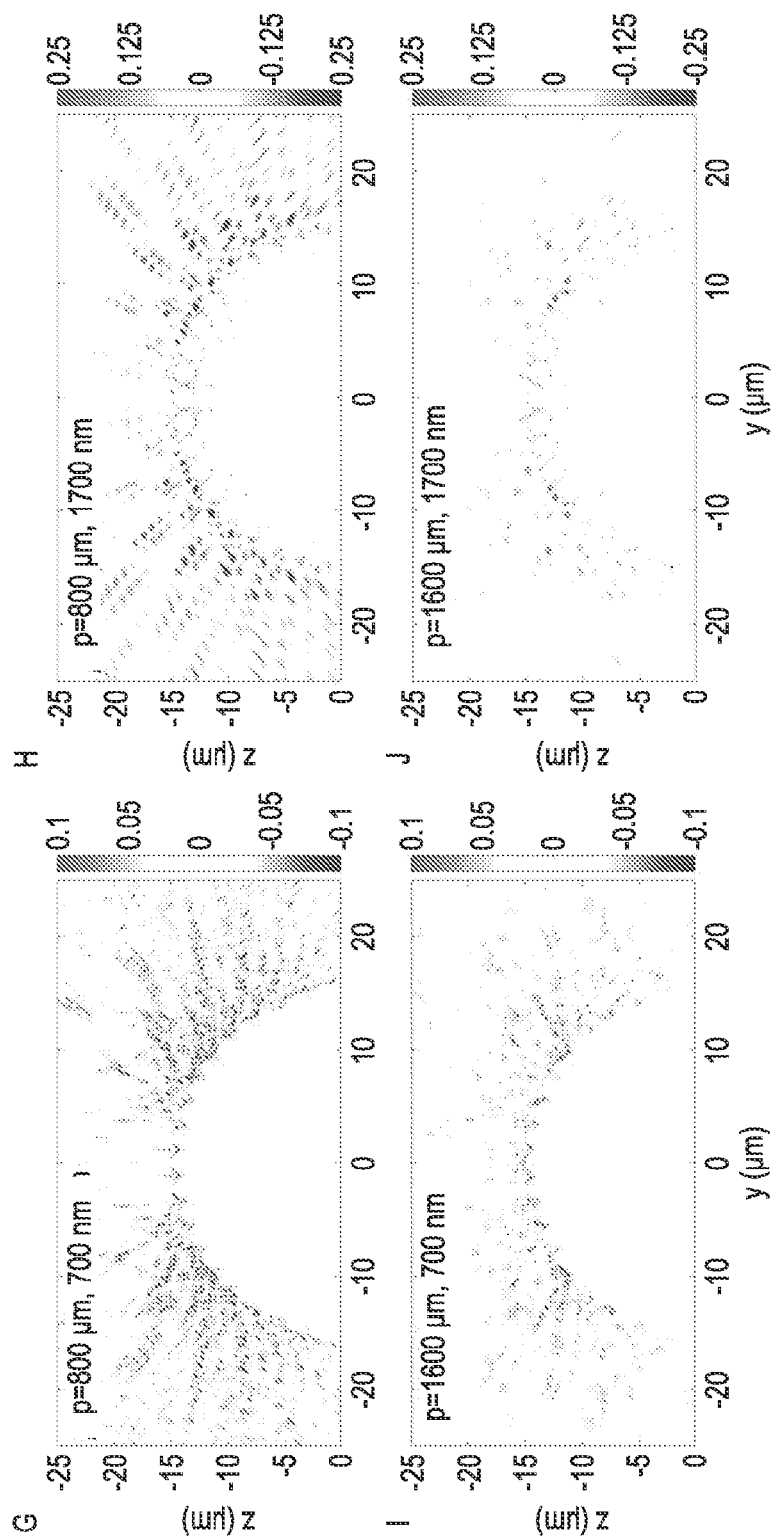
Figure 35:
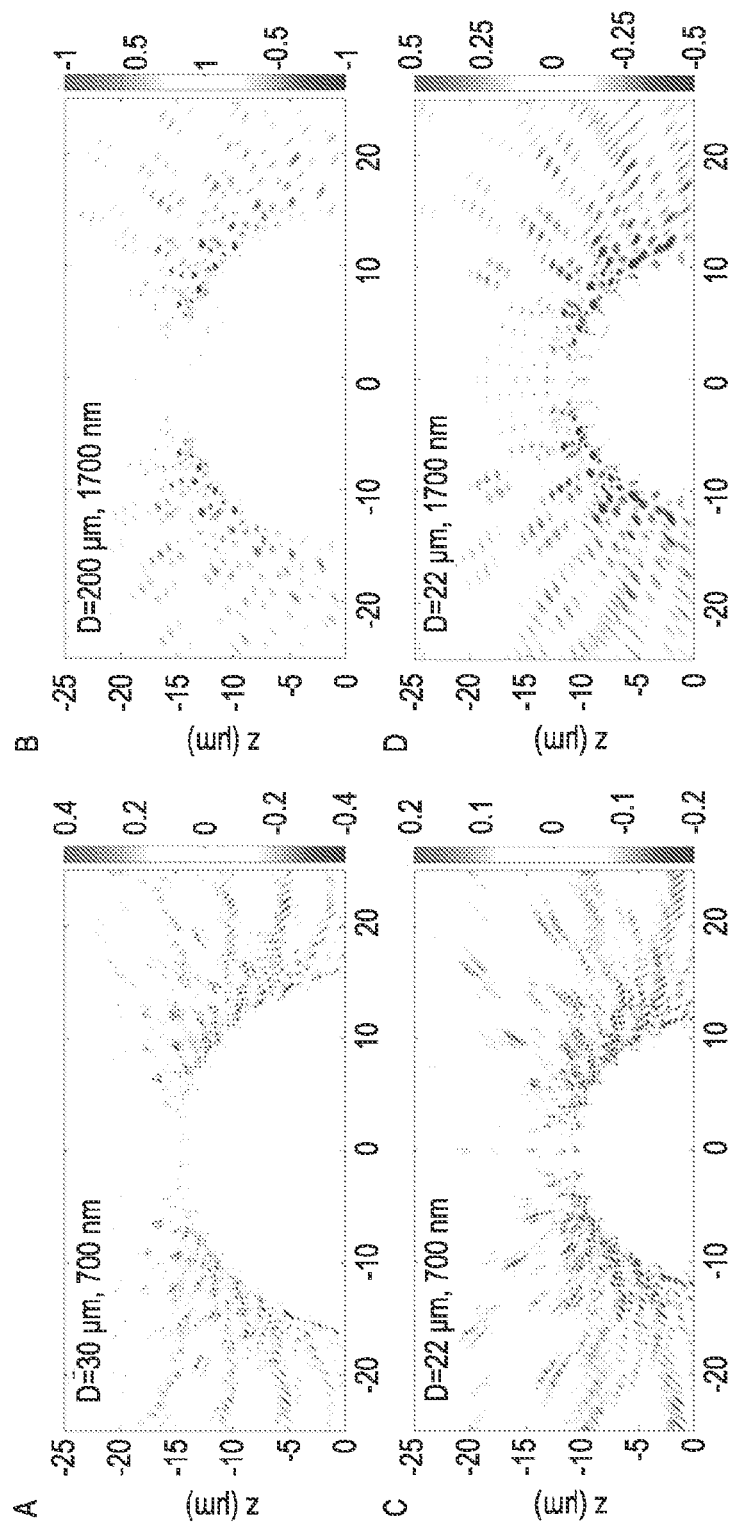
FIG. 35 illustrates a comparison of optical chirality for carbon nanotube yarns with various diameters.
Figure 35:
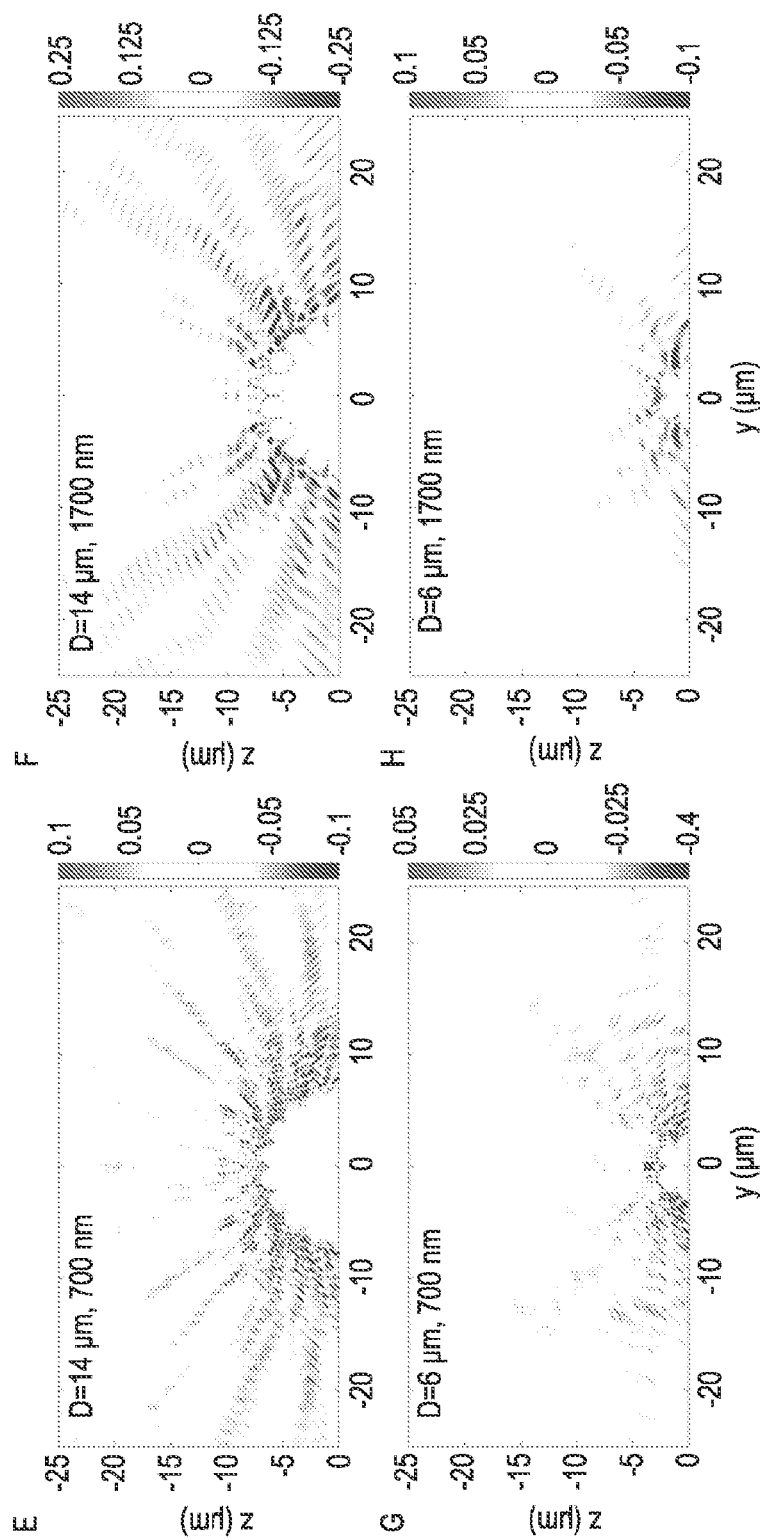

Chiral responses from E and B can be combined into the optical chirality density, C, with $$C = -\frac{\omega\varepsilon_0}{2}\text{Im}(E^* \cdot B),$$

where $\omega$ and $\varepsilon_0$ denote the angular frequency of light and permittivity of free space. C has been used to describe the degree of optical asymmetry (g-factor) for light absorption with g–factor $\propto$ –C and one may expect to observe a similar dependence for $g_{em}$ due to equivalence of absorptivity and emissivity based on the Kirchhoff's law. To verify this theoretical dependence, C under different geometry parameters were calculated and compared. With RH filament as an example, its C dominated with negative values (section D of FIG. 16 and FIG. 29), corresponding to negative C for RCP (positive C for LCP) (see FIG. 28 and discussion below). This result reveals an RCP-preferred reflectivity accompanied by relatively stronger LCP absorptivity and emissivity for the RH filament. Therefore, during the TR process, the obtained $g_{em}$ has a positive sign as confirmed from the spectra in section C of FIG. 16. This direct correlation between $g_{em}$ and –C in combination with the opposite C from LH filaments and zero C from achiral filaments (section D of FIG. 16), points to dependence between $g_{em}$ and C, which can be also verified by the parallel dependences between C and pitch/diameter of the filaments (FIGS. 33 and 35).

Figure 31:
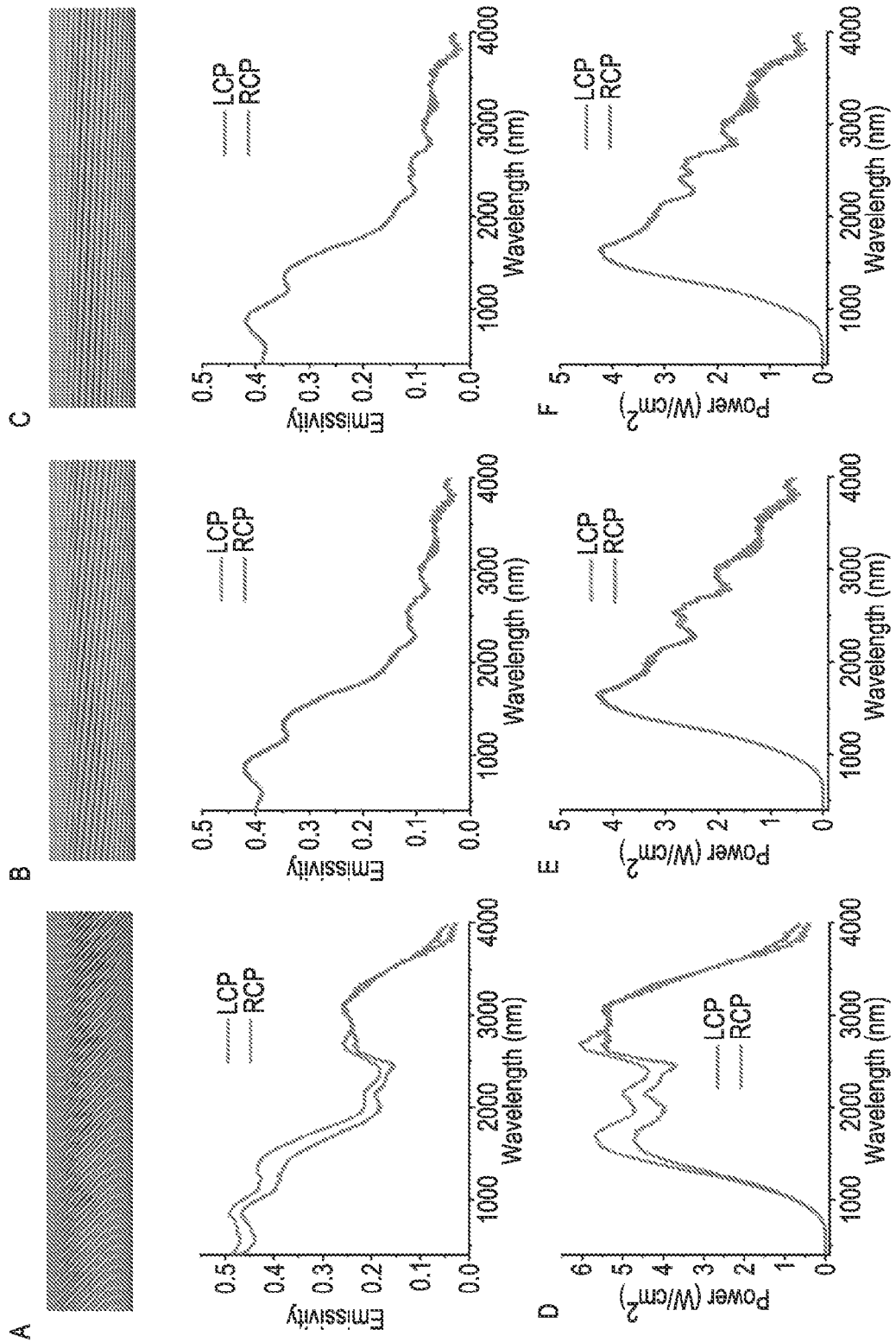
FIG. 31 illustrates the effect of the pitch of carbon nanotube yarns on the circular polarization of thermal radiation in simulation according to the present disclosure.
Figure 31:
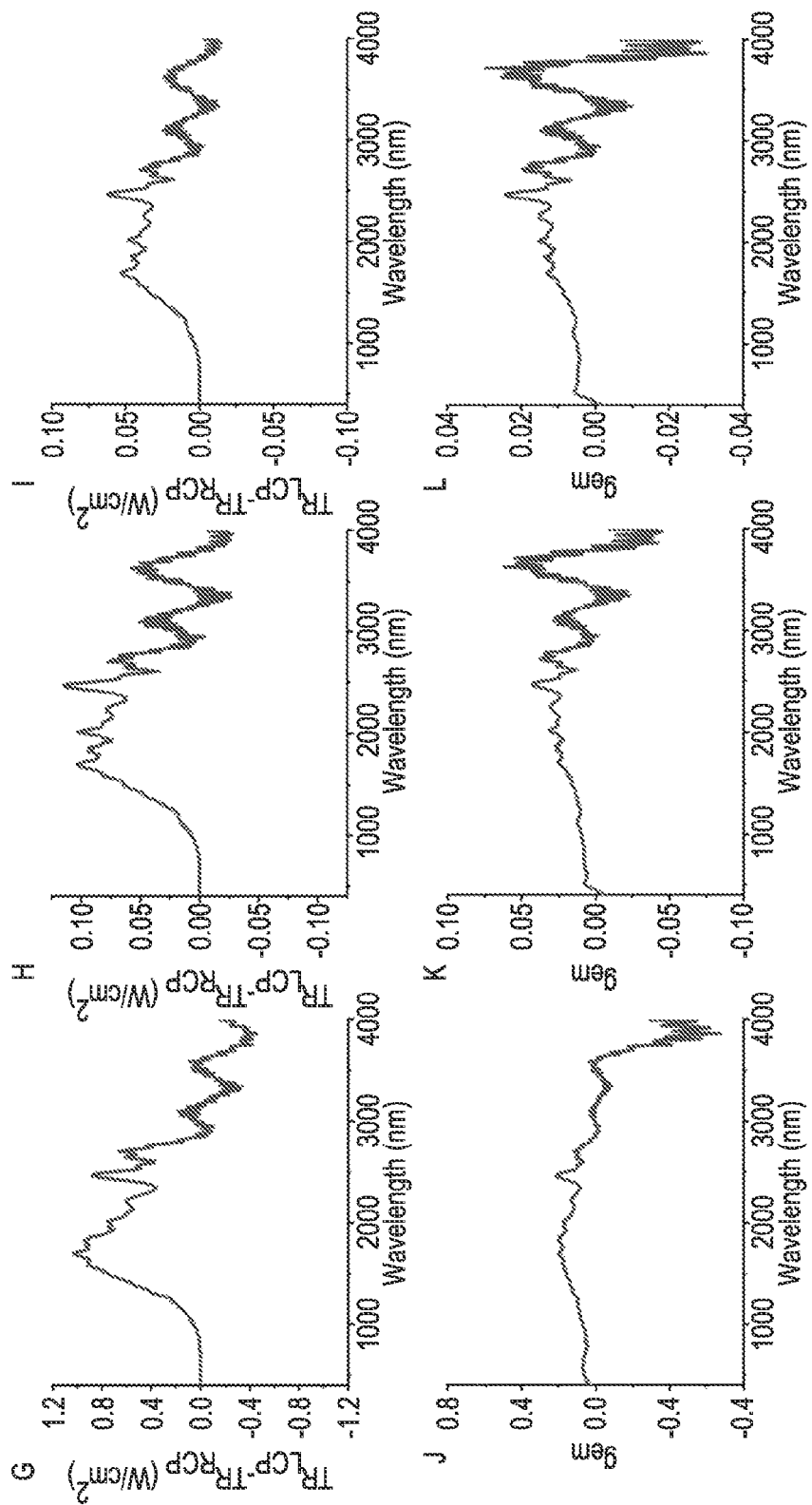
Figure 36:
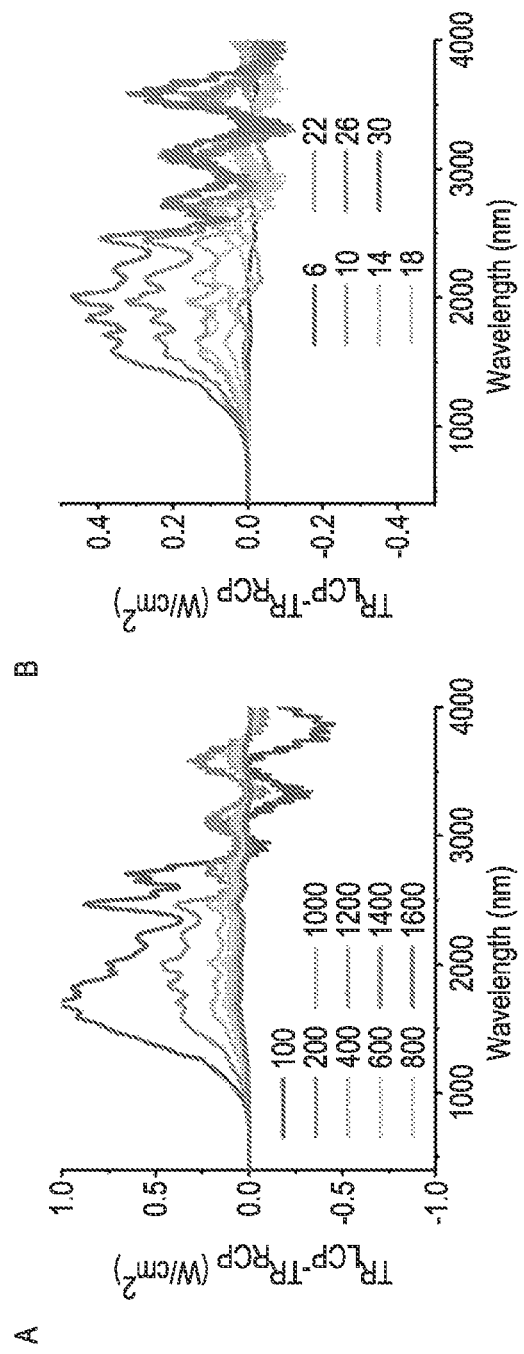
FIG. 36 illustrates geometrical effect on left-handed circular polarization thermal radiation and right-handed circular polarization thermal radiation.

Benefiting from the theoretical frameworks described above, understanding the geometrical effects of CNT filaments on the circular polarization of TR becomes feasible. Adjusting the simulated models with variable pitches, p, from 100 to 1600 µm shows the filament with small p (e.g. 100 µm) has apparent LCP and RCP emissivity differences, correspondingly higher $TR_{LCP}$–$TR_{RCP}$ intensity and larger C and $g_{em}$, in comparison to the filament with large p, e.g. 1600 µm, that has almost identical LCP and RCP emissivity and negligible C and $g_{em}$ (FIGS. 31 and 33, and section A of FIG. 36). Progressively reducing p rapidly increased $g_{em}$ intensities (section F of FIG. 17) and exhibited a reciprocal dependence of $g_{em}$ and –C with p, i.e., $g_{em} \propto$ –C $\propto 1/p$, as shown from two typical wavelengths of 700 and 1700 nm (section G of FIG. 17). These simulation findings are consistent with experimental observations of CNT filaments that have variable pitches from 300 to 1600 µm (section A of FIG. 17). With a small p such as 320 µm, the RH filament has positive signs of $g_{em}$ from every filament orientation with an averaged $g_{em}$=0.023 (section B of FIG. 3 and FIG. 31). By contrast with a large p=1200 µm (section E of FIG. 17), the positive and negative $g_{em}$ under different filament orientations are mostly offset, leading to a weak averaged $g_{em}$ of 0.0032. Statistics show a completely coincident reciprocal dependence with the simulation results (section G of FIG. 17 and Table 3). Additionally, except for the optical responses to bridge pitch to $g_{em}$, their connections with geometry can also be demonstrated by calculating scaled Osipov-Pickup-Dunmur chirality measure, sOPD, of the CNT fibers with different geometrical parameters. Their sOPD values increased with the decrease of pitch, showing the same reciprocal dependence between sOPD and p in comparison to the trends observed from optical spectra (section G of FIG. 17, FIG. 37, and Table 4). This result extends the linear dependence among $g_{em}$, –C and geometries, i.e., $g_{em} \propto$ –C $\propto 1/p \propto$ sOPD, approving the significance of chirality engineering to obtain thermal emitters with high $g_{em}$.

Figure 34:
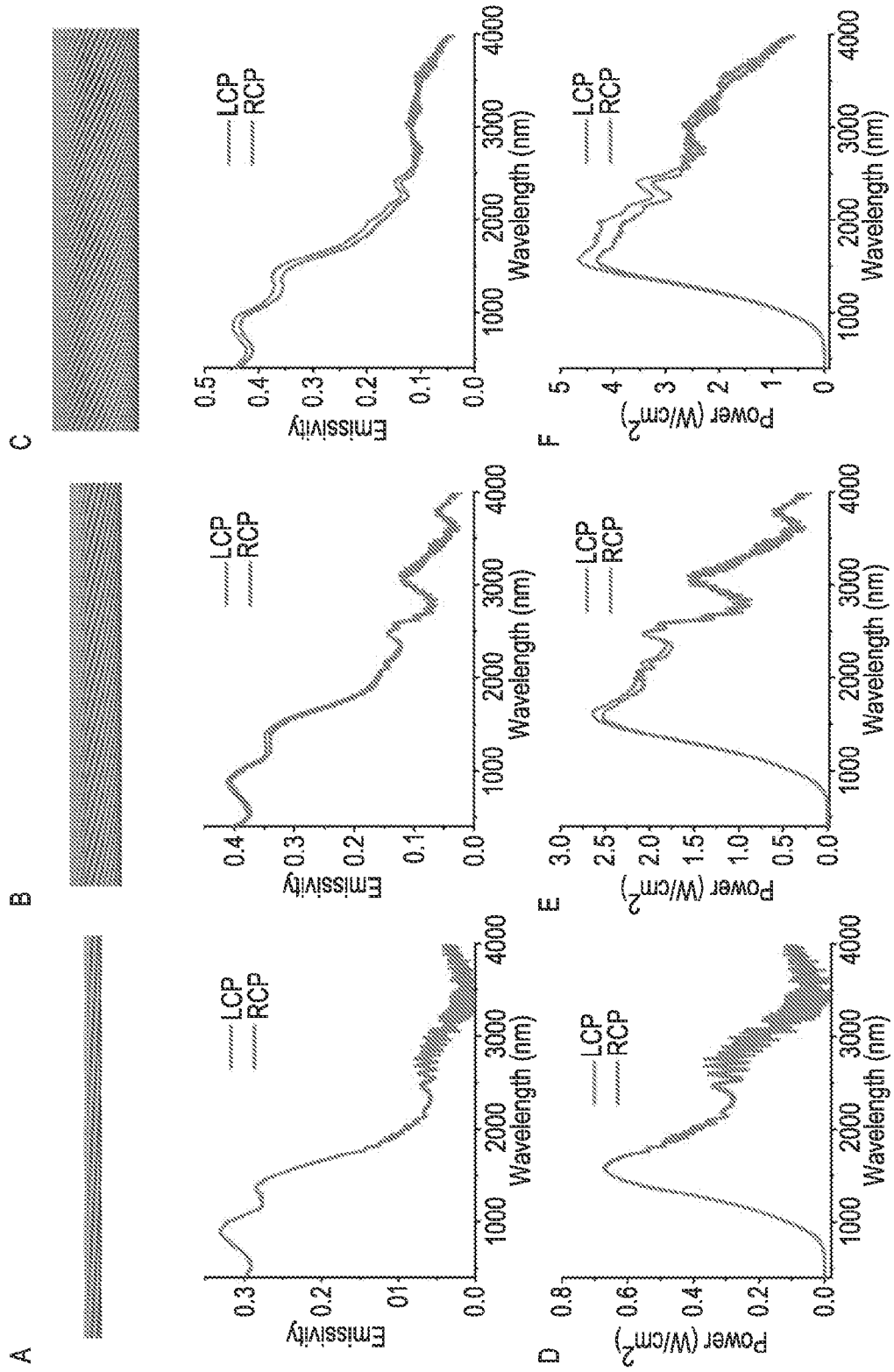
FIG. 34 illustrates the effect of the diameter of carbon nanotube yarns on the circular polarization of thermal radiation according to the present disclosure.
Figure 34:
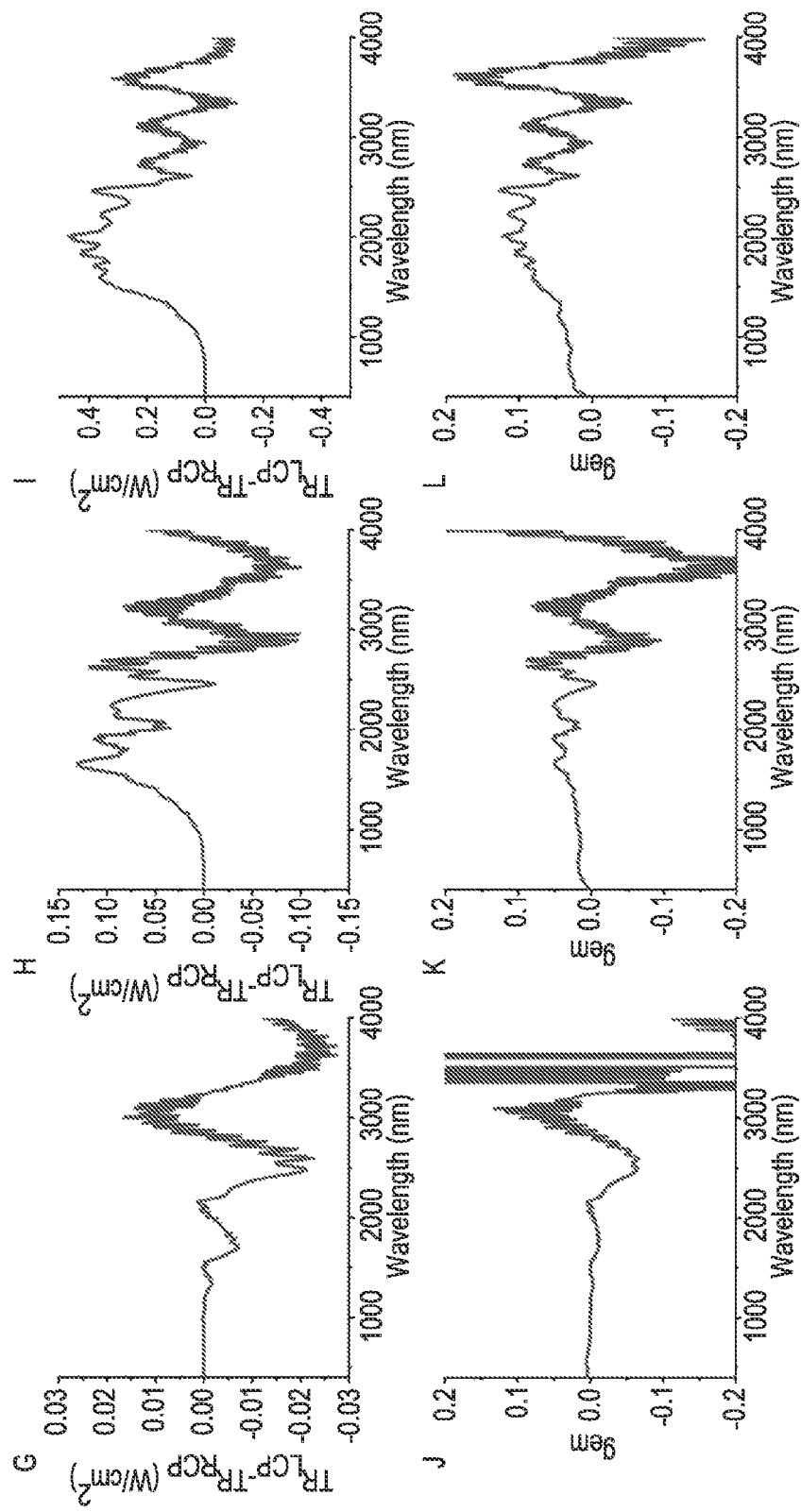

The importance of geometrical chirality on $g_{em}$ can be further verified by changing the diameters (D) of filaments. Although CNT filaments with smaller pitches show higher $g_{em}$, they will require small diameters or greater external force to produce filaments with sufficient twisting. In this case, high-strength materials such as CNTs can be particularly suitable. It also means the diameter effect on $g_{em}$ needs to be considered with the approaching of pitch to near-infrared wavelengths for nearly net circularly polarized emission. In the simulation, the diameter of CNT filaments was adjusted to analyze the influence on $g_{em}$ by varying the diameters of RH CNT filaments. The result shows small diameters, e.g. 6 µm, corresponded to a slight emissivity difference between LCP and RCP, weak C and $g_{em}$ (FIGS. 34 and 35). These weak circular polarization responses were gradually enhanced with the increase of filament diameters, leading to more LCP emitted from the RH filaments and the increase of C and $g_{em}$ (section H of FIGS. 17 and 35, and section B of FIG. 36). Statistical analyses show a linear dependence between $g_{em}$ with the diameters of filaments (section I of FIG. 17), agreed with the dependence observed from sOPD values, i.e., $g_{em} \propto$ –C $\propto$ D $\propto$ sOPD. These direct correlations together with the reciprocal dependence from pitch can be used as basic guidelines for the design of chiral thermal emitters.

For these reasons, twisted filaments have been designed as chiral thermal emitters with extraordinary performance on circular polarization anisotropy, brightness, and optical band. Its circular polarization effect has been theoretically and experimentally demonstrated with the geometrical parameters, optical chirality, and chirality index. The present disclosure illustrates the connection of geometrical asymmetry with thermal radiation for the fabrication of circularly polarized light sources with real-time and electrical controllability. Geometry dependences on the circularly polarized effect pave the road for designing and fabricating chiral thermal emitters, which will combine with the addictive dielectric or plasmonic properties of filaments and precise structure engineering to obtain net circularly polarized sources by thermal radiation. Unique merits of high-temperature resistance, softness and flexibility, and high tensile strength make the bright chiral thermal emitters accessible to soft electronics, robotics, medicine, and extreme operating conditions with temperature, pressure, and vacuum requirements, specifically benefiting through-space communications.

With reference to FIG. 15, circularly polarized TR of twisted filaments are shown. Section A provides an illustration for black body emission of the circularly polarized light from twisted CNT filaments. Section B shows photographs of thermally radiation from CNT filaments under the voltages of 0 and 7 V. Section C-E show scanning electron microscope (SEM) images at different magnifications for LH (D) and RH (C, E) CNT filaments. Sections F-I show distribution maps for the difference of thermally emitted LCP and RCP, $TR_{LCP} - TR_{RCP}$ (sections F and G) and corresponding anisotropy, $g_{em}$, (section H and I) for RH (sections F and H) and LH (sections G and I) filaments under variable filament orientations in the y-z plane as shown in section A via rotating the filament from 0° (CNT filaments parallel to the y-axis) to 360°. Section J shows averaged $g_{em}$ spectra for the LH and RH CNT filaments from all the rotation angles.

Figure 16:
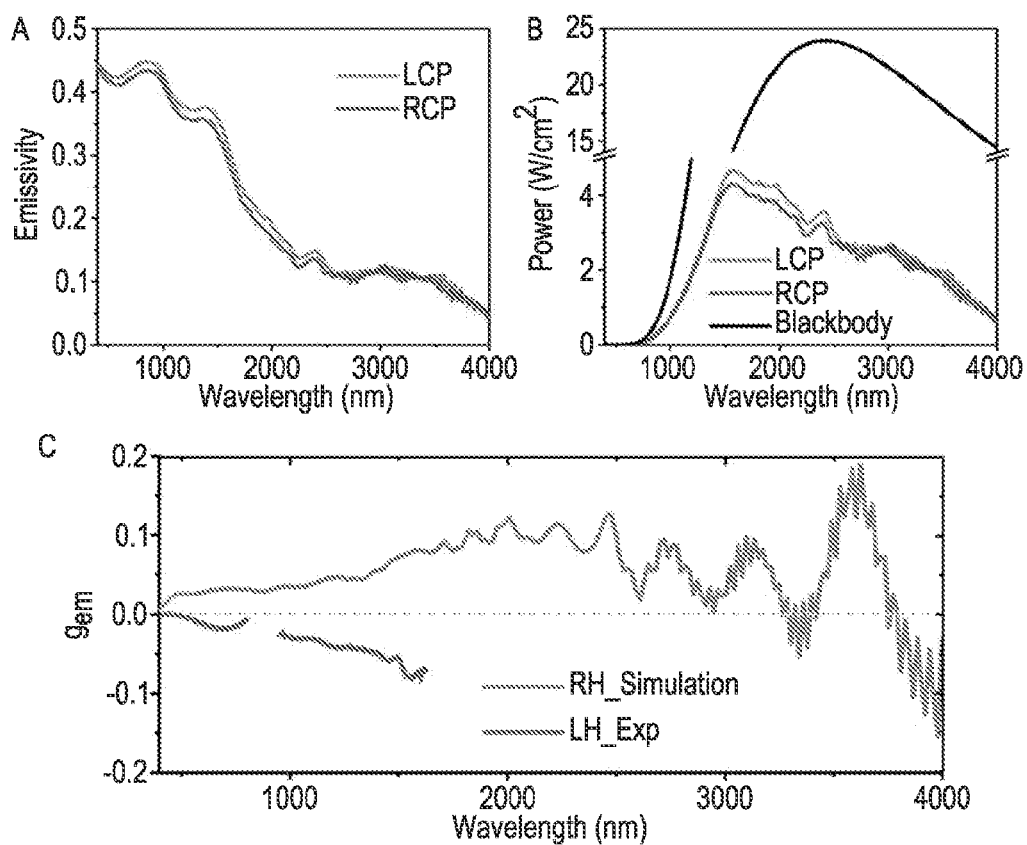
FIG. 16 illustrates emissivity of left-handed circular polarization and right-handed circular polarization and corresponding thermal radiation spectra for filaments according to the present disclosure.
Figure 16:
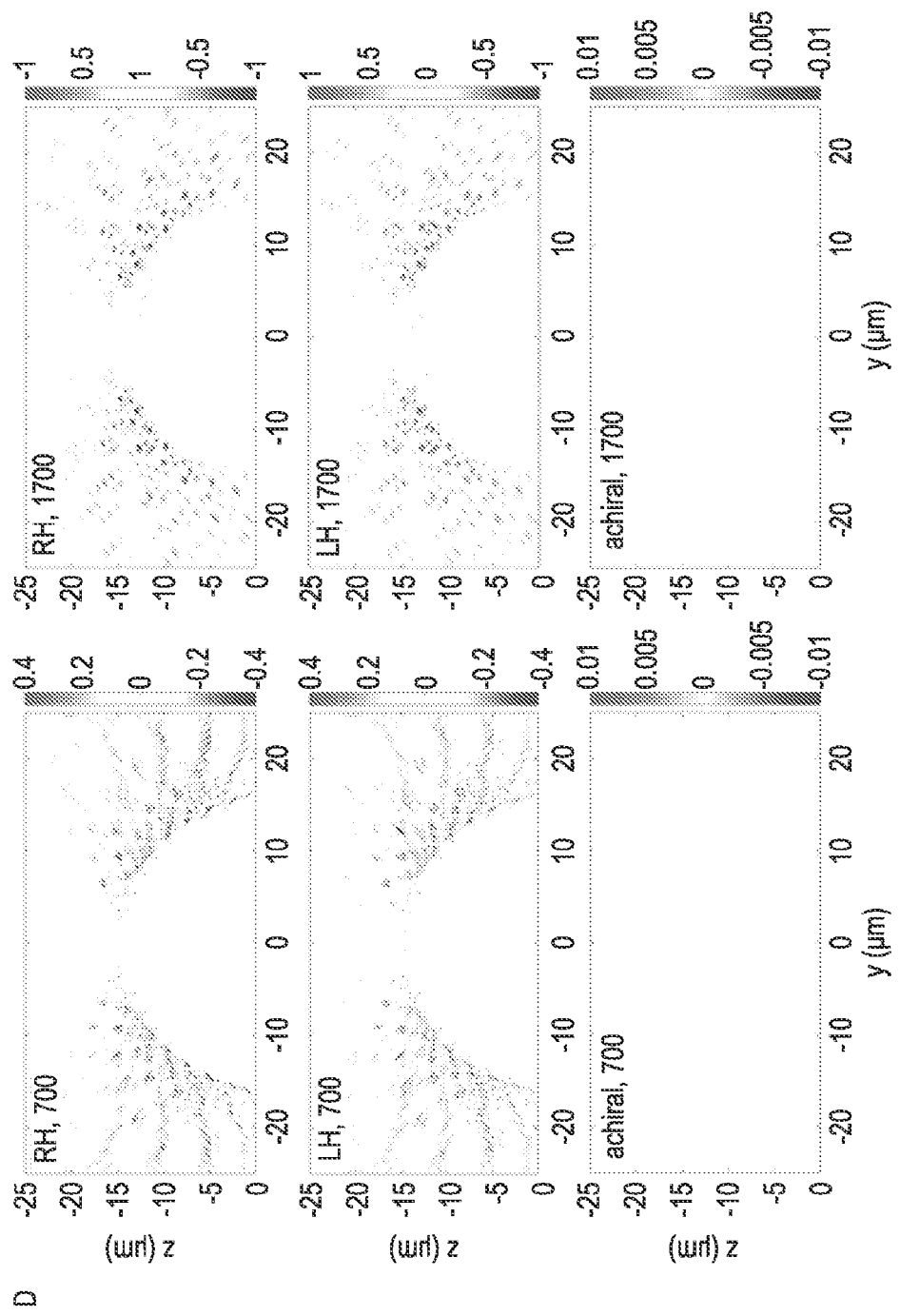

With reference to FIG. 16, calculated LCP and RCP emissivity (section A) and corresponding TR spectra (section B) for RH CNT filaments based on Kirchhoff's and Planck's laws are shown. The line in section B represents the blackbody radiation spectrum at 1200 K. Section C illustrates $g_{em}$ of CNT filaments obtained from experiments (red) and simulations (blue). Section D illustrates optical chirality density, C, for the TR of LH (top), RH (middle), and achiral (bottom) CNT filaments at 700 and 1700 nm.

Figure 17:
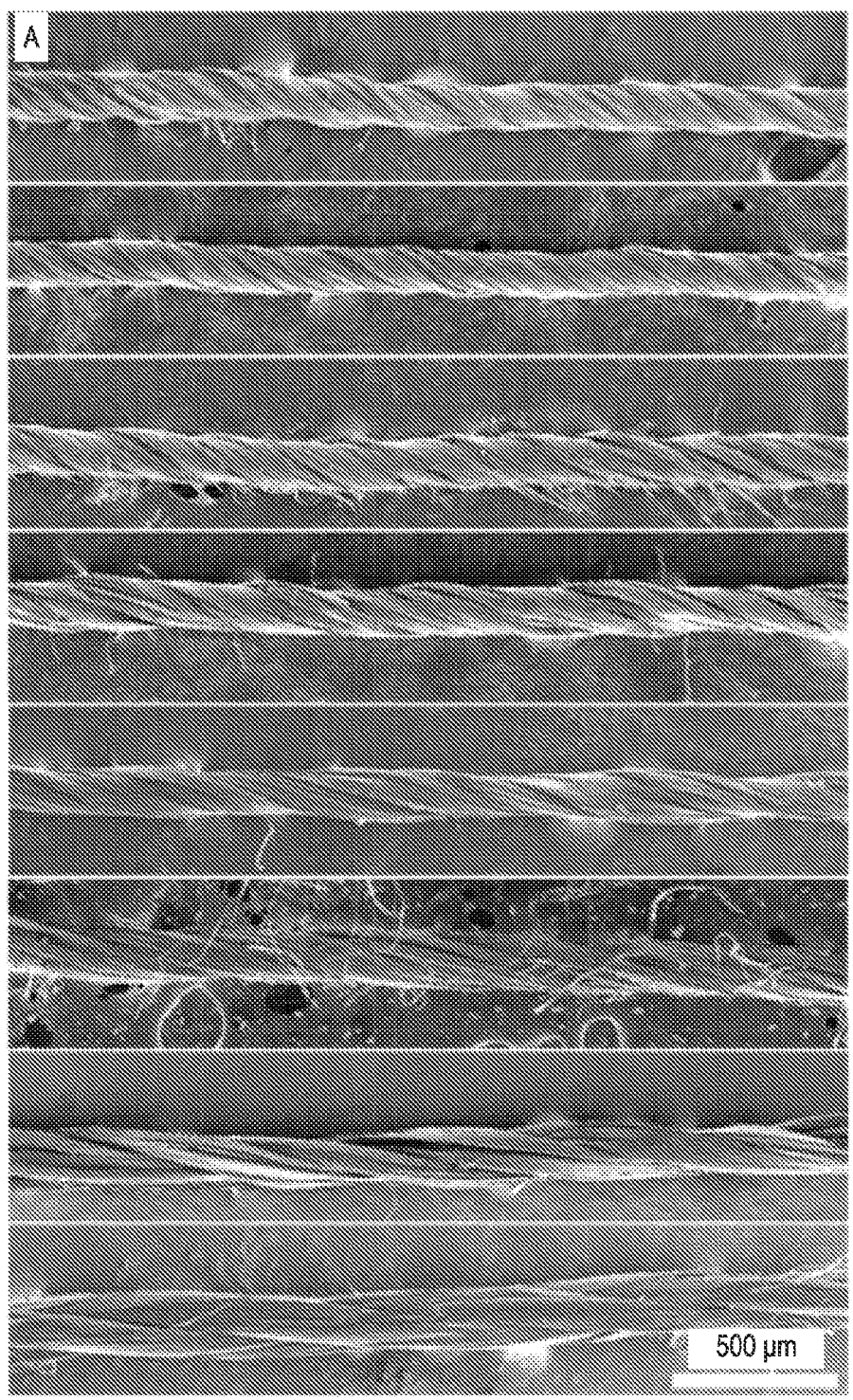
FIG. 17 illustrates the tunability of circular polarization by geometrical parameters according to the present disclosure.
Figure 17:
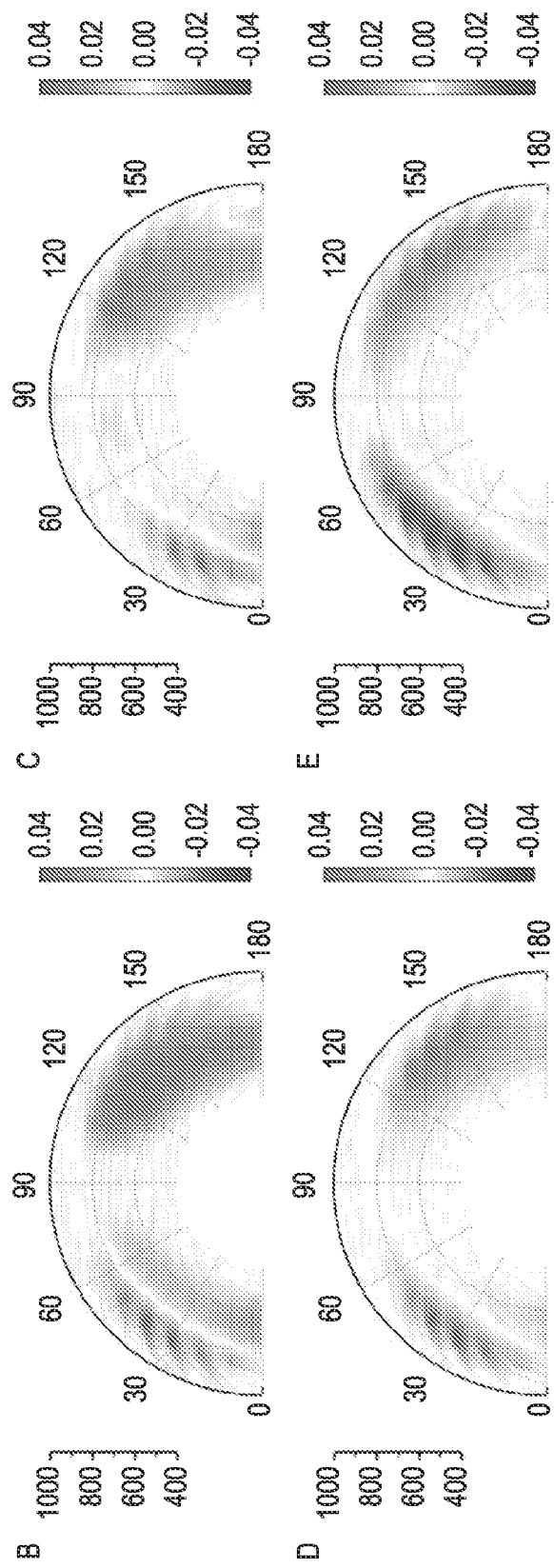
Figure 17:
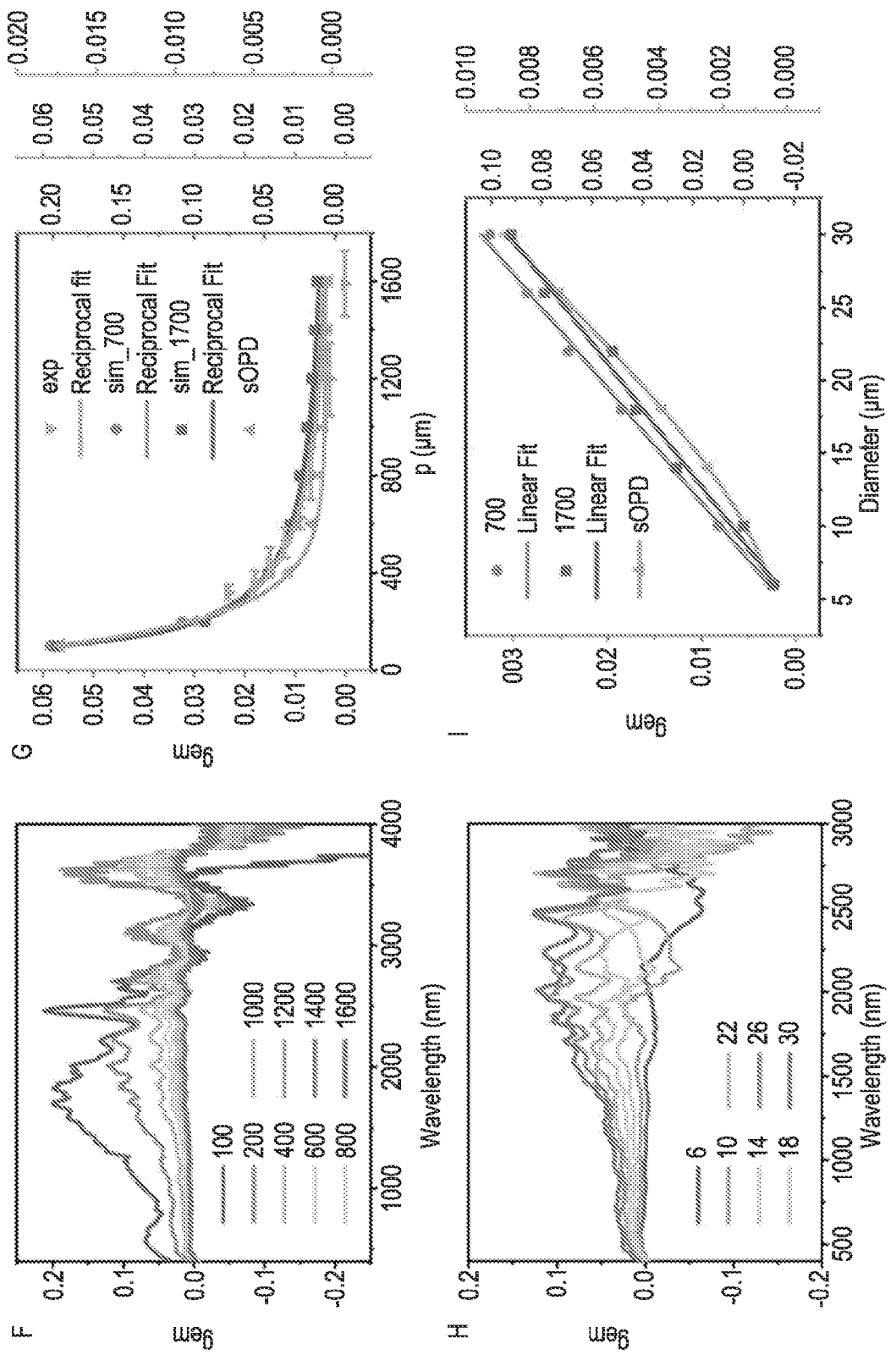

With reference to FIG. 17, the tunability of circular polarization by geometrical parameters is shown. Section A illustrates SEM images of the RH CNT filaments with various pitches, p, of 320±30, 350±60, 440±60, 520±60, 620±40, 810±110, 1200±150, and 1600±130 µm from the top to bottom. Sections B-E illustrate a distribution map for $g_{em}$ under different filament orientations in the y-z plane for the CNT yarns with p of 320±30 (section B), 440±60 (section C), 620±40 (section D), and 1200±150 (section E) µm. FDTD calculated $g_{em}$ spectra for the RH CNT filaments with various p (section F) and diameters (section H), and the dependence of $g_{em}$ (blue, red and green) and scaled Osipov-Pickup-Dunmur chirality measure, sOPD, (orange) with the values of p (section G) and diameter (section I) of CNT filaments.

Methods for Fabrication of Black Body CPL Emitter

Left-handed and right-handed CNT yarns with a diameter of 150 µm (DexMat inc., USA) were cut into 40 mm lengths, fixed by two copper lines on the two ends, and twisted into different pitches via controlling the number of twisting turns. Then the twisted yarns were straightly placed in the bottom of a 40 mL glass vial and sealed with a plastic cap to allow copper lines to pass through. The as-made setup needs to purge with ultra-high-purity nitrogen for at least 60 mins to completely remove the oxygen in the vial. Then the obtained setup was connected to a voltage supply (Keithley model 2400 digital source meter, Keithley, USA) to run the testing of thermal radiation immediately. The same procedures were used for the fabrication of chiral thermal emitters with tungsten wires in a diameter of 100 µm (Thermo Fisher, USA)) as the filament.

Methods for Calculation of Thermal Radiation Spectra.

Thermally radiated light is typically considered within the classical framework of Plank's law, which establishes the dependence of emitted spectrum on the temperature that is largely materials agnostic. The states contributing to the emission are considered to be non-polarized. However, prior studies of metamaterials have showed that the structure of the materials can influence the thermal spectrum, including its linear polarization and directionality. Chirality of the material and its metastructure should theoretically affect the circular polarization of the thermally emitted photons. Experimental realization of TR with strong CPL emission could clarify the contribution of different mechanisms and serve as a technological milestone for CPL emitters.

Kirchhoff's law of thermal radiation establishes the relationship between thermally radiated emissivity with absorptivity for the thermal emitters at thermal equilibrium states. It also reveals that the optical polarization effect from TR is the same with perfect light absorbers, which are highly correlated to the optical polarization according to the Kerr effect and Maxwell equations. Specifically, the thermally spectral radiance can be expressed as a wavelength (λ) and temperature (T) dependence, $$TR(\lambda, T) = \varepsilon(\lambda, T) \times I_{BB}(\lambda, T) \tag{1}$$

where ε(λ, T) is the emissivity of the thermal emitter, which has an equivalent dependence with absorptivity A(λ, T), $$\varepsilon(\lambda, T) = A(\lambda, T) \tag{2}$$

And $I_{BB}(\lambda, T)$ is the blackbody radiation expressed with Planck's law:

$$I_{BB}(\lambda, T) = \frac{2hc^2}{\lambda^5 \left(e^{hc/\lambda k_B T} - 1\right)} \tag{3}$$

where c is the speed of light, h is Planck's constant, and kB is the Boltzmann constant. Except for the wavelength and temperature dependence, A(λ, T) is also coherently related to the optical polarization of thermal emitters through the electromagnetic interaction with CPL, which can be theoretically computed according to Maxwell equations with finite-difference time-domain (FDTD) method via the commercial software package of Lumerical FDTD Solutions 2022R1.4. For the analysis of circular polarization of TR, A(λ, T) under the illumination of left-handed and right-handed CPL were calculated respectively, thus reversely getting the left-handed and right-handed circularly polarized emissivity and corresponding TR spectra.

Based on the above physical input, LH and RH CNT yarns with a diameter, length, and pitch of 30, 400, and 200 µm, respectively, were modeled from the bundles of small fibers in a diameter of 1 µm for the FDTD calculation. The models were lied on the x-y plane and illuminated by left-handed and right-handed CPL, which were respectively constructed with two plane wave sources in the same k-vector from the z-axis direction but with a phase difference of −90° and 90°. The length of the simulation region was 200 μm with a periodic boundary condition along the x-axis direction, while the y/z-axis directions used the boundary condition of perfectly matched layers to absorb the outgoing waves to avoid the additional influence from boundary reflection. Four frequency-domain field and power monitors were placed outside of the models and light sources along the y- and z-axis to respectively collect the reflected (z max, y max and min) and transmitted (z min) light from CNT yarns, which were transferred into a wavelength dependent reflectivity and transmittance through the discrete Fourier-transform conversion of time domain determined energy flux into functions of frequency. The absorptivity and emissivity for the thermal emitter were calculated with the following relationship: Emissivity=1−(Reflectivity+Transmittance).

Considering the geometry similarities of CNT yarns and tungsten wires as well as the same TR response (FIG. 26) and circular polarization effect from these two materials as observed from experiments in sections F and G of FIG. 15 and FIGS. 23-25, the refractive index of tungsten from Palik Database was used for all the models with a TR temperature of 1200 K. Electric (E) and magnetic (B) fields around the CNT yarns were collected by the frequency profile monitors placed at the y-z plane and normalized with the electric ($E_0$) and magnetic ($B_0$) fields from irradiated light sources. A vacuum background with a dielectric constant of 1 and a uniform mesh size of 50 nm were used for all the simulations.

Method for Calculation of TR Temperature.

The temperature of TR can be calculated based on the transformation of Equations 1 and 3 into $$T = \frac{hc}{\lambda k_B \ln\left(\frac{2\varepsilon hc^2}{\lambda^5 TR} + 1\right)} \quad (4)$$

where TR (λ, T) spectra can be collected in the range of 400-1500 nm from experiments (FIG. 26), while the emissivity was obtained from FDTD simulation under an unpolarized light source to near the experimental conditions. Consequently, the temperature of TR was obtained with the best fitting between the experimental and simulated TR spectra, which show CNT yarns and tungsten wires had a TR temperature of 1150 (section D of FIG. 25) and 1225 K (section F of FIG. 25), respectively.

Method for Calculation of $g_{em}$.

The $g_{em}$ of CNT yarns and tungsten wires was calculated with $$g_{em} = \frac{2 \times (TR_{LCP} - TR_{RCP})}{TR_{LCP} + TR_{RCP}} \quad (5)$$

where $TR_{LCP}$ and $TR_{RCP}$ are the left-handed and right-handed CPL from TR, respectively. In experiments, the $TR_{LCP}-TR_{RCP}$ and $TR_{LCP}+TR_{RCP}$ were respectively collected with CPL and direct current signals from CPL detectors with different units of mdeg and V. Considering the transformation relationship between mdeg and V, $g_{em}$ can be also written into $g_{em}$=mdeg/32980×ln(10)/V.

Method for Calculation of Optical Chirality Density.

For dielectric CNT yarns under the illumination of CPL or as the thermal emitter for TR, the light-matter interaction induced electrical and magnetic polarizations with electric dipole moment, $\tilde{p}$, and magnetic dipole moment, $\tilde{m}$, respectively, are given with $$\tilde{p} = \alpha \tilde{E} - iG\tilde{B} \quad (6)$$

$$\tilde{m} = \chi \tilde{B} + iG\tilde{E}$$

where $\tilde{E}$ and $\tilde{B}$ are the time-independent complex electric and magnetic fields, α is electric polarizability, X is magnetic polarizability, and G is the isotropic mixed electric-magnetic dipole polarizability. The light absorption of CNT yarns under LCP and RCP irradiation is respectively written with $$A_{LCP} = \frac{\omega}{2}(\alpha''|\tilde{E}|^2 + \chi''|\tilde{B}|^2) - \frac{2}{\varepsilon_0}G''C \quad (7)$$

$$A_{RCP} = \frac{\omega}{2}(\alpha''|\tilde{E}|^2 + \chi''|\tilde{B}|^2) + \frac{2}{\varepsilon_0}G''C$$

where " subscript indicates the imaginary component of a complex quantity, ω and $\varepsilon_0$ are the angular frequency of light and permittivity of free space, and C is the optical chirality density that can be calculated with $$C \equiv \frac{\varepsilon_0}{2}E \cdot (\nabla \times E) + \frac{1}{2\mu_0}B \cdot (\nabla \times B) = -\frac{\omega\varepsilon_0}{2}\mathrm{Im}(\tilde{E}^* \cdot \tilde{B}) \quad (8)$$

where $\mu_0$ is the vacuum permeability. Therefore, the anisotropy factor of LCP and RCP absorption, g-factor, can be given by $$g\text{-}factor = \frac{2 \times (A_{LCP} - A_{RCP})}{A_{LCP} + A_{RCP}} = \frac{8G''}{\omega\varepsilon_0(\alpha''|\tilde{E}|^2 + \chi''|\tilde{B}|^2)} \cdot (-C) \quad (9)$$

For thermal emitters that have the equivalence of absorption with TR based on Kirchhoff's law with Equation 2, $g_{em}$ in Equation 5 can be transferred into $$g_{em} = \frac{2 \times (TR_{LCP} - TR_{RCP})}{TR_{LCP} + TR_{RCP}} = \quad (10)$$

$$\frac{2 \times (A_{LCP} - A_{RCP})}{A_{LCP} + A_{RCP}} = \frac{8G''}{\omega\varepsilon_0(\alpha''|\tilde{E}|^2 + \chi''|\tilde{B}|^2)} \cdot (-C)$$

which shows a positive linear dependence between $g_{em}$ and −C, bringing a tightly theoretical connection between the degree of circular polarization of TR with the chirality of thermal emitters.

C around CNTs can be computed through FDTD calculations based on the combination of E and B according to Equation 8. Considering that C is a scalar not determined by the optical chirality from light sources, C was linearly combined from the optical chirality of equal components of LCP and RCP, i.e., $C=C_{LCP}+C_{RCP}$. To compare the enhancement of optical chirality from different structures, C was normalized with the absolute value of optical chirality of the irradiated light, $|C_0|$, while reserving the sign of C to distinguish the region with different handedness of local fields.

Method for Calculation of the Osipov-Pickup-Dunmur Chirality Measure

Osipov, Pickup and Dunmur chirality measure (aka index), OPD, is a generalized measure for mirror asymmetry of geometrical objects. In the past OPD was used to evaluate chiroptical activity dependency of helical filaments to their geometry parameters.

Any objects defined as a group of N points in three-dimensional Euclidian space, $\mathbb{R}$, can be evaluated using a chirality gyration tensor of a group of N points. As the simplest chiral object in $\mathbb{R}^3$ can be defined as four points that do not belong to the same plane, the chirality gyration tensor needs to be calculated based on all possible permutations of four points from the group of N points. The pseudo-scalar criterion of OPD is simply the trace of the chiral gyration tensor:

$$OPD = \frac{1}{3}\left[\sum_{\substack{\text{all permutations of} \\ i,j,k,l=1\ \ldots\ N}} \frac{[(r_{ij} \times r_{kl}) \cdot r_{il}](r_{ij} \cdot r_{jk})(r_{jk} \cdot r_{kl})}{(r_{ij} r_{jk} r_{kl})^2 r_{il}^1}\right] \quad (11)$$

Where $r_i$, $r_j$, $r_k$, and $r_l$ are the vectors of individual four-point sets, i, j, k, l, with initial points at the origin from of Cartesian coordinates (0,0,0) while the vectors and $r_{ij}=r_i-r_j$ and analogous ones are the vectors connecting the two points (i.e. i and j) among the four points. The magnitude (scalar quantity) of connecting vectors, such as $r_{ij}$, and analogous ones are written as $r_{ij}$.

Scaled OPD Calculation for Single and Bundle of Filament Structures.

The OPD for two different scales of chirality of the system, i.e., single and bundle of helical filament structures, were calculated. The N points were collected from single and bundle system to represent their geometry change with two varying geometry parameters, i.e., pitch and diameter. Their space information for all the points and their coordinates were read from the 3-dimensional models created by the software of Autodesk's 3ds MAX. Since a different number of total points to define these two types of structures (N=11 and 55 for single and bundle of filament, respectively) were used, the OPD value was normalized by $4!/N^4$ and defined as $$sOPD = \frac{4!}{N^4} \times OPD.$$

Characterization

The circular polarization of TR was recorded by a JASCO CPL-300 circularly polarized luminescence spectrophotometer with the detector working in a wavelength range of 400-800 nm and an OLIS NIR CPL Solo with Hamamatsu thermoelectric cooled near-infrared photomultiplier tubes working in the range of 950-1650 nm. Unpolarized TR spectra were monitored by a Fluoro-max-3 spectrofluorometer (Jobin Yvon Horiba) with the detector working from 400 to 800 nm and a Horiba Quanta Master equipped with photomultiplier tubes (400-800 nm) and liquid nitrogen cooled HgCdTe detectors (800-1500 nm). SEM images were taken by FEI Nova 200 Nanolab Dual Beam SEM and FEI Helios NanoLab 650 dual-beam SEM with an acceleration voltage of 5 kV and a current of 0.4 nA, while Energy-dispersive X-ray spectroscopy (EDS) spectra and mapping were taken with relatively higher voltages and currents.

TABLE 2

Radiative brightness of CPL emitters from different materials and devices:

| Materials and devices | Emission wavelength (nm) | Spectra width (nm) | $g_{em}$ | Brightness (W/cm$^2$) |
|---|---|---|---|---|
| Molecular system of chiral exciplex host and achiral guest[a] | 520 | 200 | $2.8 \times 10^{-3}$ | $7.9 \times 10^{-7}$ |
| Lanthanide-based organic light-emitting diodes (OLED)[a] | 600 | 20 | 1.0 | $2.9 \times 10^{-6}$ |
| Chiral lanthanide complexes | 590 | 10 | 1.4 | N/A |
| Liquid crystal (LC) with aligned upconversion nanorods | 660 | 50 | 1.9 | N/A |
| Electroluminescence with chiral LC[a] | 550 | 250 | 1.6 | $1.5 \times 10^{-5}$ |
| CdSe/CdS quantum rods[a] | 600 | 75 | $2.0 \times 10^{-4}$ | $5.9 \times 10^{-5}$ |
| Chiral spiro-skeleton-based thermally activated delayed fluorescence (TADF)[a] | 530 | 330 | $3.6 \times 10^{-3}$ | $1.5 \times 10^{-4}$ |
| Chiral Cu—I cluster assemblies[a] | 520 | 300 | $9.5 \times 10^{-3}$ | $1.8 \times 10^{-4}$ |
| Polymer-helicene light-emitting diodes[a] | 420 | 75 | −0.42 | $2.3 \times 10^{-4}$ |
| B/N dopped nanographenes[a] | 520 | 130 | $2.5 \times 10^{-3}$ | $4.9 \times 10^{-4}$ |
| Silver nanoclusters[a] | 570 | 250 | $-5.3 \times 10^{-3}$ | $5.7 \times 10^{-4}$ |
| OLED with organic chiral inducers[a] | 560 | 270 | $2.4 \times 10^{-2}$ | $1.5 \times 10^{-3}$ |
| TADF OLED[a] | 600 | 400 | $3.0 \times 10^{-3}$ | $2.2 \times 10^{-3}$ |
| Small-molecule and polymer OLED[a] | 540 | 170 | 0.57 | $4.2 \times 10^{-3}$ |
| Photonic crystal structures[b] | 13000 | >12000 | 1.1 | $4.6 \times 10^{-3}$ |
| Chiral octahydro-binaphthol compound-based TADF OLED[a] | 520 | 250 | $2.0 \times 10^{-3}$ | $6.8 \times 10^{-3}$ |
| Chiral metasurfaces of ZnSe[b] | 13000 | N/A | 0.87 | $1.7 \times 10^{-2}$ |
| Iridium complex OLED[a] | 530 | 200 | $3.3 \times 10^{-3}$ | $3.2 \times 10^{-2}$ |
| Chiral silicon metasurfaces[b] | 4700 | 70 | N/A | $3.7 \times 10^{-2}$ |
| Magnetic Weyl semimetals[b] | 9500 | 17000 | 1.0 | $4.6 \times 10^{-2}$ |
| Gold F-shape meta-patterns[b] | 7000 | 1000 | 1.2 | 0.27 |
| Z-shaped platinum films[b] | 6500 | 2500 | 0.50 | 0.38 |
| Twisted CNT yarns | 700 | N/A | $2.3 \times 10^{-2}$ | $5.8 \times 10^{-2}$ |
| Twisted CNT yarns | 1700 | 3700 | 0.10 | 4.5 |

Key:
[a]The photometric emission unit (cd/m$^2$) was transferred with a radiometric unit (W/cm$^2$) with the conversion referred to 683 Lumens per watt at a wavelength of 555 nm.
[b]The radiation power of thermal emitters was calculated with Stefan-Boltzmann law that stated the dependence of radiation power (j*) with emissivity ($\varepsilon$) and temperature (T) of thermal emitters, $j^* = \varepsilon \times \sigma \times T^4$, where $\sigma$ is the Stefan-Boltzmann constant.

TABLE 3

Experimentally measured averaged $g_{em}$ by filament orientations for the RH CNT yarns with different pitches, p.

| p (μm) | $g_{em}$ |
|---|---|
| 320 ± 30 | 0.023 |
| 350 ± 60 | 0.018 |
| 440 ± 60 | 0.015 |
| 520 ± 60 | 0.012 |
| 620 ± 40 | 0.0090 |
| 810 ± 110 | 0.0069 |

TABLE 3-continued

Experimentally measured averaged $g_{em}$ by filament orientations for the RH CNT yarns with different pitches, p.

| p (μm) | $g_{em}$ |
|---|---|
| 1200 ± 150 | 0.0032 |
| 1600 ± 130 | 0.00011 |

TABLE 4

Scaled Osipov-Pickup-Dunmur index, sOPD, values for the single twisted fiber and its bundles with various pitches (p) and diameters (D):

| | | sOPD | |
|---|---|---|---|
| p (μm) | D (μm) | Single fiber | Bundles |
| 200 | 6 | $4.82 \times 10^{-4}$ | |
| | 10 | $1.30 \times 10^{-3}$ | |
| | 14 | $2.46 \times 10^{-3}$ | |
| | 18 | $3.87 \times 10^{-3}$ | |
| | 22 | $5.44 \times 10^{-3}$ | |
| | 26 | $7.10 \times 10^{-3}$ | |
| | 30 | $8.76 \times 10^{-3}$ | |
| 100 | | | $1.73 \times 10^{-2}$ |
| 400 | | | $2.79 \times 10^{-3}$ |
| 600 | | | $1.30 \times 10^{-3}$ |
| 800 | | | $7.46 \times 10^{-4}$ |
| 1000 | | | $4.81 \times 10^{-4}$ |
| 1200 | | | $3.36 \times 10^{-4}$ |
| 1400 | | | $2.47 \times 10^{-4}$ |
| 1600 | | | $1.90 \times 10^{-4}$ |

FIG. 18 illustrates thermal emitters of twisted CNT yarns. Section A includes photographs of thermally radiated CNT yarns under different applied voltages. Sections B and C illustrate optical spectra for the thermally emitted LCP and RCP difference, $TR_{LCP}-TR_{RCP}$ (section B), and sum, $TR_{LCP}+TR_{RCP}$ (section C), for the chiral thermal emitters under various working voltages. Section D illustrates dependence of electrical current with the amplitude of voltages added onto CNT yarns. Section E illustrates dependence of electrical current with the working time of CNT yarns under a voltage of 7 V.

FIG. 19 illustrates structural variation during the working conditions. Section A-F illustrate SEM images in different magnifications shown the surface of CNT yarns before (sections A-C) and after (section D-F) electrical charging for TR. Sections G-J illustrate comparison of EDS spectra (section G, I) and mappings (sections H, J) for the CNT yarns before (sections G, H) and after (sections I, J) electrical charging.

Figure 20:
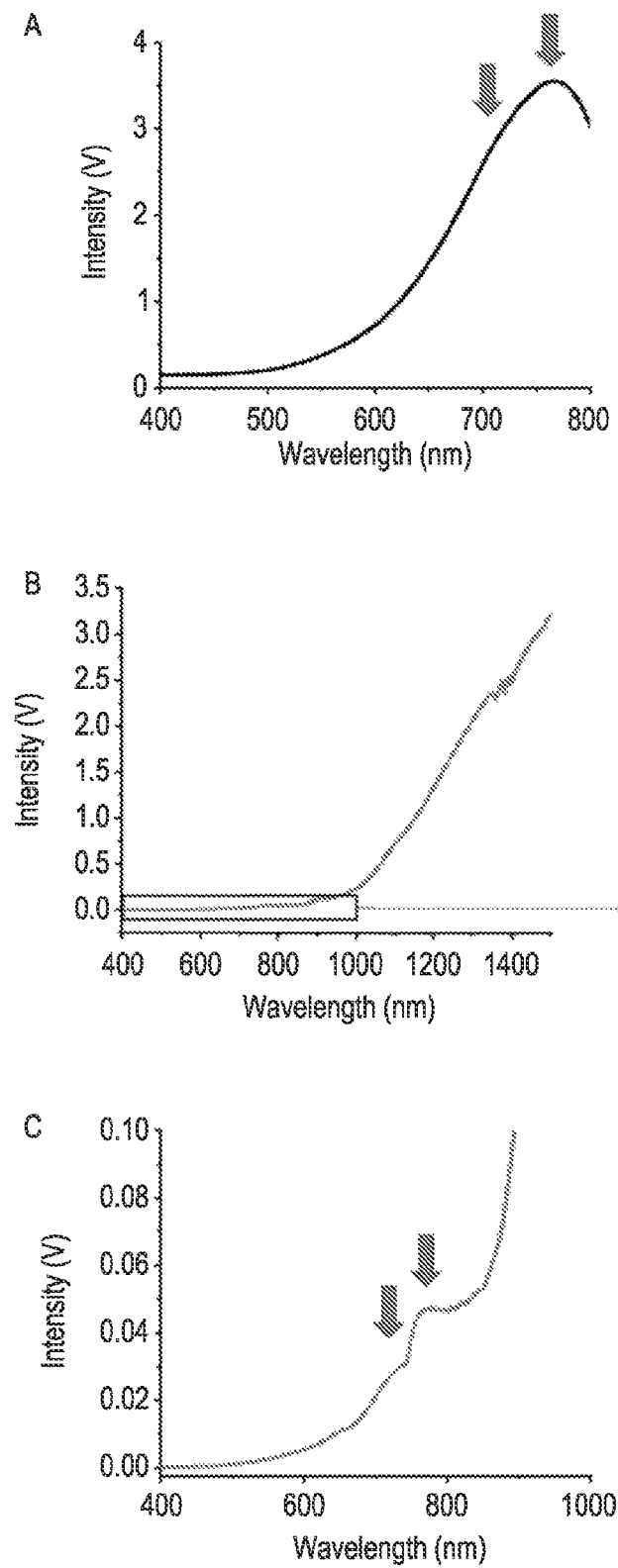
FIG. 20 illustrates shoulder peaks in thermal radiation spectra.

FIG. 20 illustrates shoulder peaks in TR spectra. Comparison of TR spectra collected with JASCO CPL-300 (section A) and Horiba Quanta Master fluorimeter (sections B, C), which had photomultiplier tubes (blue line) and liquid nitrogen cooled HgCdTe detectors (red line) worked in the range of 400-800 nm and 800-1500 nm, respectively. The arrows indicate the presence of shoulder peaks at 720 and 770 nm in the TR spectra of CNT filaments.

Figure 21:
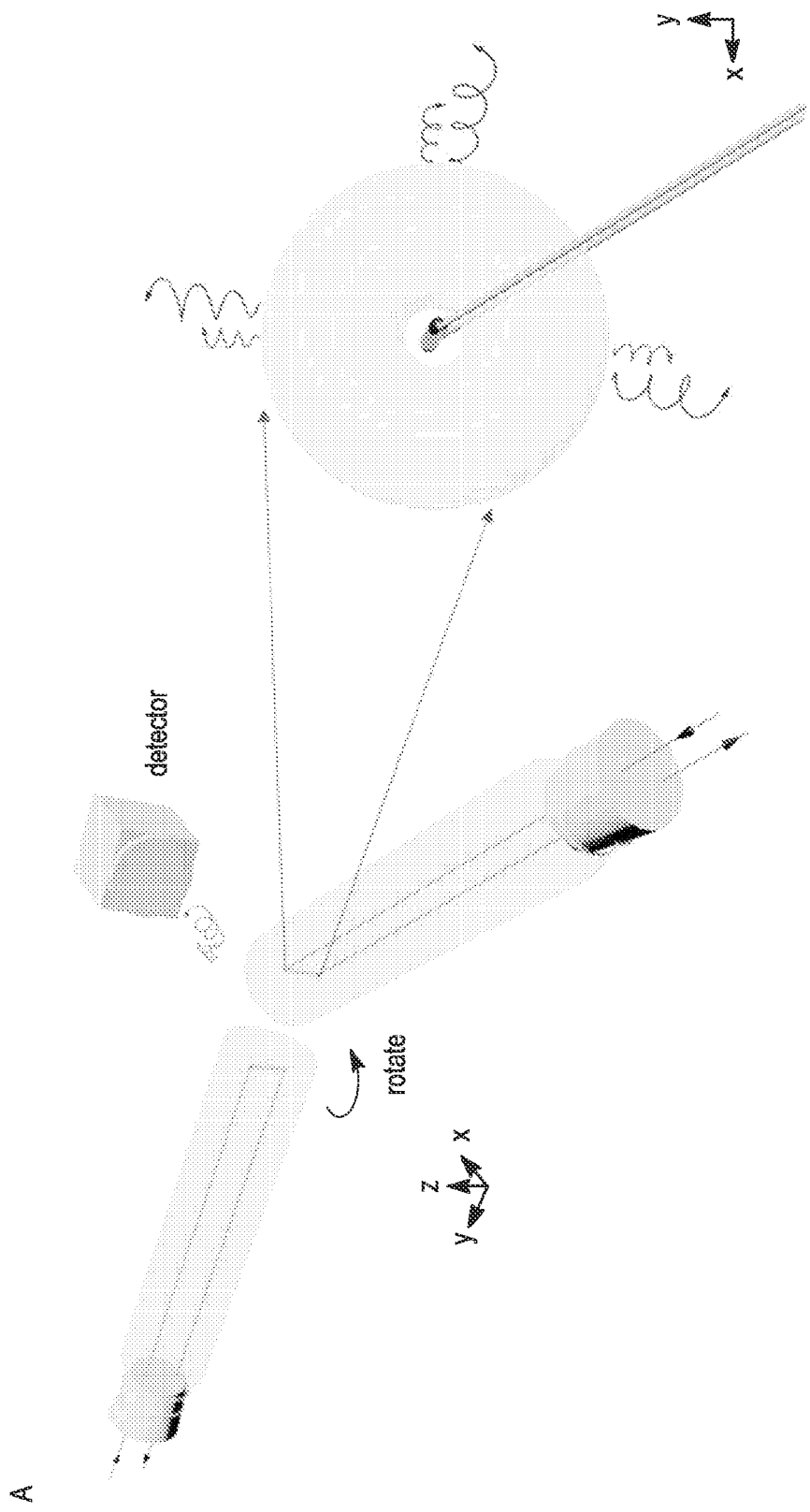
FIG. 21 illustrates omnidirectional radiation around a filament according to the present disclosure.
Figure 21:
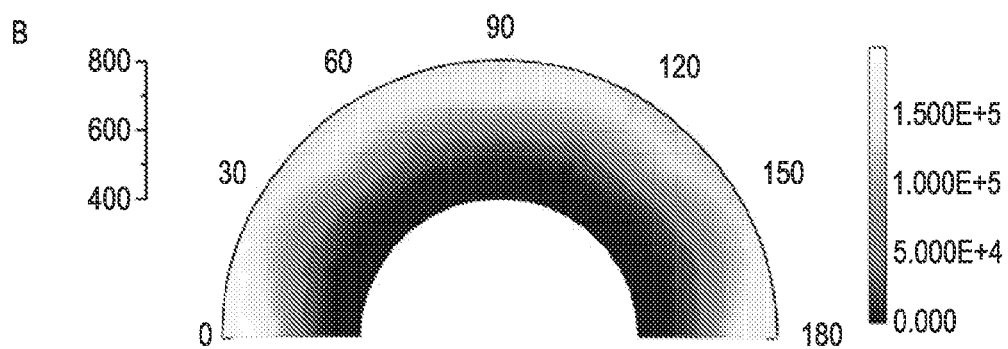
Figure 21:
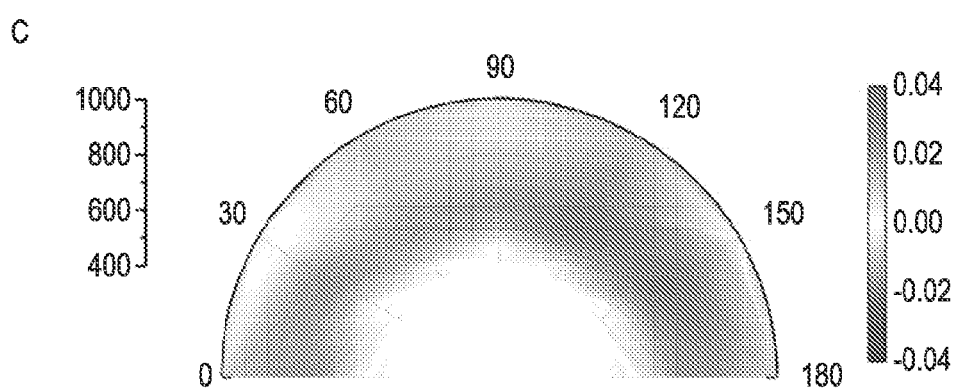

FIG. 21 illustrates omnidirectional radiation around the filament. Section A illustrates the setup to collect the TR spectra from the different sides of the filament via rotating the filament around the long axis (z-axis), showing a typical omnidirectional characteristic of TR for the CNT yarns. Distribution of TR intensity (section B) and $g_{em}$ (section C) collected around the long axis of the filament from 0 to 180° via rotating the thermal emitter.

Figure 22:
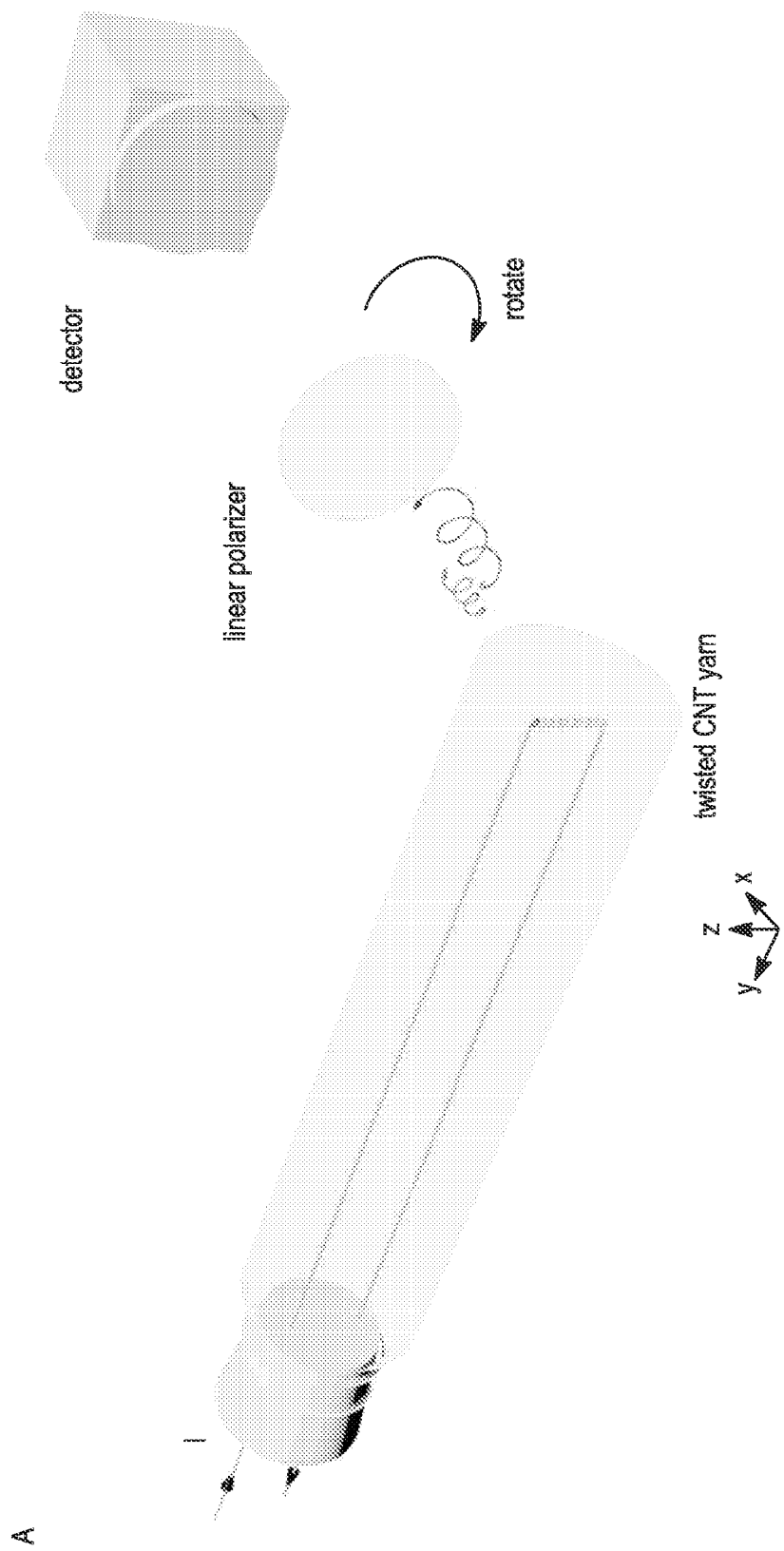
FIG. 22 illustrates linearly polarized thermal radiation for carbon nanotube yarns according to the present disclosure.
Figure 22:
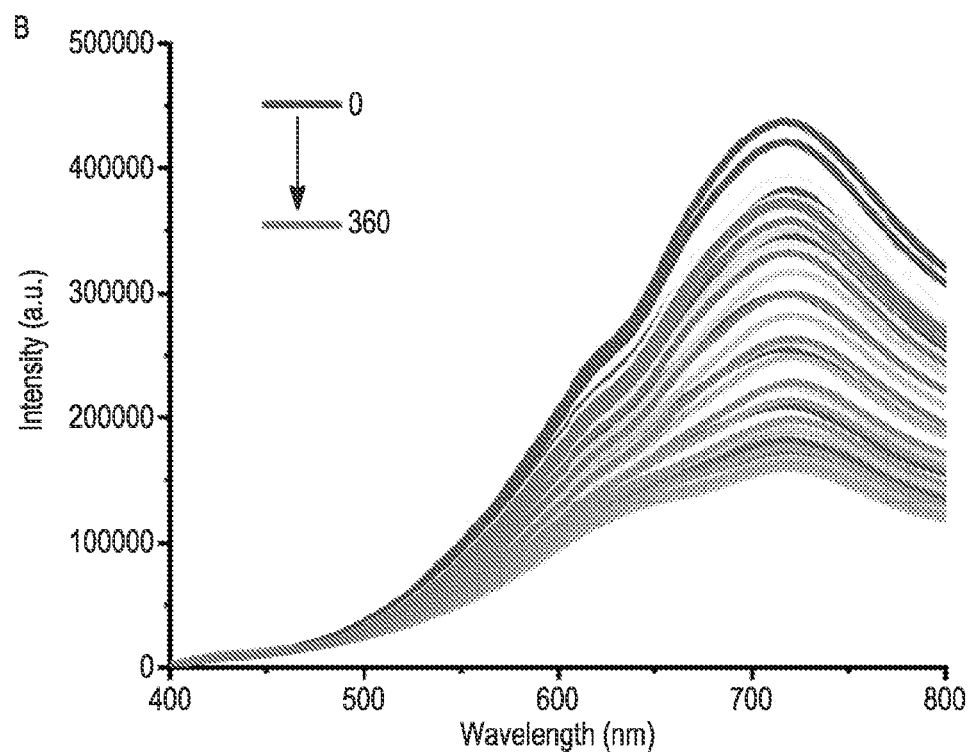
Figure 22:
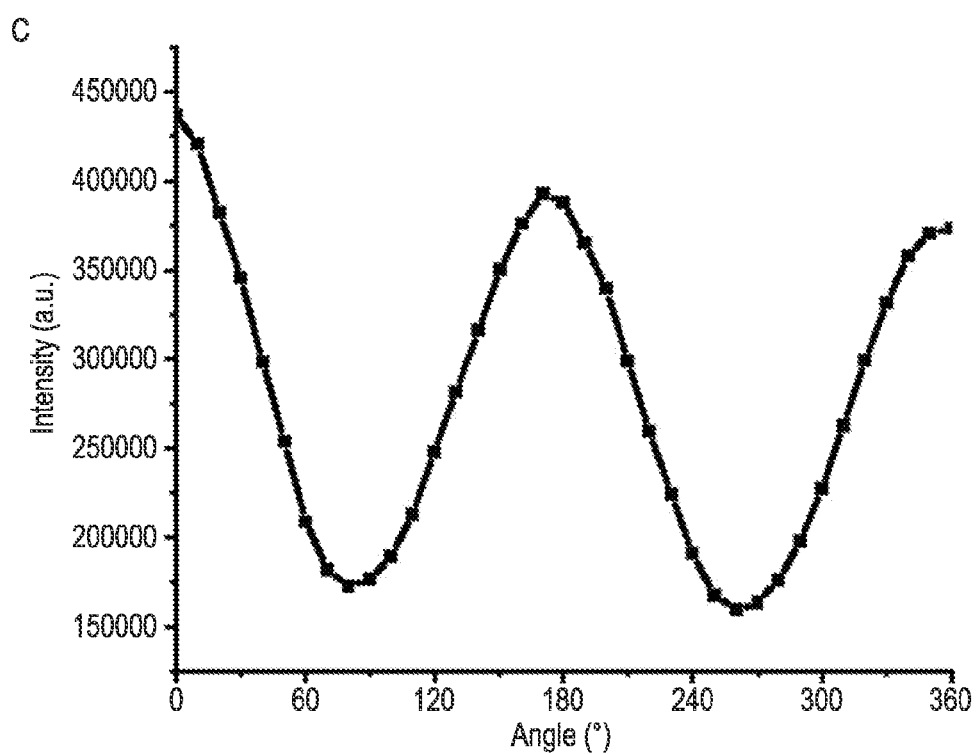

FIG. 22 illustrates linearly polarized TR for CNT yarns. Section A illustrates the setup used to analyze the linear polarization of TR with a linear polarizer placed between CNT yarns and detectors to filter the polarization intensity from other angles. Rotating the linear polarizer allows the collection of the TR under each polarization angle. Section B illustrates TR spectra under different polarization angles via rotating the linear polarizer from 0° (linear polarization along the z-axis) to 360° in the y-z plane as shown in A. Section C illustrates dependence of collected TR intensity at 718 nm with the polarization angles.

Figure 23:
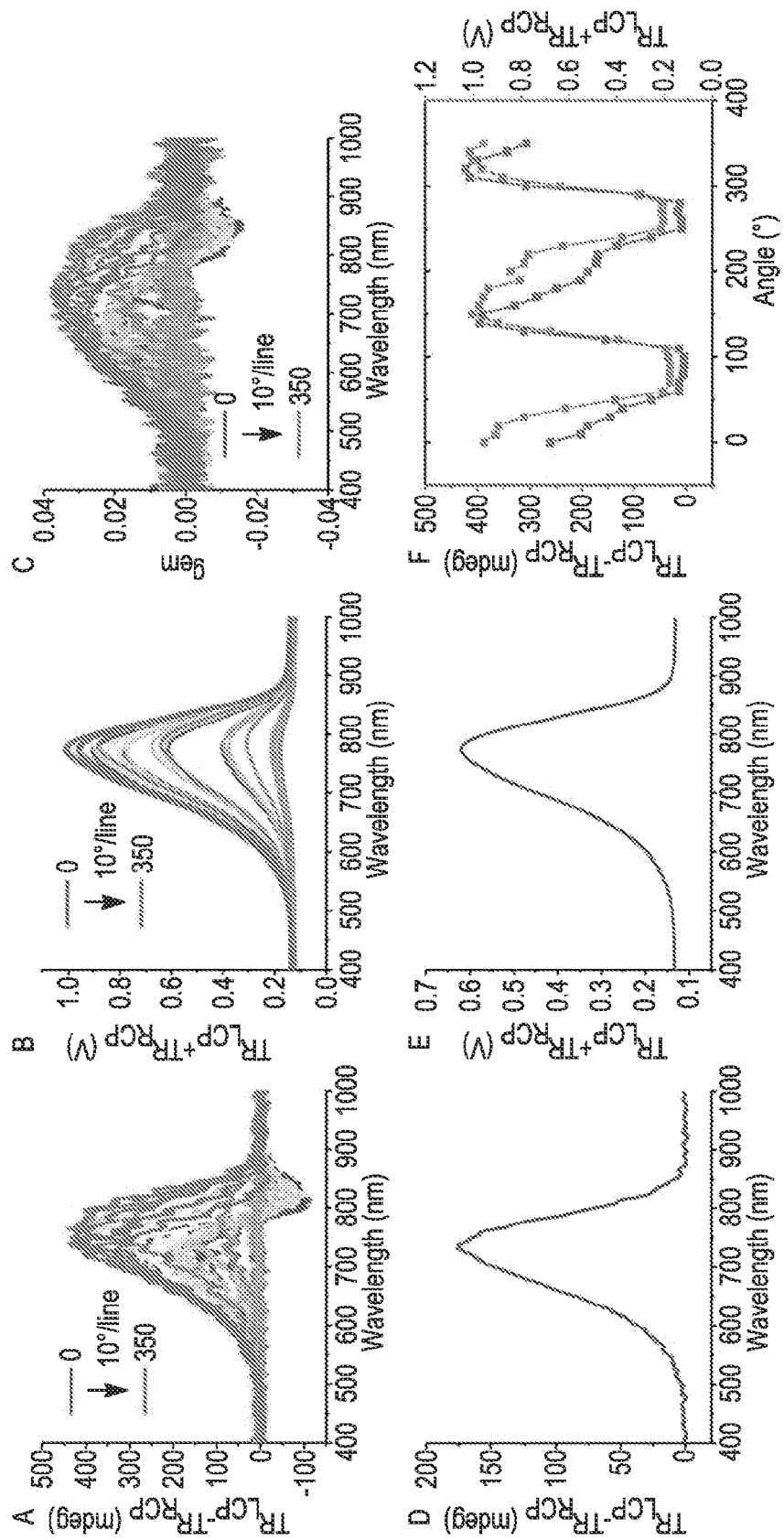
FIG. 23 illustrates circularly polarized thermal radiation for the twisted carbon nanotube yarns with opposite handedness according to the present disclosure.
Figure 23:
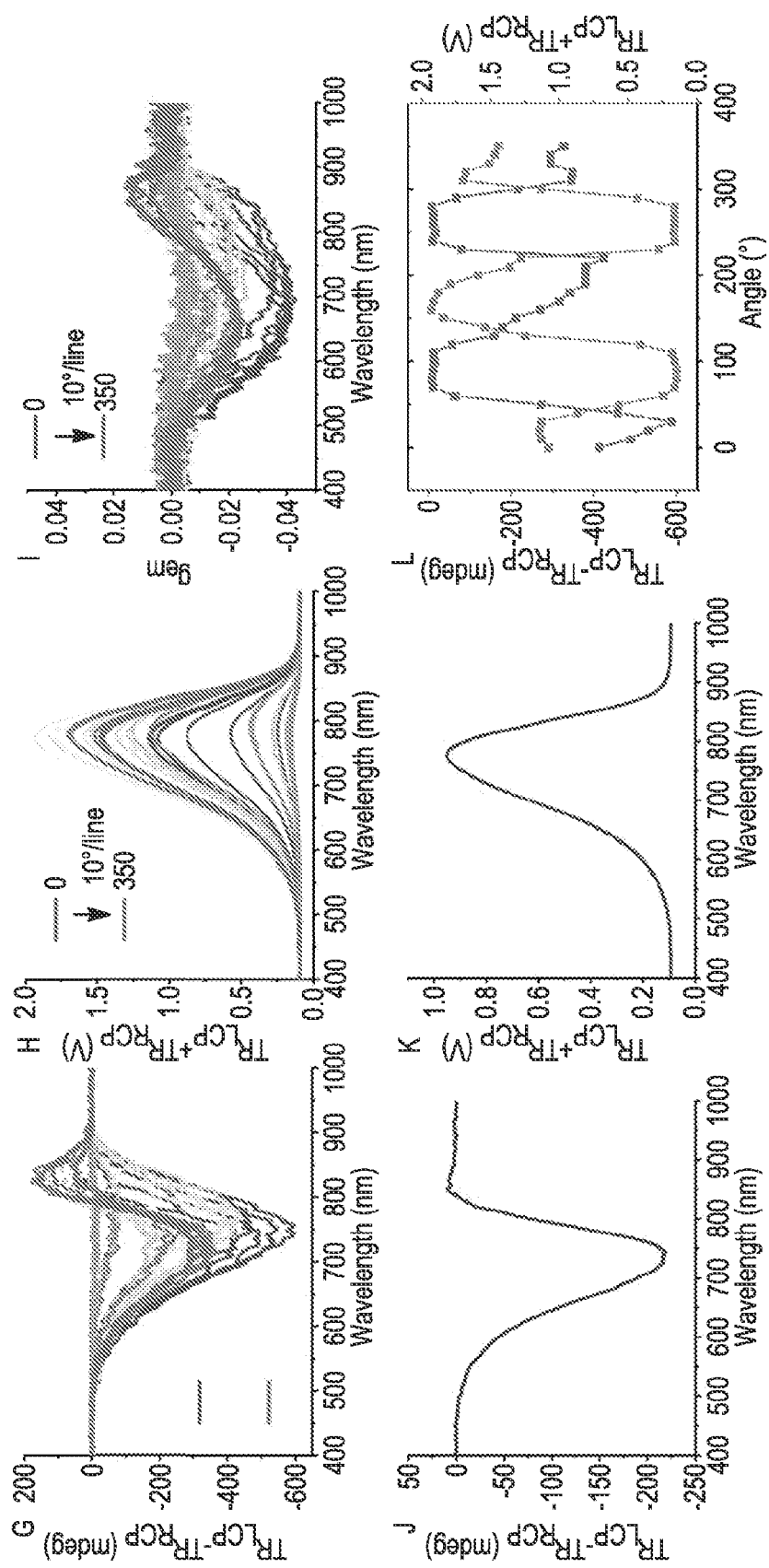

FIG. 23 illustrates circularly polarized TR for the twisted CNT yarns with opposite handedness. $TR_{LCP}-TR_{RCP}$ (sections A and G) and $TR_{LCP}+TR_{RCP}$ (sections B and H) spectra and corresponding anisotropy factor, $g_{em}$ (sections C and I), for LH (sections A-C) and RH (sections G-I) CNT yarns under various filament orientations in the y-z plane as shown in FIG. 15 through rotating the CNT yarns from 0 (CNT yarns parallel to the y-axis) to 350°. Averaged $TR_{LCP}-TR_{RCP}$ (sections D and J) and $TR_{LCP}+TR_{RCP}$ (sections E and K) spectra for LH (sections D and E) and RH (sections J and K) CNT yarns calculated from all the filament orientations. Dependence of maximum intensity in the $TR_{LCP}-TR_{RCP}$ and $TR_{LCP}+TR_{RCP}$ spectra with the rotation angle of CNT yarns.

FIG. 24 illustrates circularly polarized TR for twisted tungsten wires. $TR_{LCP}-TR_{RCP}$ (sections A, D, and G), $TR_{LCP}+TR_{RCP}$ (sections B, E, and H), and $g_{em}$ (sections C, F, and I) spectra for RH (sections A-C), flat (sections D-F), and LH (sections G-I) tungsten wires under various filament orientations via rotating the tungsten wires from 0 to 350° in the plane parallel to the detectors. The diameter of the tungsten wires was 100 μm, while the pitch of LH and RH tungsten wires were 440±30 and 390±30 μm, respectively.

FIG. 25 illustrates circularly polarized TR for twisted tungsten wires. Sections A-C illustrate $g_{em}$ maps for RH (section A), flat (section B), and LH (section C) tungsten wires under variable filament orientations in the y-z plane from 0° to 360°. Sections D and E illustrate SEM images in different magnifications for the RH, flat, and LH tungsten wires. Section F illustrates averaged $g_{em}$ spectrum for the RH, flat, and RH tungsten wires calculated from all the rotation angles.

Figure 26:
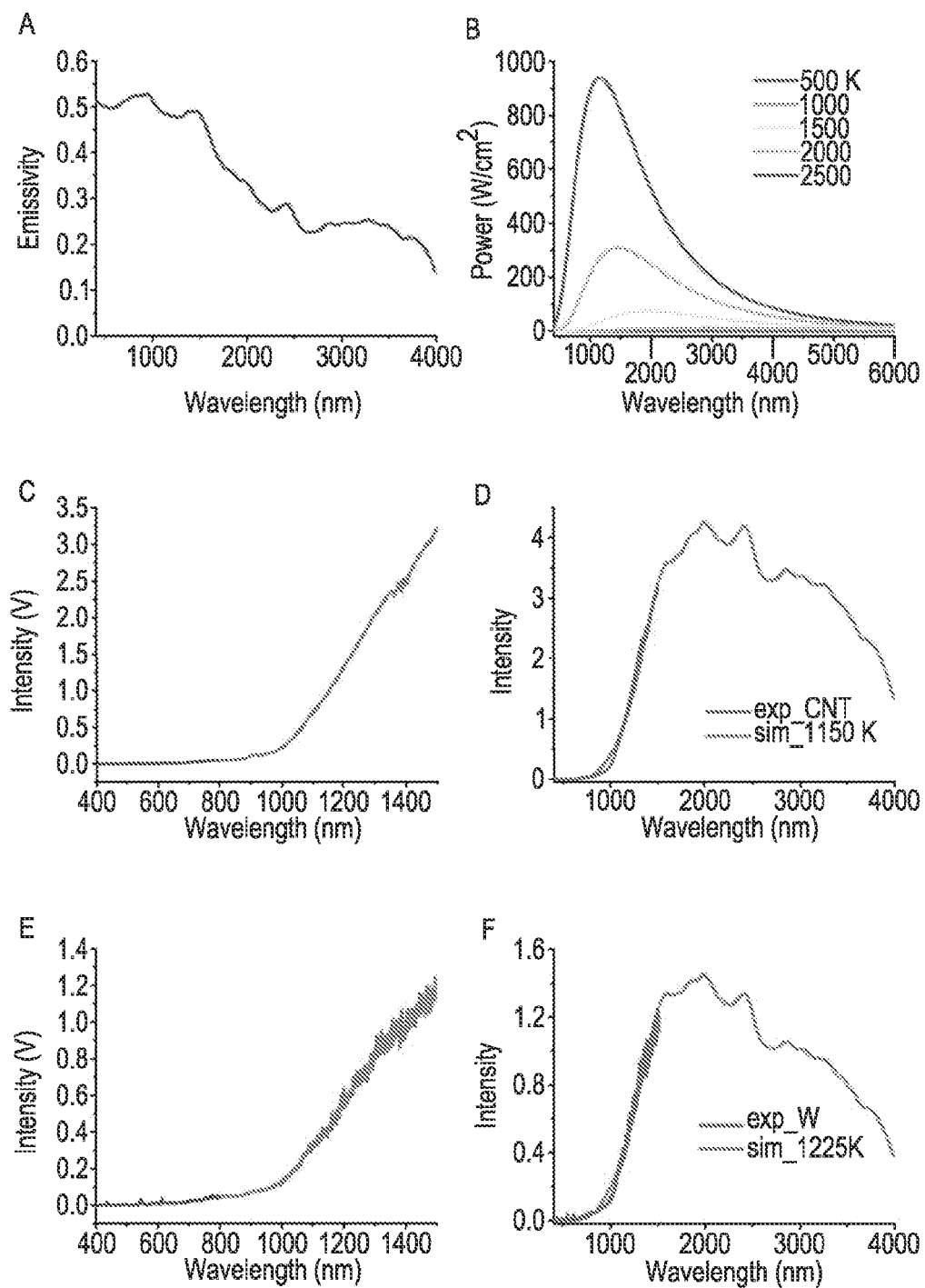
FIG. 26 illustrates calculation of thermal radiation temperature according to the present disclosure.

FIG. 26 illustrates calculation of TR temperature. Section A illustrates FDTD calculated emissivity for RH CNT yarns under an unpolarized light source. Section B illustrates dependence of blackbody radiation spectra under different temperatures. Sections C-F illustrate TR spectra collected with fluorimeter detectors and the comparison with calculated TR spectra from CNT yarns (sections C and D) and tungsten (W) wires (sections E and F).

FIG. 27 illustrates calculation of circularly polarized TR for LH and RH CNT yarns. Section A illustrates the circular polarization of TR for CNT yarns with opposite handedness. Calculated emissivity (sections B and D), LCP and RCP TR power (sections C and E), corresponding $TR_{LCP}-TR_{RCP}$, (section F) and $g_{em}$ (section G) spectra for RH (sections B and C) and LH (sections D and E) CNT yarns.

Figure 28:
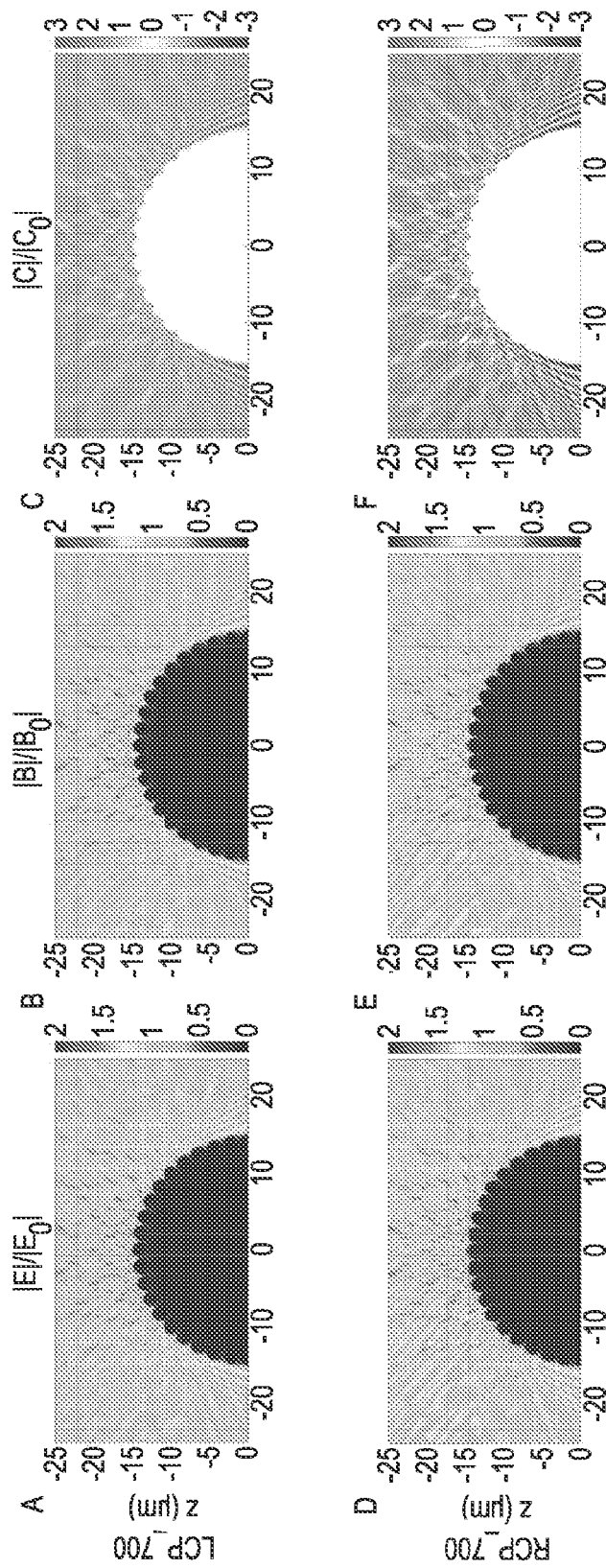
FIG. 28 illustrates electric and magnetic field distributions for carbon nanotube yarns under circularly polarized light illumination according to the present disclosure.
Figure 28:
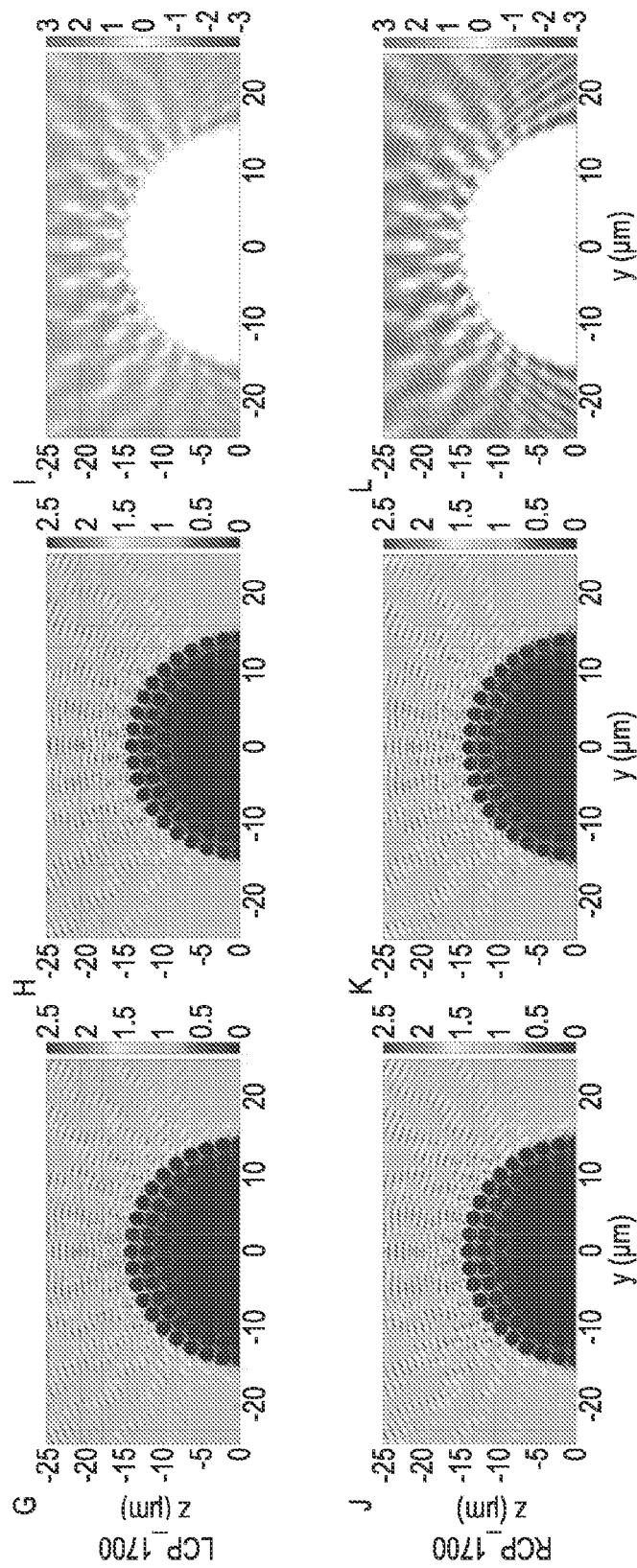
Figure 29:
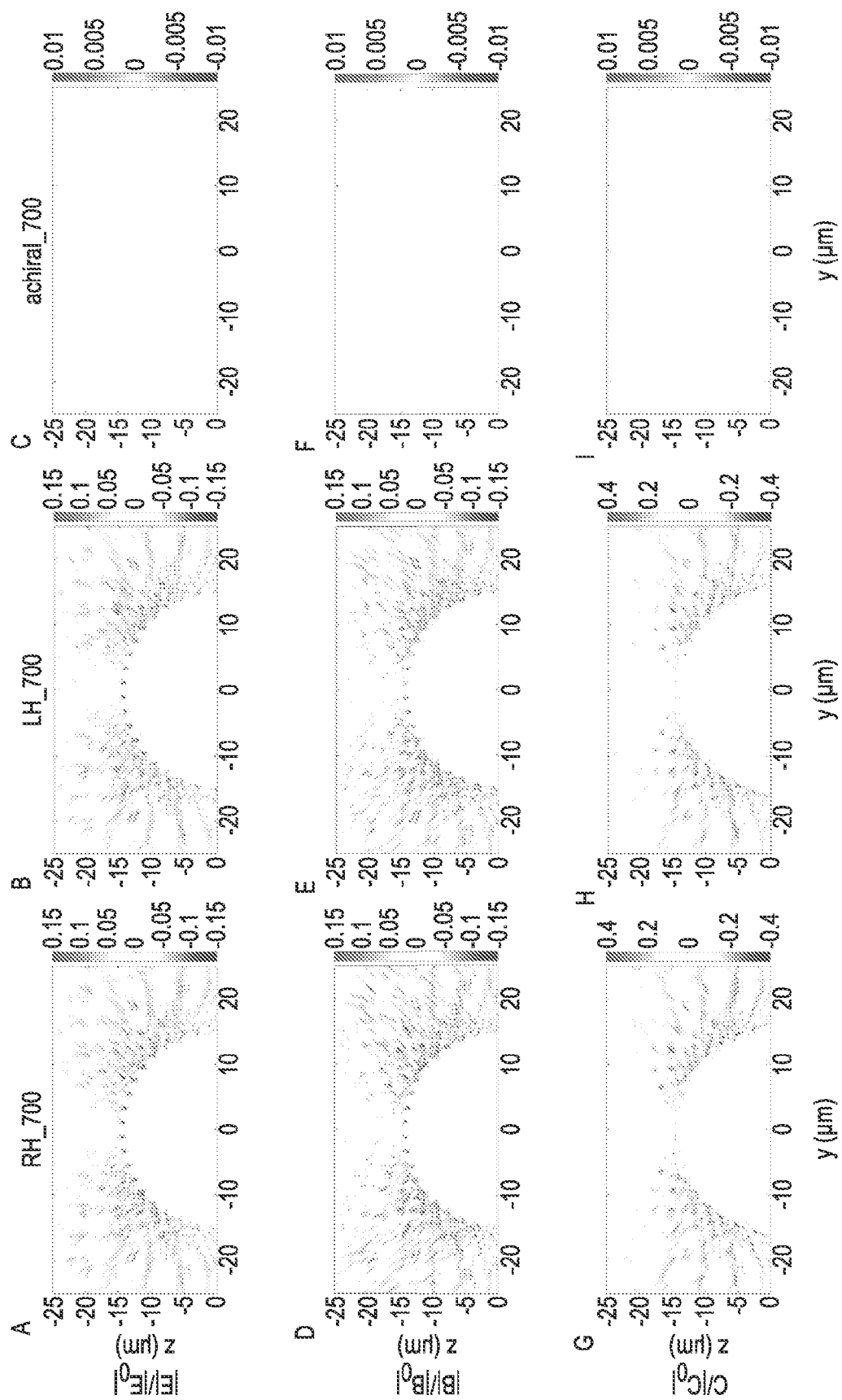
FIG. 29 illustrates electric, magnetic field differences and optical chirality for the thermal radiation of carbon nanotube yarns according to the present disclosure.
Figure 29:
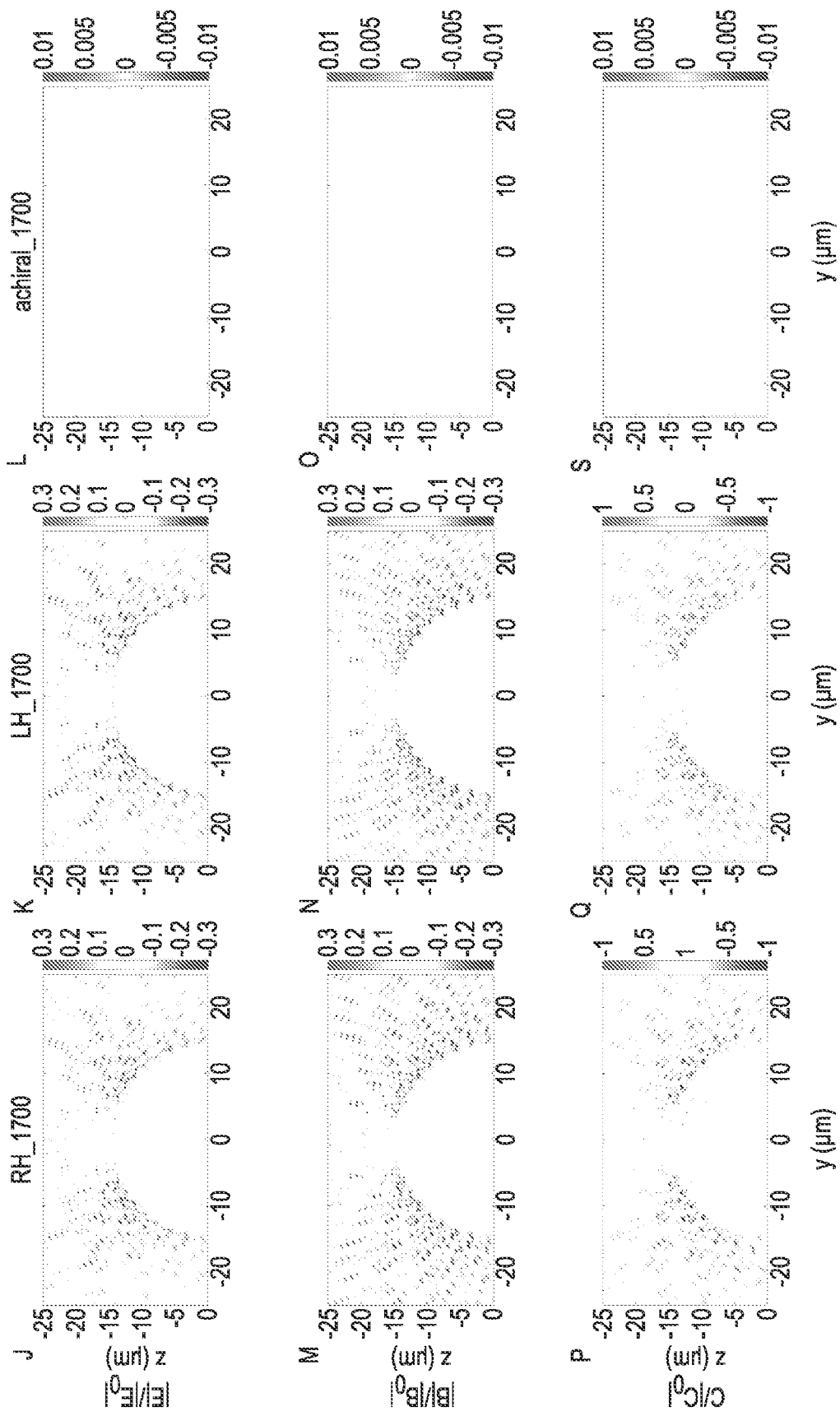

FIG. 28 illustrates electric and magnetic field distributions for the CNT yarns under CPL illumination. Electric (sections A, D, G, and J), magnetic (sections B, E, H, and K) fields and corresponding optical chirality (sections C, F, I, L) for the reflected light from RH CNT yarn under the illumination of LCP (sections A-C and G-I) and RCP (sections D-F and J-L) with a wavelength of 700 (sections A-F) and 1700 (sections G-L) nm.

Comment Regarding Optical Chirality

Optical chirality, C, calculated with Equation 8 above can be used to evaluate the degree of circular polarization of light absorption and emission for thermal emitters. As a scalar parameter of mirror asymmetry, C can distinguish the handedness of CPL, i.e., positive chirality corresponding to LCP, negative chirality corresponding to RCP, and zero chirality corresponding to linear polarized light that can be separated into equal amounts of LCP and RCP. Under the light-matter interaction process, the chirality-induced absorption difference between LCP and RCP can be manifested from the C around the matter via the combination of optical chirality under an equal power of LCP and RCP irradiation.

For RH CNT yarn as an example, the C under LCP, $C_{LCP}$, observed from the reflected electromagnetic fields is dominated with positive chirality while $C_{RCP}$ is dominated with negative chirality under RCP illumination (FIG. 28), meaning the reflected light remains the same C with the irradiated light source. Combining $C_{LCP}$ and $C_{RCP}$ into C shows relatively stronger negative chirality (FIG. 16, section D, top), indicating a preference for RCP reflection from RH yarns. Considering the relationship of Emissivity=Absorbility=1−(Reflectivity+Transmittance), stronger RCP reflection corresponds to a relatively higher LCP emissivity for the RH yarns, which is consistent with spectrum observations (FIG. 16, section A) as well as the positive value of $g_{em}$ from experiments and simulations (FIG. 16, section C). In contrast, although LH and achiral yarns still had dominantly positive $C_{LCP}$ and negative $C_{RCP}$, LH yarns had reverse C (FIG. 2, section D, middle) in comparison to RH yarns, while achiral yarns had zero C (FIG. 2, section D, bottom). Further varying the geometrical parameters of CNT yarns with different pitches and dimeters shows the amplitude of C varies with the response of $g_{em}$. For the filament with small pitches and large diameters, $g_{em}$ is relatively larger and corresponds to higher C in comparison to the structures with large pitches and small diameters, respectively (FIGS. 33 and 35). All these analyses show the positive linear dependence between $g_{em}$ and −C, i.e., $g_{em} \propto -C$, consistent with the theoretical predictions in Equation 10, above.

FIG. 29 illustrates electric, magnetic field differences and optical chirality for the TR of CNT yarns. Electric (sections A-C and J-L) and magnetic (sections D-F and M-O) field differences under LCP and RCP with a irradiation wavelength of 700 (sections A-I) and 1700 nm (sections J-S) and the corresponding optical chirality (sections G-I and P-S) for RH (sections A, D, G, J, M, and P), LH (sections B, E, H, K, N, and Q) and achiral (sections C, F, I, L, O, and S) CNT yarns.

Figure 30:
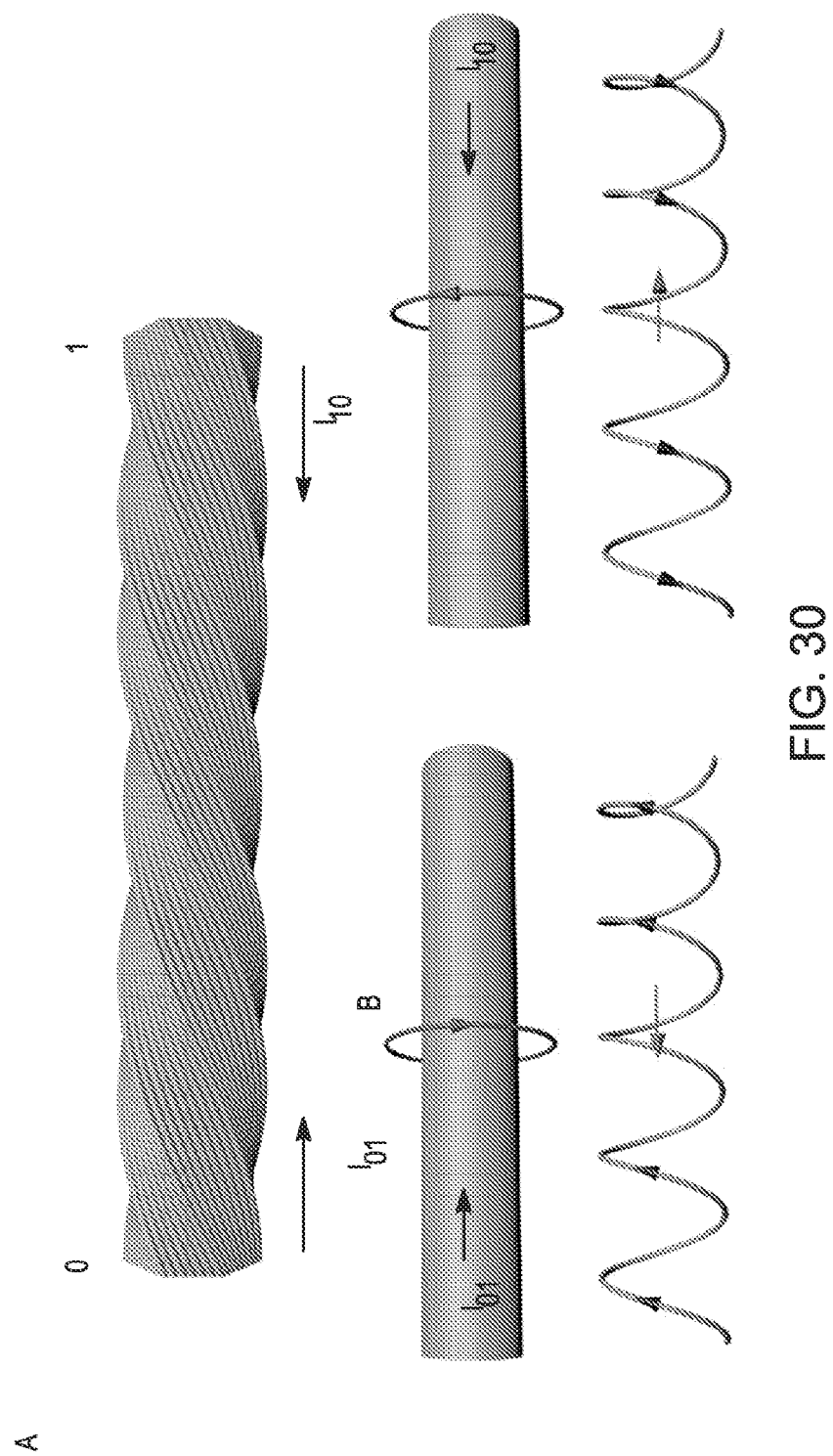
FIG. 30 illustrates the effect of electrical current induced magnetic field on the circular polarization of light emission according to the present disclosure.
Figure 30:
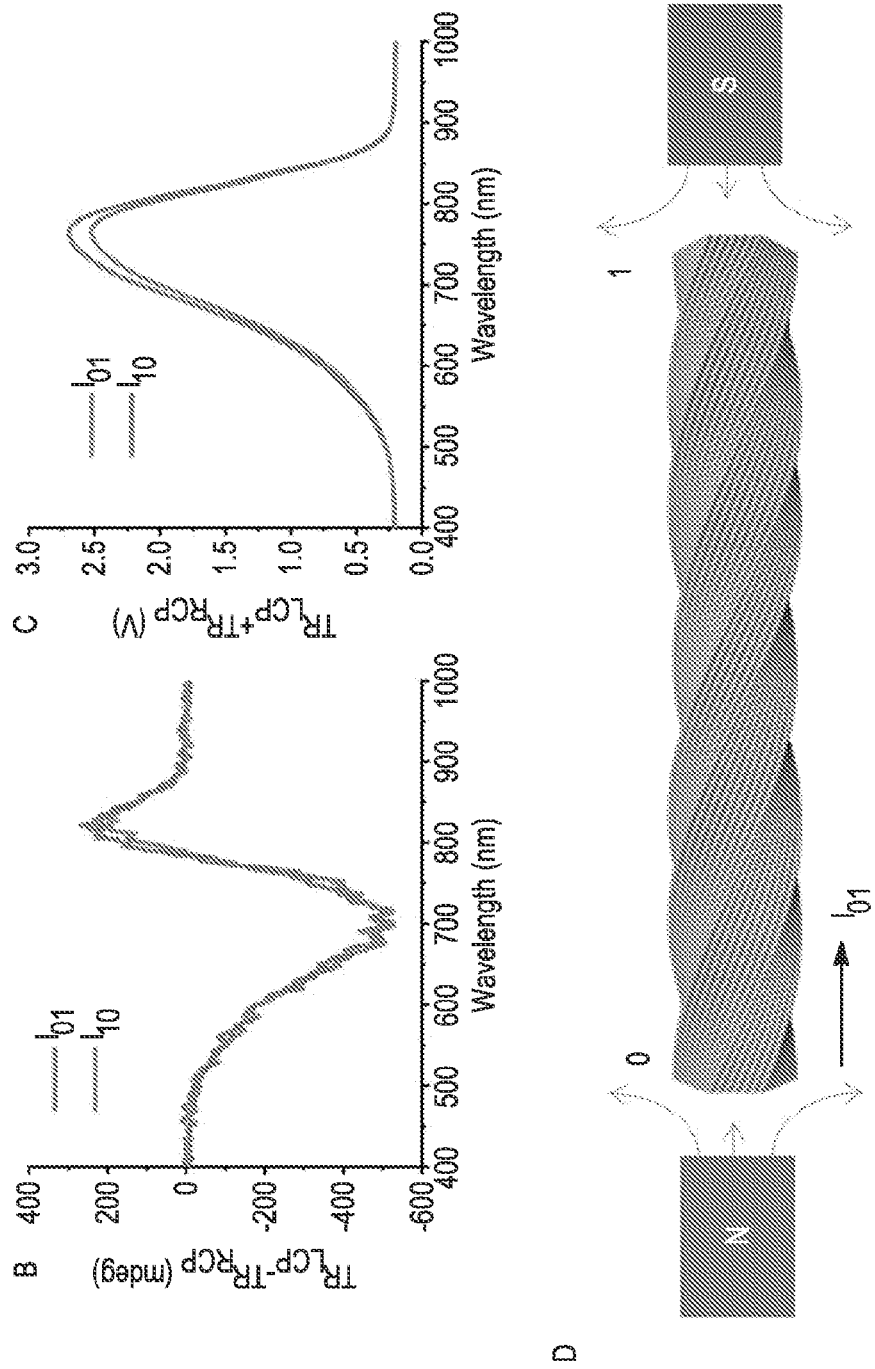
Figure 30:
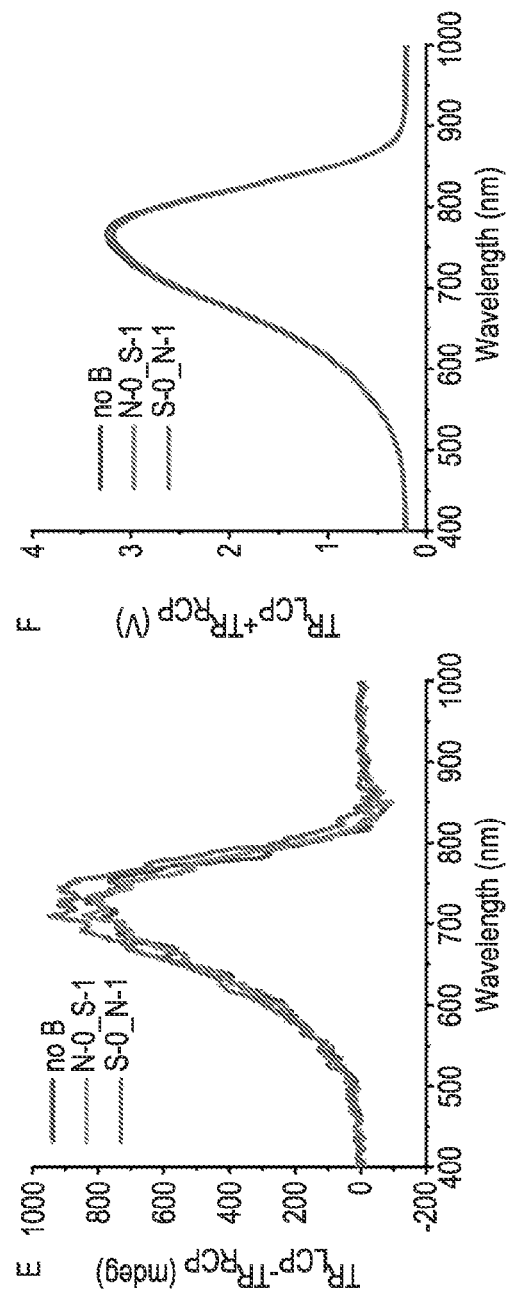

FIG. 30 illustrates the effect of electrical current induced magnetic field on the circular polarization of light emission. Section A is an illustration of effective magnetic field direction on a twisted CNT yarn under opposite electrical current directions. $TR_{LCP}-TR_{RCP}$ (section B) and $TR_{LCP}+TR_{RCP}$ (section C) spectra for LH yarns with electrical current from the two ends of the yarn as shown in section A. Section D is an illustration for the TR under an external magnetic field. Comparison of the $TR_{LCP}-TR_{RCP}$ (section E) and $TR_{LCP}+TR_{RCP}$ (section F) spectra measured without and with an external magnetic field by placing two cube magnets at the two ends of RH yarns. The magnetic field in the center of CNT yarns reached 200 mG by a magnetic field Gauss meter detector (LATNEX® MG-2000T).

Comment regarding magnetic effect from electrical current on the circular polarization of TR.

The effect of external magnetic fields on the spin-orbit interaction of electrons has been approved to break the mirror symmetry of electromagnetic polarization and induce optical anisotropy and circular polarization on light absorption and TR. This effect has been used to understand the circular polarization from electron spin polarization with magnetic fields, especially for objects without geometrical symmetry breaking, e.g. white dwarfs and two-dimensional semiconductors. This magnetic effect usually needs a strong magnetic field, for example, 2 T for n-InAs semiconductor films. The magnetic field amplitude from the electrical current can generate intrinsic magnetic fields based on Ampere's circuital law around the yarns as shown in FIG. 30, section A. However, this current-generated magnetic field is too weak to bring apparent effects on the circular polarization of TR. This conclusion can be verified by switching the current directions from two ends of the yarns to revere the direction of the induced magnetic fields, but with the same sign of circular polarization effect as observed from the $TR_{LCP}-TR_{RCP}$ spectra (FIG. 30, sections B and C). Further adding a weak external magnetic field with an amplitude of around 200 mG along the two ends of yarns still cannot bring any difference to the $TR_{LCP}-TR_{RCP}$ response (FIG. 30, sections D-F). Noted that even larger magnetic fields induced apparent Hall effect and bend the yarns to interfere with measurements, thus limiting the use of super magnetic fields to adjust $g_{em}$ from the current setup.

FIG. 31 illustrates the effect of the pitch of CNT yarns on the circular polarization of TR in simulation. Illustration and corresponding emissivity (sections A-C), LCP and RCP TR power (sections D-E), $TR_{LCP}-TR_{RCP}$ (sections G-I) and $g_{em}$ (sections J-L) spectra for RH CNT yarns with the same diameter of 30 μm but with variable pitches: 100 (sections A, D, G, and J), 800 (sections B, E, H, and K), and 1600 μm (sections C, F, I, and L).

Figure 32:
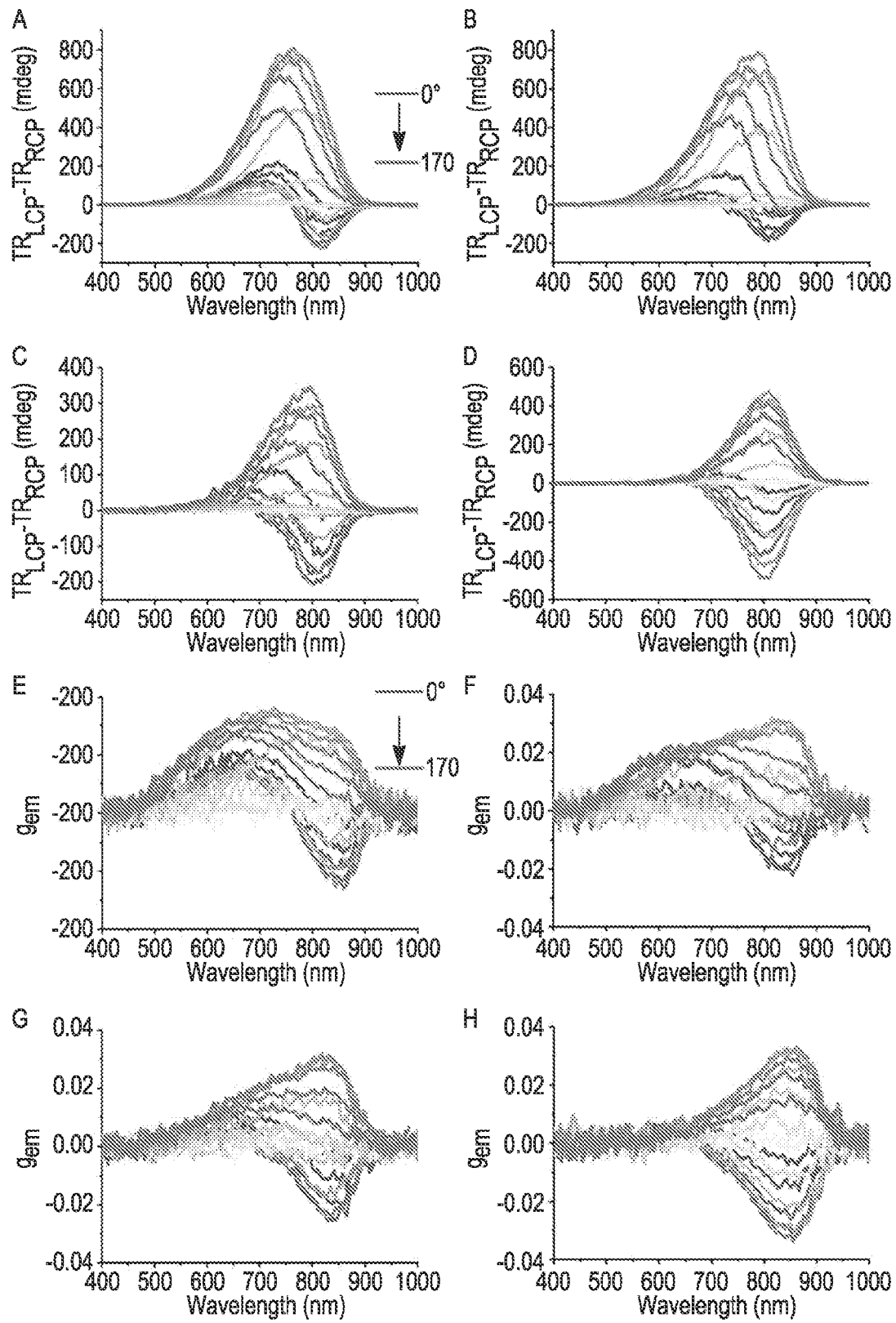
FIG. 32 illustrates the effect of the pitch of carbon nanotube yarns on the circular polarization of thermal radiation from experiments according to the present disclosure.
Figure 32:
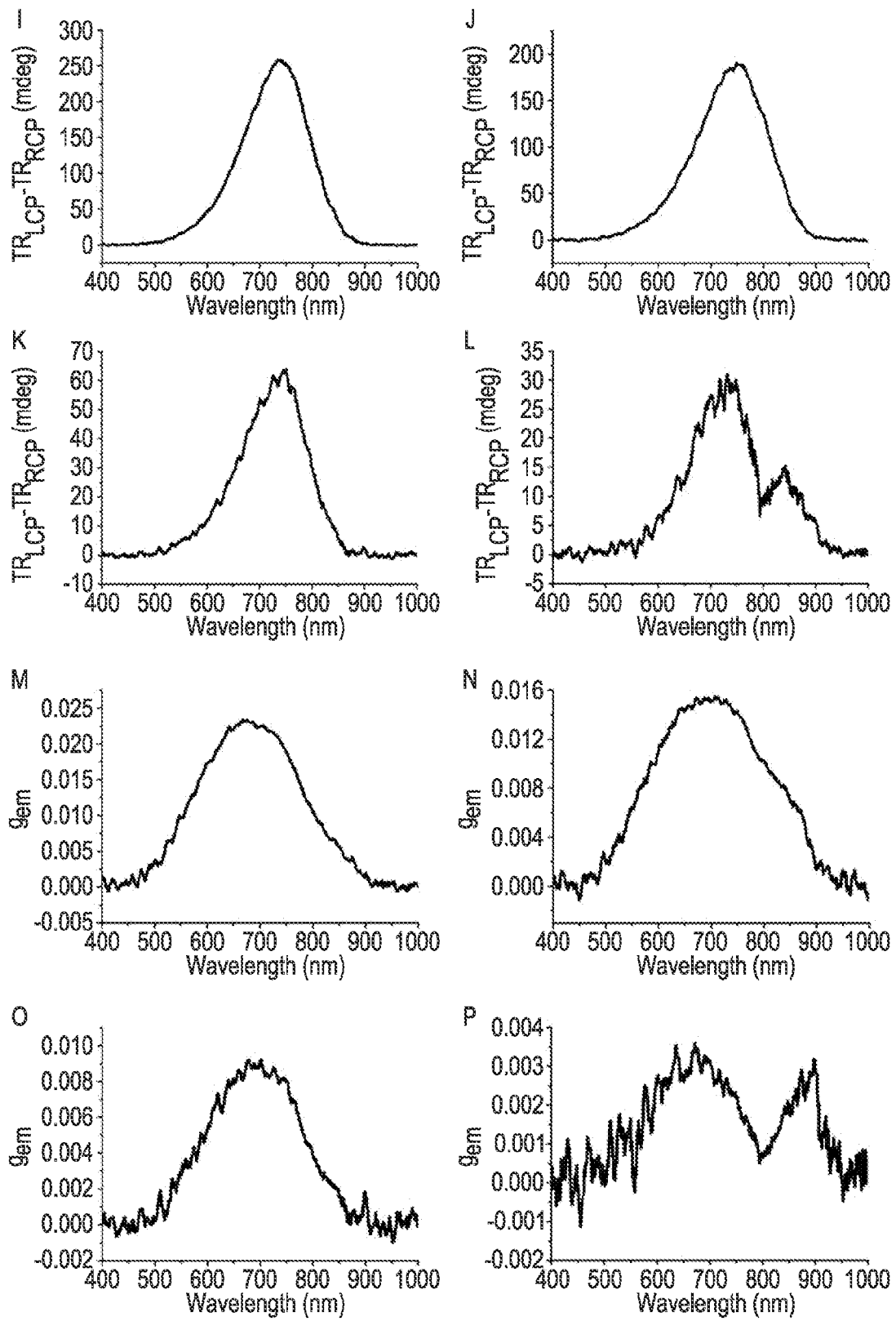

FIG. 32 illustrates the effect of the pitch of CNT yarns on the circular polarization of TR from experiments. $TR_{LCP}-TR_{RCP}$ (sections A-D) and $g_{em}$ (sections E-H) spectra under various filament orientations in the y-z plane as shown in FIG. 15, section A, and corresponding averaged $TR_{LCP}-TR_{RCP}$ (I-L) and $g_{em}$ (sections M-P) spectra from all the filament orientations for the TR of RH CNT yarns with a pitch of 320±30 (sections A, E, I, and M), 440±60 (sections B, F, J, and N), 620±40 (sections C, G, K, and O), and 1200±150 (sections D, H, L, and P) μm.

FIG. 33 illustrates comparisons of optical chirality for CNT yarns with various pitches. Calculated optical chirality, C, for RH CNT yarns with the same diameter of 30 μm but with variable pitches, p: 100 (sections A and B), 200 (sections C and D), 400 (sections E and F), 800 (sections G and H) and 1600 μm (sections I and J) at 700 (sections A, C, E, G, and I) and 1700 (sections B, D, F, H, and J) nm.

FIG. 34 illustrates the effect of the diameter of CNT yarns on the circular polarization of TR. Illustration and corresponding emissivity (sections A-C), LCP and RCP TR power (sections D-E), $TR_{LCP}-TR_{RCP}$ (sections G-I), and $g_{em}$ (sections J-L) spectra for the TR of CNT yarns with the same pitch of 200 μm but with variable diameters, D: 6 (sections A, D, G, J), 18 (sections B, E, H, K), and 30 μm (sections C, F, I, L).

FIG. 35 illustrates a comparison of optical chirality for CNT yarns with various diameters. Calculated optical chirality, C, for RH CNT yarns with the same pitch of 200 μm but with variable diameters, D: 30 (sections A and B), 22 (sections C and D), 14 (sections E and F), and 6 μm (sections G and H) at 700 (sections A, C, E, and G) and 1700 (sections B, D, F, and H) nm.

FIG. 36 illustrates geometrical effect on $TR_{LCP}$-$TR_{RCP}$ spectra. Dependence of $TR_{LCP}$-$TR_{RCP}$ spectra on the pitch (section A) and diameters (section B) of RH CNT yarns from FDTD simulations.

Figure 37:
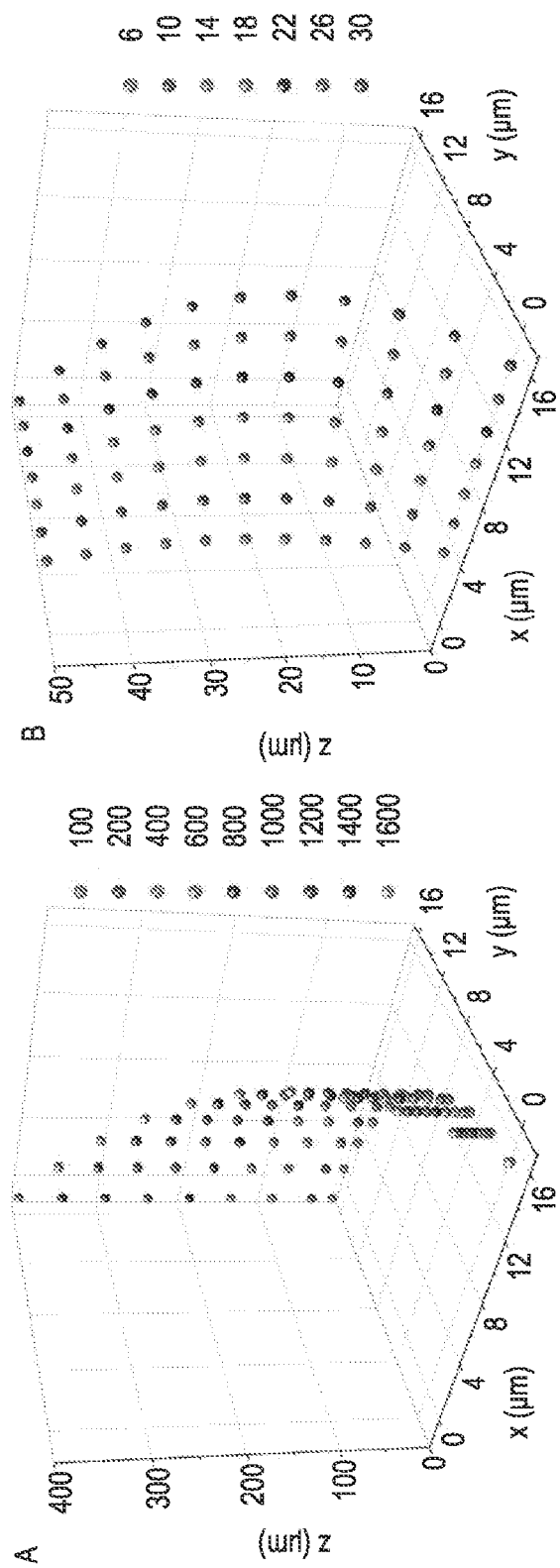
FIG. 37 illustrates Osipov, Pickup and Dunmur chirality calculations.

FIG. 37 illustrates OPD calculations. OPD chirality measures calculated from extracted point groups in the Cartesian coordinate system for the CNT fibers in single chains with various pitches (section A, same diameter of 30 μm) and diameters (section B, same pitch of 200 μm).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

As used herein, the phrase at least one of A, B, and C should be construed to mean a logical (A OR B OR C), using a non-exclusive logical OR. For example, the phrase at least one of A, B, and C should be construed to include any one of: (i) A alone; (ii) B alone; (iii) C alone; (iv) A and B together; (v) A and C together; (vi) B and C together; (vii) A, B, and C together. The phrase at least one of A, B, and C should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A system comprising:
   a hyperspectral infrared camera configured to capture a three-dimensional image of an object and black-body emissions data indicating a polarization of black-body radiation emitted from the object;
   at least one environmental sensor that includes a temperature sensor configured to detect an ambient temperature of an environment of the system; and
   an image processing device in communication with the hyperspectral infrared camera and with the at least one environmental sensor and having a processor and memory configured to:
      receive the black-body emissions data indicating the polarization of the black-body radiation emitted from the object;
      access a database of expected polarization signatures of black-body emissions from a plurality of materials for different temperatures; and
      determine at least one material of the object based on (i) the black-body emissions data indicating the polarization of the black-body radiation emitted from the object, (ii) the ambient temperature of the environment of the system, and (iii) the database of expected polarization signatures of black-body emissions from the plurality of materials for different temperatures.

2. The system of claim 1, further comprising at least one polarization filter configured to filter the three-dimensional image of the object to generate the black-body emissions data indicating the polarization of the black-body radiation emitted from the object.

3. The system of claim 2, wherein the at least one polarization filter includes at least one kirigami filter.

4. The system of claim 2, wherein the at least one polarization filter includes a plurality of polarization filters configured to filter the three-dimensional image of the object in four quadrants, each quadrant representing a different polarization filter or combination of polarization filters.

5. The system of claim 1, wherein the processor and memory are further configured to perform at least one of identifying the object or classifying the object based on the determined at least one material of the object and the three-dimensional image of the object.

6. The system of claim 1, wherein the processor and memory are further configured to:
   determine whether at least one of rain, snow, dust, and fog are present in the environment of the system; and
   determine the at least one material of the object additionally based on the determination of whether at least one of rain, snow, dust, and fog are present in the environment of the system.

7. A method comprising:
   capturing, with a hyperspectral infrared camera, a three-dimensional image of an object and black-body emissions data indicating a polarization of black-body radiation emitted from the object;
   detecting, with a temperature sensor, an ambient temperature of an environment of the system;
   receiving, with an image processing device in communication with the hyperspectral infrared camera and the temperature sensor and having a processor and memory, the black-body emissions data indicating the polarization of the black-body radiation emitted from the object;
accessing, with the image processing device, a database of expected polarization signatures of black-body emissions from a plurality of materials for different temperatures;
determining, with the image processing device, at least one material of the object based on (i) the black-body emissions data indicating the polarization of the black-body radiation emitted from the object, (ii) the ambient temperature of the environment of the system, and (iii) the database of expected polarization signatures of black-body emissions from the plurality of materials for different temperatures.

8. The method of claim 7, further comprising filtering, with at least one polarization filter, the three-dimensional image of the object to generate the black-body emissions data indicating the polarization of the black-body radiation emitted from the object.

9. The method of claim 8, wherein the at least one polarization filter includes at least one kirigami filter.

10. The method of claim 8, wherein the at least one polarization filter includes a plurality of polarization filters configured to filter the three-dimensional image of the object in four quadrants, each quadrant representing a different polarization filter or combination of polarization filters.

11. The method of claim 7, further comprising performing, with the image processing device, at least one of identifying the object or classifying the object based on the determined at least one material of the object and the three-dimensional image of the object.

12. The method of claim 7, further comprising:
determining, with the image processing device, whether at least one of rain, snow, dust, and fog are present in the environment of the system; and
determining, with the image processing device, the at least one material of the object additionally based on the determination of whether at least one of rain, snow, dust, and fog are present in the environment of the system.

13. A system comprising:
a hyperspectral infrared camera configured to capture a three-dimensional image of an object made of at least one known material and black-body emissions data indicating a polarization of black-body radiation emitted from the object;
at least one environmental sensor that senses at least one environmental condition of an environment of the system, including a temperature sensor configured to detect an ambient temperature of the environment of the system;
an image processing device in communication with the hyperspectral infrared camera and with the at least one environmental sensor and having a processor and memory configured to:
receive the black-body emissions data indicating the polarization of the black-body radiation emitted from the object;
access a database of expected polarization signatures of black-body emissions from a plurality of materials for different temperatures;
retrieve a polarization signature of black-body emissions for the at least one known material of the object at the ambient temperature of the environment from the database;
compare the retrieved polarization signature with the received black-body emissions data to determine a degree of attenuation of the polarization indicated by the received black-body emissions data based on the comparison;
determine an expected rate of polarization attenuation based on the at least one environmental condition of the environment of the system;
determine a distance to the object based on the expected rate of polarization attenuation and the determined degree of attenuation of the polarization indicated by the received black-body emission data.

14. The system of claim 13, further comprising at least one polarization filter configured to filter the three-dimensional image of the object to generate the black-body emissions data indicating the polarization of the black-body radiation emitted from the object.

15. The system of claim 14, wherein the at least one polarization filter includes at least one kirigami filter.

16. The system of claim 14, wherein the at least one polarization filter includes a plurality of polarization filters configured to filter the three-dimensional image of the object in four quadrants, each quadrant representing a different polarization filter or combination of polarization filters.

17. The system of claim 13, wherein the processor and memory are further configured to:
determine whether at least one of rain, snow, dust, and fog are present in the environment of the system based on data received from the at least one environmental sensor; and determine the expected rate of polarization attenuation based on the determination of whether at least one of rain, snow, dust, and fog are present in the environment of the system.

18. A method comprising:
capturing, with a hyperspectral infrared camera, a three-dimensional image of an object made of at least one known material and black-body emissions data indicating a polarization of black-body radiation emitted from the object;
sensing, with at least one environmental sensor, at least one environmental condition of an environment of the system, including sensing, with a temperature sensor, an ambient temperature of the environment of the system;
receiving, with an image processing device in communication with the hyperspectral infrared camera and with the at least one environmental sensor and having a processor and memory, the black-body emissions data indicating the polarization of the black-body radiation emitted from the object;
accessing, with the image processing device, a database of expected polarization signatures of black-body emissions from a plurality of materials for different temperatures;
retrieving, with the image processing device, a polarization signature of black-body emissions for the at least one known material of the object at the ambient temperature of the environment from the database;
comparing, with the image processing device, the retrieved polarization signature with the received black-body emissions data to determine a degree of attenuation of the polarization indicated by the received black-body emissions data based on the comparison;
determining, with the image processing device, an expected rate of polarization attenuation based on the at least one environmental condition of the environment of the system;

determining, with the image processing device, a distance to the object based on the expected rate of polarization attenuation and the determined degree of attenuation of the polarization indicated by the received black-body emission data.

19. The method of claim 18, further comprising filtering, with at least one polarization filter, the three-dimensional image of the object to generate the black-body emissions data indicating the polarization of the black-body radiation emitted from the object.

20. The method of claim 19, wherein the at least one polarization filter includes at least one kirigami filter.

21. The method of claim 19, wherein the at least one polarization filter includes a plurality of polarization filters configured to filter the three-dimensional image of the object in four quadrants, each quadrant representing a different polarization filter or combination of polarization filters.

22. The method of claim 18, further comprising:
    determining, with the image processing device, whether at least one of rain, snow, dust, and fog are present in the environment of the system based on data received from the at least one environmental sensor; and
    determining, with the image processing device, the expected rate of polarization attenuation based on the determination of whether at least one of rain, snow, dust, and fog are present in the environment of the system.

23. A system comprising:
    a hyperspectral infrared camera configured to capture a three-dimensional image of an object made of at least one known material and black-body emissions data indicating a polarization of black-body radiation emitted from the object;
    an image processing device in communication with the hyperspectral infrared camera and having a processor and memory configured to:
        receive the black-body emissions data indicating the polarization of the black-body radiation emitted from the object;
        access a database of expected polarization signatures of black-body emissions from a plurality of materials;
        retrieve a polarization signature of black-body emissions for the at least one known material of the object from the database;
        compare the retrieved polarization signature with the received black-body emissions data to determine a shift of a peak wavelength of the black-body emissions due to a Doppler effect on the black-body emissions based on the comparison;
        determine a relative velocity of the object based on the shift of the peak wavelength.

24. The system of claim 23, further comprising at least one polarization filter configured to filter the three-dimensional image of the object to generate the black-body emissions data indicating the polarization of the black-body radiation emitted from the object.

25. The system of claim 14, wherein the at least one polarization filter includes at least one kirigami filter.

26. The system of claim 14, wherein the at least one polarization filter includes a plurality of polarization filters configured to filter the three-dimensional image of the object in four quadrants, each quadrant representing a different polarization filter or combination of polarization filters.

27. A method comprising:
    capturing, with a hyperspectral infrared camera, a three-dimensional image of an object made of at least one known material and black-body emissions data indicating a polarization of black-body radiation emitted from the object;
    receiving, with an image processing device in communication with the hyperspectral infrared camera and having a processor and memory, the black-body emissions data indicating the polarization of the black-body radiation emitted from the object;
    accessing, with the image processing device, a database of expected polarization signatures of black-body emissions from a plurality of materials;
    retrieving, with the image processing device, a polarization signature of black-body emissions for the at least one known material of the object from the database;
    comparing, with the image processing device, the retrieved polarization signature with the received black-body emissions data to determine a shift of a peak wavelength of the black-body emissions due to a Doppler effect on the black-body emissions based on the comparison;
    determining, with the image processing device, a relative velocity of the object based on the shift of the peak wavelength.

28. The method of claim 27, further comprising filtering, with at least one polarization filter, the three-dimensional image of the object to generate the black-body emissions data indicating the polarization of the black-body radiation emitted from the object.

29. The method of claim 28, wherein the at least one polarization filter includes at least one kirigami filter.

30. The method of claim 28, wherein the at least one polarization filter includes a plurality of polarization filters configured to filter the three-dimensional image of the object in four quadrants, each quadrant representing a different polarization filter or combination of polarization filters.

31. A system comprising:
    a hyperspectral infrared camera configured to receive light emitted from an emitter having at least two circularly polarized light emitters that include a helical left emitter and a helical right emitter, the emitter being configured to control an intensity of light emitted from each of the at least two circularly polarized light emitters such that a combined intensity of light emitted from the emitter remains constant while a polarization of the light emitted from the emitter is varied over time, the polarization of the light emitted from the emitter over time being controlled to represent information bits according to a predetermined protocol that maps the information bits to corresponding polarizations of light; and
    an image processing device in communication with the hyperspectral infrared camera and having a processor and memory configured to:
        determine the polarization of the light received by the hyperspectral infrared camera from the light emitter at each of a plurality of predetermined time periods;
        determine a particular information bit corresponding to the polarization of the light received by the light emitter at each of the plurality of predetermined time periods to generate a plurality of received information bits; and
        generate output based on the plurality of received information bits.

32. The system of claim 31, wherein the predetermined protocol is based on a binary numeral system wherein a first range of polarizations of light corresponds to a zero and a second range of polarizations of light corresponds to a one.

33. The system of claim 31, wherein the predetermined protocol is based on a non-binary numeral system having at least three ranges of polarizations of light, wherein a first range of polarizations of light of the at least three ranges corresponds to a first numeral, a second range of polarizations of light of the at least three ranges corresponds to a second numeral, and a third range of polarizations of light of the at least three ranges corresponds to a third numeral.

34. The system of claim 31, wherein:
the hyperspectral infrared camera and the image processing device are installed in a vehicle; and
the emitter is located at an intersection and configured to communicate information about the intersection to the vehicle.

35. The system of claim 34, wherein the information about the intersection communicated from the emitter to the vehicle includes at least one of: information about traffic signals at the intersection; information about other vehicles in or approaching the intersection; information about objects in or approaching the intersection; information about a pedestrian in or approaching the intersection; information about a bicyclist in or approaching the intersection; and information about a micromobility vehicle in or approaching the intersection.

36. A method comprising:
receiving, with a hyperspectral infrared camera, light emitted from an emitter having at least two circularly polarized light emitters that include a helical left emitter and a helical right emitter, the emitter being configured to control an intensity of light emitted from each of the at least two circularly polarized light emitters such that a combined intensity of light emitted from the emitter remains constant while a polarization of the light emitted from the emitter is varied over time, the polarization of the light emitted from the emitter over time being controlled to represent information bits according to a predetermined protocol that maps the information bits to corresponding polarizations of light;
determining, with an image processing device in communication with the hyperspectral infrared camera and having a processor and memory, the polarization of the light received by the hyperspectral infrared camera from the light emitter at each of a plurality of predetermined time periods;
determining, with the image processing device, a particular information bit corresponding to the polarization of the light received by the light emitter at each of the plurality of predetermined time periods to generate a plurality of received information bits; and
generating, with the image processing device, output based on the plurality of received information bits.

37. The method of claim 36, wherein the predetermined protocol is based on a binary numeral system wherein a first range of polarizations of light corresponds to a zero and a second range of polarizations of light corresponds to a one.

38. The system of claim 36, wherein the predetermined protocol is based on a non-binary numeral system having at least three ranges of polarizations of light, wherein a first range of polarizations of light of the at least three ranges corresponds to a first numeral, a second range of polarizations of light of the at least three ranges corresponds to a second numeral, and a third range of polarizations of light of the at least three ranges corresponds to a third numeral.

39. The method of claim 31, wherein:
the hyperspectral infrared camera and the image processing device are installed in a vehicle; and
the emitter is located at an intersection and configured to communicate information about the intersection to the vehicle.

40. The method of claim 39, wherein the information about the intersection communicated from the emitter to the vehicle includes at least one of: information about traffic signals at the intersection; information about other vehicles in or approaching the intersection; information about objects in or approaching the intersection; information about a pedestrian in or approaching the intersection; information about a bicyclist in or approaching the intersection; and information about a micromobility vehicle in or approaching the intersection.

41. A system comprising:
a hyperspectral infrared camera configured to capture a three-dimensional image of an object and black-body emissions data indicating a polarization of black-body radiation emitted from the object;
at least one environmental sensor that includes a temperature sensor configured to detect an ambient temperature of an environment of the system; and
an image processing device in communication with the hyperspectral infrared camera and with the at least one environmental sensor and having a processor and memory configured to:
receive the black-body emissions data indicating the polarization of the black-body radiation emitted from the object;
access a database of expected polarization signatures of black-body emissions from a plurality of materials for different temperatures, the plurality of materials including a plurality of minerals; and
determine at least one material of the object, including at least one mineral of the object, based on (i) the black-body emissions data indicating the polarization of the black-body radiation emitted from the object, (ii) the ambient temperature of the environment of the system, and (iii) the database of expected polarization signatures of black-body emissions from the plurality of materials, including the plurality of minerals, for different temperatures.

42. The system of claim 41, further comprising at least one polarization filter configured to filter the three-dimensional image of the object to generate the black-body emissions data indicating the polarization of the black-body radiation emitted from the object.

43. The system of claim 42, wherein the at least one polarization filter includes at least one kirigami filter.

44. The system of claim 42 wherein the at least one polarization filter includes a plurality of polarization filters configured to filter the three-dimensional image of the object in four quadrants, each quadrant representing a different polarization filter or combination of polarization filters.

45. The system of claim 41, wherein the processor and memory are further configured to:
determine whether at least one of rain, snow, dust, and fog are present in the environment of the system; and
determine the at least one material of the object, including at least one mineral of the object, additionally based on the determination of whether at least one of rain, snow, dust, and fog are present in the environment of the system.

46. A method comprising:
capturing, with a hyperspectral infrared camera, a three-dimensional image of an object and black-body emissions data indicating a polarization of black-body radiation emitted from the object;

detecting, with a temperature sensor, an ambient temperature of an environment of the system;

receiving, with an image processing device in communication with the hyperspectral infrared camera and the temperature sensor and having a processor and memory, the black-body emissions data indicating the polarization of the black-body radiation emitted from the object;

accessing, with the image processing device, a database of expected polarization signatures of black-body emissions from a plurality of materials for different temperatures, the plurality of materials including a plurality of minerals;

determining, with the image processing device, at least one material of the object, including at least one mineral of the object, based on (i) the black-body emissions data indicating the polarization of the black-body radiation emitted from the object, (ii) the ambient temperature of the environment of the system, and (iii) the database of expected polarization signatures of black-body emissions from the plurality of materials, including the plurality of minerals, for different temperatures.

47. The method of claim 46, further comprising filtering, with at least one polarization filter, the three-dimensional image of the object to generate the black-body emissions data indicating the polarization of the black-body radiation emitted from the object.

48. The method of claim 47, wherein the at least one polarization filter includes at least one kirigami filter.

49. The method of claim 47, wherein the at least one polarization filter includes a plurality of polarization filters configured to filter the three-dimensional image of the object in four quadrants, each quadrant representing a different polarization filter or combination of polarization filters.

50. The method of claim 46, further comprising:

determining, with the image processing device, whether at least one of rain, snow, dust, and fog are present in the environment of the system; and determining, with the image processing device, the at least one material of the object, including at least one mineral of the object, additionally based on the determination of whether at least one of rain, snow, dust, and fog are present in the environment of the system.

* * * * *